(12) United States Patent
Sina

(10) Patent No.: US 10,474,633 B2
(45) Date of Patent: Nov. 12, 2019

(54) TAG PYRAMID DATA MANAGEMENT SYSTEM

(71) Applicant: Parham Sina, Rockville, MD (US)

(72) Inventor: Parham Sina, Rockville, MD (US)

(*) Notice: Subject to any disclaimer, the term of this patent is extended or adjusted under 35 U.S.C. 154(b) by 361 days.

(21) Appl. No.: 15/425,333

(22) Filed: Feb. 6, 2017

(65) Prior Publication Data

US 2017/0228395 A1 Aug. 10, 2017
US 2018/0089225 A9 Mar. 29, 2018

Related U.S. Application Data

(60) Provisional application No. 62/291,804, filed on Feb. 5, 2016, provisional application No. 62/298,061, filed on Feb. 22, 2016.

(51) Int. Cl.
*G06F 16/14* (2019.01)
*G06F 16/13* (2019.01)
*G06F 16/16* (2019.01)
*G06F 16/11* (2019.01)

(52) U.S. Cl.
CPC .......... *G06F 16/14* (2019.01); *G06F 16/122* (2019.01); *G06F 16/13* (2019.01); *G06F 16/16* (2019.01)

(58) Field of Classification Search
CPC ......... G06F 16/122; G06F 16/13; G06F 16/16
See application file for complete search history.

(56) References Cited

U.S. PATENT DOCUMENTS

| | | | | |
|---|---|---|---|---|
| 8,180,814 | B1* | 5/2012 | Swengler | G06F 16/164 707/831 |
| 8,285,760 | B1 | 10/2012 | Sina | |
| 8,645,317 | B1* | 2/2014 | Klimetschek | G06F 16/958 707/609 |
| 8,756,260 | B2 | 6/2014 | Sina | |
| 2008/0275851 | A1* | 11/2008 | Taylor | G06Q 30/02 |
| 2009/0287674 | A1* | 11/2009 | Bouillet | G06F 16/9562 |
| 2013/0006994 | A1* | 1/2013 | Sina | G06F 16/5866 707/737 |

* cited by examiner

*Primary Examiner* — Marc S Somers
(74) *Attorney, Agent, or Firm* — Maier & Maier, PLLC

(57) ABSTRACT

A data storage and retrieval system for a computer storage memory, incorporating a tag pyramid data structure. The tag pyramid data structure may include a plurality of tag pyramid elements, including a root level element and one or more children branching from the root. Each of the children may have a hierarchical immutable tag sequence, including one or more immutable tags, which may define how the tag pyramid data structure is to be built. Each child may also have a mutable tag, selected from the hierarchical immutable tag sequence, which may serve as an identifier for that child. Children may be automatically grouped based on common tags, and may be organized into sequences based on the common tags.

20 Claims, 44 Drawing Sheets

TAG PYRAMID DATA MANAGEMENT SYSTEM

CROSS-REFERENCE TO RELATED APPLICATIONS

This application claims priority from U.S. Provisional Patent Application No. 62/291,804, filed on Feb. 5, 2016, entitled "TAG PYRAMID DATA MANAGEMENT SYSTEM," and U.S. Provisional Patent Application No. 62/298,061, filed on Feb. 22, 2016, entitled "TAG PYRAMID DATA MANAGEMENT SYSTEM," the entire contents of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The most common structures for storing computer data revolve around files stored in containers called "folders." Most common operating systems, such as the MICROSOFT WINDOWS operating system, employ similar data structures, and they are widely used by the general population.

In a typical directory structure, files and folders are arranged in a hierarchical tree. At the top of the tree, or otherwise the narrowest part of the tree, a root directory may be provided, which may be, for example, the address of a specific drive. (For example, in WINDOWS systems, the root directory is typically "C:\".) Folders and files may then be arranged within the root directory, and subfolders and files may be arranged within the folders of the root directory, and so on and so forth. (For example, in WINDOWS systems, the root directory may contain the "\Program Files" and the "\Windows" folders, while the "\Windows" folder may contain the "\System" folder.) Folders may be separated from one another by a directory separator, commonly "\" or "/".

Typical directory structures store the locations of files using a path name. The path name may be a pointer to a file system location expressed in a string of characters in which path components are separated by the directory separator. For example, in the WINDOWS systems provided above, an example path might be the string "C:\Windows\System".

However, various problems exist with this sort of directory structure. For example, it can often be difficult to organize unorganized data into such a file structure. Further, such a directory structure generally has no inherent way to represent interrelationships between a file in a first location and a file in a second, different location. This makes manipulation of and reorganization of the data structure each more difficult. For example, in a typical directory structure, a user who wishes to make changes to a particular type of file or files under a particular directory heading may have to make such changes individually, consuming significant amounts of time and increasing the potential for mistakes.

SUMMARY

A tag pyramid data management system may be shown and described. According to an exemplary embodiment, a tag pyramid may be a Data Management Application that systematically maps a pyramid of mutable tags to a hierarchical structure of files and folders. In an exemplary embodiment, such a system may make use of immutable and mutable tags.

According to an exemplary embodiment, a system may assign immutable tags to data to form immutable tag lists. The immutable tag lists formed by the system may then be used to determine how mutable tag lists are structured.

In an embodiment, mutable tag lists may be represented by a pyramid hierarchy of mutable tags. The mutable tags in the pyramid hierarchy may then be used to manage immutable tag lists and manipulate the hierarchical system. In an embodiment, file and folder names and locations may mirror their corresponding mutable tags.

According to an exemplary embodiment, a tag pyramid data management system may be implemented as a data storage and retrieval system including a tag pyramid data structure. Such a data structure may include a plurality of tag pyramid elements, which may include a root level element associated with a root tag and at least one child element extending from the root tag. The child element may be associated with at least one of a file element or a folder element. The child element may include a hierarchical immutable tag sequence, or an immutable tag list having a ranked order of immutable tags, which may include one or more immutable tags. One of these immutable tags may be selected as a mutable tag. The tag pyramid data structure may be configured to automatically define the placement of the child element or elements in the tag pyramid data structure, based on the hierarchical immutable tag sequence of the child elements.

In an embodiment, the system may be configured to select the immutable tag of the hierarchical immutable tag sequence using logic similar to the following. First, the system may determine whether immutable tags in the hierarchical immutable tag sequences of each element match. The highest nonmatching tag may be selected as a mutable tag. Alternatively, it may be desirable to define one or more of the tags as secondary, which may mean that the element bearing the tag displays the next lowest tag from what would otherwise be displayed. In an embodiment, this may be visually indicated; for example, a secondary tag may be displayed in a different color.

In an embodiment, the system may be configured to automatically define the placement of one or more of the child elements in the tag pyramid data structure based on the hierarchical immutable tag sequences of the at least one child element. In an embodiment, this may make use of logic similar to the following. First, the system may determine whether immutable tags in the hierarchical immutable tag sequences of each element match. Next, the system may group matching tag sequences into folder tags, which may contain the files having matching tag sequence portions.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
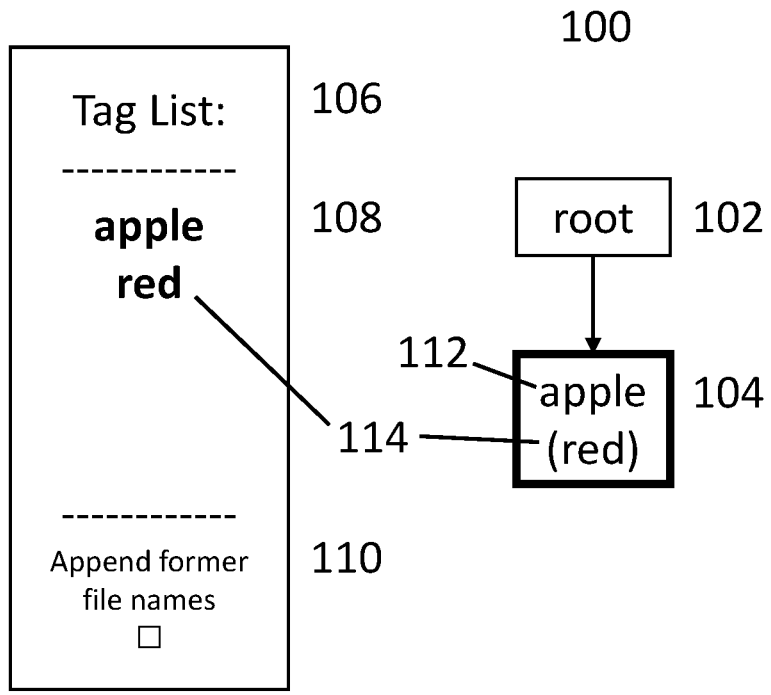
FIG. 1 is an exemplary embodiment of a tag pyramid data structure.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, a discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a tag pyramid data management system may be disclosed. Each exemplary implementation may feature a particular data set, or a particular alteration to be made to a data set, in order to more fully describe exemplary characteristics of the tag pyramid data management system. In some embodiments, a tag pyramid data management system may incorporate aspects of a System for Organizing Computer Data similar to the one described in U.S. Pat. No. 8,285,760, herein incorporated by reference. In an embodiment, such a system may be performed on a computing device having a processor and a memory, including a storage memory (which may be, for example, a non-volatile memory, or a volatile memory configured to act as storage, such as a RAM drive).

To start, a tag pyramid may be a Data Management Application that systematically maps a pyramid of mutable tags to a hierarchical structure of files and folders. In an exemplary embodiment, such a system may make use of immutable and mutable tags.

According to an exemplary embodiment, a system may assign immutable tags to data to form immutable tag lists. The immutable tag lists formed by the system may then be used to determine how mutable tag lists are structured.

In an embodiment, mutable tag lists may be represented by a pyramid hierarchy of mutable tags. The mutable tags in the pyramid hierarchy may then be used to manage immutable tag lists and manipulate the hierarchical system. In an embodiment, file and folder names and locations may mirror their corresponding mutable tags.

In an exemplary embodiment, the mutable tag lists of a tag pyramid may be referenced in, and by, an associated mutable tag lists file or database. In an embodiment, a file's immutable tag list can be referenced in, and by, the file itself or an associated immutable tag lists file or database, where immutable tags can be added, removed, and/or renamed.

In a tag pyramid data management system, a file may be represented by a terminating mutable tag and a folder without a mandatory structure may be represented by a non-terminating mutable tag. Peer mutable tags (that is, mutable tags falling under the same parent tag) may be listed horizontally. In an embodiment, peer primary or superprimary mutable tags (i.e. mutable tags that are at a higher level than a tag which a file is using as a primary mutable tag) can be reordered.

According to an exemplary embodiment of a tag pyramid, a group of peer primary mutable tags that do not use the same immutable tag may be displayed with secondary mutable tags listed below the group members to which the secondary mutable tags correspond. However, for a lone mutable file tag, or for a group of peer mutable tags that do use the same immutable tag, only one secondary mutable tag may be listed on its or their side (i.e. the side of the lone mutable file tag or the side of the group of peer mutable tags, respectively). In this second case, additional secondary mutable tags may be listed below the one secondary mutable tag. If the group of peer mutable tags that use the same immutable tag constitute a sequence, secondary mutable tags may also be listed below, or as, particular sequence members.

According to an exemplary embodiment, sequence members may be retracted secondary mutable file tags. These may be defined as follows. When a sequence is formed, some of the sequence members which are files may have more secondary tags than other sequence members which are files, but equally use the same immutable tag for their displayed mutable tag so long as the sequence is locked on that particular mutable tag; in an embodiment, the particular tag that the sequence is locked on may be specified by the user. These sequence members (i.e. those sequence members which have tags secondary to the mutable tag used by the sequence) are known as retracted secondary mutable file tags.

In an exemplary embodiment, a tag pyramid may define special logic for sequences that facilitates the use of retracted secondary mutable file tags. For example, according to an exemplary embodiment, a sequence of mutable tags may automatically be shifted up whenever there is an available tag; for example, this may occur for non-sequenced tags. However, in some embodiments, a sequence may be locked on a particular mutable tag until the user chooses to manually shift it up or down by selecting a different common immutable tag for the sequence. In other exemplary embodiments, the mutable tag of a sequence may be automatically shifted up or down based on some condition, if desired.

According to an exemplary embodiment, the root level of a tag pyramid may be a folder or root level of a storage system, which may contain the hierarchical structure of data being managed. This root level may be represented by a root tag. In an embodiment, this root tag may be listed at the top of the tag pyramid and may be associated with an empty immutable tag list.

According to an exemplary embodiment, a mutable folder tag or root tag can be used to open its corresponding folder or root level in a file manager. In an exemplary embodiment, a folder tag or a root tag may also be used to select all mutable file tags below it, which may be done by, for example, selecting the folder tag or the root tag. In an exemplary embodiment, deleting a mutable file tag in a tag pyramid data management system may also delete the file corresponding to that mutable file tag.

Several further definitions of the terminology that may be used herein may be provided. First, a "tag pyramid" may include a displayed hierarchy of mutable tags representing corresponding files and folders, a displayed "root tag" representing its root level, and two displayed designated areas accompanying each sequence of mutable tags.

A tag pyramid's "mutable tag" may be a displayed representation of a corresponding file or folder. In an exemplary embodiment, a "mutable tag" may use only one immutable tag in that tag's sequenced or non-sequenced form. However, in some exemplary embodiments, concatenated mutable folder tags may be formed by concatenating immutable tags; in an embodiment wherein a "mutable tag" is a concatenated mutable folder tag, it may use more than one immutable tag in their non-sequenced forms only.

A tag pyramid's "mutable file tag" may be a type of mutable tag that represents a corresponding file, and may be displayed as a terminating mutable tag, having no mutable tags displayed below it.

A tag pyramid's "mutable folder tag" may be a type of mutable tag that represents a corresponding folder without a mandatory structure, and may be displayed as a non-terminating mutable tag, having mutable tags displayed below it.

A tag pyramid's "mutable mandatory structure tag" may be a type of mutable tag that represents a corresponding folder with a mandatory structure, and may be displayed as a terminating mutable tag.

When referring to a mutable folder tag, the term "within" refers only to the immediate path within (i.e. below) that mutable folder tag and not any paths further below in a hierarchy of mutable folder tags.

Further discussion of the rules to be applied to a tag pyramid data management system may also be provided. For example, in an exemplary embodiment of a tag pyramid data management system, two successive identical immutable tags in an immutable tag list may be automatically merged into one, using the immutable tag name once only.

In another exemplary rule, all peer mutable tags using the same immutable tag must collectively form a single group or sequence, unless they are within a sequenced mutable folder tag that uses the same immutable tag, in which case they must collectively form a single group only. In an exemplary embodiment, an operation in this description may be prevented from occurring if it would violate this rule.

In another exemplary rule, an operation may be prevented from occurring if it would require a folder to be moved into a folder below itself.

In another exemplary rule, a non-sequenced mutable tag may automatically use a higher-level immutable tag that is available to it and a lower-level immutable tag when necessary. If a non-sequenced mutable file tag is within a non-concatenated mutable folder tag, it may use that mutable folder tag's immutable tag only when it has no available immutable tag to use. Also, concatenating immutable tags for use by a mutable folder tag may not cause their unavailability for use by mutable tags within it.

In another exemplary rule, one or more mutable file tags/files can be moved/copied/saved from a tag pyramid/file manager/application onto a mutable file tag/non-concatenated mutable folder tag/root tag/designated sequence area. Moving, copying, or saving these files may cause the files to inherit an immutable tag list based on the immutable tag list/tags associated with/leading to the destination, which may replace former immutable tag lists, if any. Before the inheritance is committed, a user may be provided with the option to modify their pending immutable tag list, including the option to automatically append their former file names (the non-sequenced portions, if sequenced), if any, as immutable tags to the ends of their respective pending immutable tag lists. If the pending immutable tag list is empty, the user must add at least one immutable tag to it for every pending mutable file tag, retain former immutable tag lists instead, if any, or cancel the operation.

According to an exemplary embodiment, immutable tags may be added, removed, and/or renamed anywhere in a mutable file tag's immutable tag list. One or more mutable file tags can be selected for such modification. When only one mutable file tag is selected, the user may be able to identically and simultaneously modify all other mutable file tags with identical immutable tag lists, if any. When more than one mutable file tag is selected, according to an exemplary embodiment, only the common portion of the selected immutable tag lists can be identically and simultaneously modified.

According to an exemplary embodiment, a common immutable tag can form a sequence of peer mutable tags. Such a sequence of peer mutable tags may optionally be directed below particular higher-level sequence members. In an exemplary embodiment, when a common immutable tag is used to form a sequence of peer mutable tags, such a sequence of peer mutable tags may retain lower-level immutable tags, if any; alternatively, in another exemplary embodiment, a sequence of peer mutable tags may not retain one or more lower-level immutable tags, or may optionally not retain one or more lower-level immutable tags, if desired. It may also be desired to remove a sequence; according to an exemplary embodiment, a sequence of mutable tags can be unsequenced (that is, the sequence can be eliminated), where its members, including all mutable file tags below them, if any, are disbanded and are renamed and resorted as necessary. Also, according to an exemplary embodiment, a sequence of mutable tags may use the same common immutable tag until it is unsequenced or is directed to form a sequence using a different common immutable tag.

According to an exemplary embodiment, one or more lower-level immutable tags can be joined into an existing sequence. In such an embodiment, the mutable file tags associated with the one or more lower-level immutable tags may join an existing member or form one or more new members, and the lower-level immutable tags may be retained. Likewise, one or more lower-level immutable tags that are joined to, or form, a sequence member can disjoin the sequence, join a different member, or form one or more new members, for their mutable file tags, retaining their lower-level immutable tags.

According to an exemplary embodiment, when one or more mutable file tags/files are moved/copied/saved onto/below a sequenced mutable tag, they join that sequence member. However, a sequence may be accompanied by a plurality of designated areas, which may be used to provide other functionality via drag-and-drop commands. For example, according to an exemplary embodiment, when the one or more mutable file tags/files are moved/copied/saved onto one of two designated areas accompanying a sequence, the mutable file tags/files may be added to that sequence, forming one or more new members. When they are moved/copied/saved onto the other of two designated areas accompanying a sequence, they do not join that sequence, but instead may be assigned as secondary to the sequence.

According to an exemplary embodiment, if moving/copying/saving/renaming a mutable file tag/file would result in identically-named files with identical file extensions conflicting within the same path, the user can resolve the conflict by deleting the former version of the mutable file tag, forming a sequence, or canceling the operation.

According to an exemplary embodiment, as previously mentioned, folder tags may be concatenated mutable folder tags formed by concatenating immutable tags. In another exemplary embodiment, as an alternative or complement to tag concatenation, the tag pyramid may automatically supply, or attempt to supply, a new tag in what is, or would otherwise be, a concatenated tag's place, so as to remove the need for the concatenated tag. This may effectively provide secondary objects with a single available common tag where they would otherwise have none. In some embodiments, this new tag may be defined by the tag pyramid, by the user, or both. For example, when a tag concatenation occurs or may occur, the tag pyramid may prompt the user to specify a new tag in its place. As another example, the tag pyramid may be configured with a default tag to provide in such a case, and may prompt the user to accept, reject, or modify that default tag before committing it.

According to an exemplary embodiment, to further describe a "mutable mandatory structure tag," defined above, a folder with a mandatory structure may be represented by a terminating mutable tag, and its contents, if any, may not be represented on its tag pyramid. This mutable mandatory structure tag is handled like a mutable file tag, and its corresponding folder's immutable tag list can be referenced in, and by, the folder itself or an associated immutable tag lists file/database, where immutable tags can be added, removed, and/or renamed.

Further, according to an exemplary embodiment, a mutable mandatory structure tag can be used to open its corresponding folder in a file manager. Deleting a mutable mandatory structure tag may delete its corresponding folder and any contents.

According to an exemplary embodiment, a mutable mandatory structure tag may be created by converting a mutable folder tag. This conversion may have the effect of removing all mutable tags below the converted tag from its tag pyramid while retaining their corresponding data.

According to an exemplary embodiment, one or more mutable folder tags/mutable mandatory structure tags/folders, with and/or without contents, can be moved/copied/saved from a tag pyramid/file manager/application onto a mutable file tag/non-concatenated mutable folder tag/root tag/designated sequence area, moving/creating one or more mutable mandatory structure tags. In an exemplary embodiment, the former folder names (the non-sequenced portions, if sequenced), if any, can be automatically appended as immutable tags to the ends of the respective pending immutable tag lists of the mutable mandatory structure tags.

According to an exemplary embodiment, one or more mutable tags, files, and/or folders can be moved/copied/saved from a tag pyramid/file manager/application into a folder with a mandatory structure.

According to an exemplary embodiment, for a mutable mandatory structure tag, at any time, including when creating it or moving/copying into its corresponding folder, a user may elect to retain or discard the immutable tag lists of any of the contents of the mutable mandatory structure tag.

According to an exemplary embodiment, in some cases, moving/creating/renaming a mutable mandatory structure tag/its corresponding folder may create a scenario that would, without further alteration, result in identically-named folders with mandatory structures conflicting within the same path. In an embodiment, a user may be able to resolve the conflict by deleting the former version of the mutable mandatory structure tag, forming a sequence, canceling the operation, or merging the two mutable mandatory structure tags, thereby merging their corresponding folder contents under one folder, if possible. According to an exemplary embodiment, one of these options may be selected by default and may happen automatically should the user create a scenario where identically-named folders with mandatory structures would be conflicting within the same path.

According to an exemplary embodiment, a tag pyramid may be associated with a designated workspace path. In an embodiment, a designated workspace path may be a folder/root level of a storage system, external to the tag pyramid's hierarchical structure of data. Such a designated workspace path may store versions of its tag pyramid's corresponding files. In an exemplary embodiment, a user may be able to update those workspace path versions instead of their respective mutable file tag versions; in some embodiments, this may cause a workspace path version to overwrite its mutable file tag version.

According to an exemplary embodiment, this capability for a user to load a workspace path version instead of its mutable file tag version may improve the performance of the tag pyramid; when the user loads a workspace path version, this may allow the tag pyramid to systematically manipulate its corresponding files and folders without needing to relocate the open file nor update the application with the open file's location.

In an exemplary embodiment, a mutable file tag can be used to store and load a version of its corresponding file in and from a version-unique location in its tag pyramid's designated workspace path. When a version is in a version-unique location, its mutable file tag can also be used again. When the version is in a version-unique location, then using that location's mutable file tag again stores and loads its mutable file tag version in and from an incrementally-sequenced version-unique location.

In an exemplary embodiment, applications may save data to their loaded workspace path versions.

According to an exemplary embodiment, when a workspace path version is closed by its application, or when a retained/otherwise different version is in a version-unique location, the user may be provided with the option to overwrite its mutable file tag version with the workspace path version, and then to retain/delete it from the designated workspace path.

According to another exemplary embodiment, a tag pyramid may be organized in the form of a database tag pyramid. A "database tag pyramid" may be a Tag Pyramid Data Management Application that operates as a type of database that stores and retrieves field names as tags and tag lists using "master" and "slave" tag pyramids. For example, according to an exemplary embodiment, a database tag pyramid may include one or more authoritative master tag pyramids, and one or more derived and corresponding slave tag pyramids. A non-empty immutable tag list on a slave tag pyramid may include one or more mirrored instances of master immutable tag lists.

In an embodiment, a master tag pyramid may be "authoritative" because a master tag pyramid's immutable tag lists may function as the original, authoritative immutable tag lists of corresponding instances within slave immutable tag lists, and a slave tag pyramid's immutable tag lists each have one or more mirroring copies, or "instances," of those master immutable tag lists.

To briefly discuss exemplary database syntax for a database tag pyramid, a terminating master mutable tag's immutable tag list may be denoted by the following path syntax:

m:<PYRAMID>:<immutable tag list>

A terminating slave mutable tag's immutable tag list may be denoted by the following path syntax:

s:<PYRAMID>:<master immutable tag list 1 instance>\\<master immutable tag list 2 instance> . . . .

According to an exemplary embodiment, a database tag pyramid may be disclosed. Such a database tag pyramid may be, in some embodiments, formed using a system incorporating aspects of a System for Organizing Computer Data, or may be formed using another system, as may be desired. In an exemplary embodiment, a database tag pyramid may include a root tag, and may constitute or may include a displayed hierarchy of mutable tags that may not be (or may not necessarily be) mapped to a hierarchical structure of files and folders. Rather, these mutable tags may be used to represent database field names, which may be stored as immutable tags in immutable tag lists, and these immutable tags can be defined with various data types, such as characters or integers. The database tag pyramid may also be configured to reply to field name-based queries, where relative tags and/or tag lists are retrieved.

According to an exemplary embodiment, a database tag pyramid's instance mappings can be referenced in, and by, an associated instance mappings file or database. In an embodiment, a user may also be able to use this file or database for queries, such as for determining how many times and/or where a particular master immutable tag list is instanced, or in which slave tag pyramids two different particular master immutable tag lists are instanced together.

An exemplary rule for a database tag pyramid may establish that, for two successive instances within a slave immutable tag list, if the last immutable tag of the first instance is identical to the first immutable tag of the second instance, the immutable tags are not merged into one. However, in an exemplary embodiment, the last immutable tag of the first instance and the first immutable tag of the second instance may be considered merged when forming their slave mutable tags.

In an exemplary embodiment, a terminating master mutable tag can be instanced onto one of its database's slave tag pyramids' terminating mutable tags/root tags. This may have the effect of creating a new slave terminating mutable tag. In an exemplary embodiment, rather than this instancing replacing the former master immutable tag list of the terminating master mutable tag, the former master immutable tag list may be incorporated as an instance within the inherited slave immutable tag list, before or after any particular instance. Alternatively, according to an exemplary embodiment, instancing a terminating master mutable tag into one of its database's slave tag pyramids' terminating mutable tags may cause the master immutable tag list to be incorporated as an instance within the slave immutable tag list, before or after any particular instance and without creating a new slave terminating mutable tag. Likewise, an instance can be removed from within its larger slave immutable tag list.

According to an exemplary embodiment, a modification to a terminating master mutable tag's immutable tag list may reflect on all its corresponding instances, if any. This may include, for example, the deletion of a terminating master mutable tag, which may delete all corresponding terminating slave mutable tags with identical immutable tag lists, as well as all corresponding instances within their respective larger slave immutable tag lists.

The operation of an exemplary embodiment of a database tag pyramid may be described below, as well as by reference to the Figures referred to later in the document. According to an exemplary embodiment, a college database may be provided, which may include information having to do with, for example, student scheduling and grades.

According to an exemplary embodiment of a database tag pyramid implementing a college database, a master tag pyramid may be assigned twelve terminating mutable tags with the respective immutable tag lists of "m:COLLEGE:course\English\101\M-W-F," "m:COLLEGE:course\English\102\T-Th," "m:COLLEGE:9 am," "m:COLLEGE:2pm," "m:COLLEGE:employee\professor\Bob\Johnson\EMPID546;" "m:COLLEGE:student\Alice\Smith\STUID123," "m:COLLEGE:student\Alice\Smith\STUID546," "m:COLLEGE:grade\A," "m:COLLEGE:grade\B," "m:COLLEGE:grade\C," "m:COLLEGE:grade\D," and "m:COLLEGE:grade\F."

The terminating master mutable tag with the immutable tag list of "m:COLLEGE:course\English\101\M-W-F" is instanced onto the root tag of the slave tag pyramid "s:FALL_2015," resulting in a terminating slave mutable tag with an immutable tag list of "s:FALL_2015:course\English\101\M-W-F," extending and/or retracting as necessary. In the provided embodiment, this may represent a particular college course, having a schedule of M-W-F, which may be taught by a professor, may have a number of students, and may assign one of a plurality of grades to each student.

"m:COLLEGE:employee\professor\Bob\Johnson\EMPID546" may be instanced as the last listed instance onto "s:FALL_2015:course\English\101\M-W-F," resulting in "s:FALL_2015:course\English\101\M-W-F\\employee\professor\Bob\Johnson\EMPID546."

"m:COLLEGE:student\Alice\Smith\STUID123" may be instanced as the last listed instance onto "s:FALL_2015:course\English\101\M-W-F," resulting in "s:FALL_2015:course\English\101\M-W-F\\student\Alice\Smith\STUID123."

"m:COLLEGE:grade\B" may be instanced as the last listed instance onto "s:FALL_2015:course\English\101\M-W-F\\student\Alice\Smith\STUID123," resulting in "s:FALL_2015:course\English\101\M-W-F\\student\Alice\Smith\STUID123\\grade\B." This indicates a grade received in the class.

Next, an operation may be performed to rename a master immutable tag. For example, the master immutable tag of "Bob" in "m:COLLEGE:employee\professor\Bob\Johnson\EMPID546" may be renamed to "Robert," resulting in "m:COLLEGE:employee\professor\Robert\Johnson\EMPID546" and, in the slave tag pyramid, "s:FALL_2015:course\English\101\M-W-F\\employee\professor\Robert\Johnson\EMPID546."

Next, it may be desired to terminate a particular course. For example, to represent the termination of a particular course (for example, the end of the fall 2015 semester) and the award of a final grade for a student, the terminating slave mutable tags with the respective immutable tag lists of "s:FALL_2015:course\English\101\M-W-F" and "s:FALL_2015:course\English\101\M-W-F\\student\Alice\Smith\STUID123\\grade\B" may be deleted. "m:COLLEGE:grade\A" may then be instanced as the last listed instance onto "s:FALL_2015:course\English\101\M-W-

F\\student\Alice\Smith\STUID123," resulting in "s:FALL_2015:course\English\101\M-W-F\\student\Alice\Smith\STUID123\\grade\A."

In another example, it may be desired to update the number of the course. "101" in "m:COLLEGE:course\English\101\M-W-F" may be renamed to "102," resulting in "m:COLLEGE:course\English\102\M-W-F," "s:FALL_2015:course\English\102\M-W-F\\employee\professor\Robert\Johnson\EMPID546," "s:FALL_2015:course\English\102\M-W-F\\student\Alice\Smith\STUID123," and "s:FALL_2015:course\English\102\M-W-F\\student\Alice\Smith\STUID123\\grade\A."

Next, it may be desired to remove an instance from within a terminating slave mutable tag. For example, the instance of "student\Alice\Smith\STUID123" may be removed from "s:FALL_2015:course\English\102\M-W-F\\student\Alice\Smith\STUID123\\grade\A," resulting in "s:FALL_2015:course\English\102\M-W-F\\grade\A."

Other students may also be added or may be present. For example, another student having another student II) may be provided, and may be in the same class. For example, "m:COLLEGE:student\Alice\Smith\STUID546" may be instanced as the second listed instance into "s:FALL_2015:course\English\102\M-W-F\\grade\A," in this case corresponding to a different "Alice Smith" than the first, having a student ID of "546," This may result in "s:FALL_2015:course\English\102\M-W-F\\student\Alice\Smith\STUID546\\grade\A."

It may be desired to remove a particular course. For example, the terminating master mutable tag with the immutable tag list of "m:COLLEGE:course\English\102\M-W-F" may be deleted, resulting in "s:FALL_2015:employee\professor\Robert\Johnson\EMPID546," "s:FALL_2015:student\Alice\Smith\STUID123," and "s:FALL_2015:student\Alice\Smith\STUID546\\grade\A."

The data structure may also support multiple entries for the same course, or multiple courses having the same course number. For example, two of the terminating master mutable tags provided earlier, "m:COLLEGE:9 am" and "m:COLLEGE:2pm," may be assigned onto "m:COLLEGE:course\English\102\T-Th," resulting in the new terminating master mutable tags of "m:COLLEGE:course\English\102\T-Th\9 am" and "m:COLLEGE:course\English\102\T-Th\2pm." This may represent a morning English 102 class and an afternoon English 102 class. This operation may further demonstrate that tags may be managed strictly from within a master tag pyramid as well as by instancing into slave tag pyramids.

It may then be desirable to assign students or a professor to the course. For example, the master immutable tag list "m:COLLEGE:course\English\102\T-Th\9 am" may then be instanced as the first listed instance into "s:FALL_2015:employee\professor\Robert\Johnson\EMPID546" and "s:FALL_2015:student\Alice\Smith\STUID123," resulting in "s:FALL_2015:course\English\102\T-Th\9 am\\employee\professor\Robert\Johnson\EMPID546" and "s:FALL_2015:course\English\102\T-Th\9 am\\student\Alice\Smith\STUID123."

Other students or professors may be assigned to one of the other courses. For example, "m:COLLEGE:course\English\102\T-Th\2pm" may be instanced as the first listed instance into "s:FALL_2015:student\Alice\Smith\STUID546\\grade\A," resulting in "s:FALL_2015:course\English\102\T-Th\2pm\\student\Alice\Smith\STUID546\\grade\A."

It may again be desired to rename a tag, which may be done by renaming a master immutable tag. For example, according to an exemplary embodiment, it may be desired to change the name of a master immutable tag corresponding to the name of a course; for example, "English" in "m:COLLEGE:course\English\102\T-Th\2pm" may be renamed to "Drawing," resulting in "m:COLLEGE:course\Drawing\102\T-Th\2pm" and "s:FALL_2015:course\Drawing\102\T-Th\2pm\\student\Alice\Smith\STUID546\\grade\A."

It may be desired to delete another terminating master mutable tag. For example, the master immutable tag list "m:COLLEGE:course\English\102\T-Th" may be deleted.

It may be desired to remove multiple instances from within a terminating slave mutable tag. For example, two successive instances within a slave mutable tag list, such as "student\Alice\Smith\STUID546" and "grade\A," may be removed from the slave mutable tag list, which in this case is "s:FALL_2015:course\Drawing\102\T-Th\2pm\\student\Alice\Smith\STUID546\\grade\A." Removing these instances from within the larger slave immutable tag list may thus result in "s:FALL_2015:course\Drawing\102\T-Th\2pm."

It may be desired to delete another terminating master mutable tag. For example, "m:COLLEGE:course\Drawing\102\T-Th\2pm" may be deleted. This may result in the deletion of "s:FALL_2015:course\Drawing\102\T-Th\2pm."

Individual tags in a master immutable tag list may be removed; for example, "9 am" in "m:COLLEGE:course\English\102\T-Th\9 am" may be removed, resulting in "m:COLLEGE:course\English\102\T-Th," "s:FALL_2015:course\English\102\T-Th\\employee\professor\Robert\Johnson\EMPID546," and "s:FALL_2015:course\English\102\T-Th\\student\Alice\Smith\STUID123."

It may be desired to add a new time at which courses can be held. For example, "time\7pm" may be assigned onto the root tag of "m:COLLEGE," resulting in "m:COLLEGE:time\7pm."

It may then be desired to assign a course to the 7:00 PM time. For example, "m:COLLEGE:time\7pm" may then be instanced as the second listed instance onto "s:FALL_2015:course\English\102\T-Th\\employee\professor\Robert\Johnson\EMPID546" and "s:FALL_2015:course\English\102\T-Th\\student\Alice\Smith\STUID123," resulting in "s:FALL_2015:course\English\102\T-Th\\time\7pm\\employee\professor\Robert\Johnson\EMPID546" and "s:FALL_2015:course\English\102\T-Th\\time\7pm\\student\Alice\Smith\STUID123."

It may again be desired to change the number of a course. For example, "102" in "m:COLLEGE:course\English\102\T-Th" may be renamed to "103," resulting in "m:COLLEGE:course\English\103\T-Th," "s:FALL_2015:course\English\103\T-Th\\employee\professor\Robert\Johnson\EMPID546," "s:FALL_2015:course\English\103\T-Th\\student\Alice\Smith\STUID123," "s:FALL_2015:course\English\103\T-Th\\time\7pm\\employee\professor\Robert\Johnson\EMPID546," and "s:FALL_2015:course\English\103\T-Th\\time\7pm\\student\Alice\Smith\STUID123."

According to another exemplary embodiment, a tag pyramid may also be organized in the form of a search engine tag pyramid. As in the previous case, a search engine tag pyramid may be a Tag Pyramid Data Management Application that, in some embodiments, may be formed using a system incorporating aspects of a System for Organizing Computer Data, or may be formed using another system, as may be desired. In an exemplary embodiment, a search engine tag pyramid may include a root tag, and may constitute or may include a displayed or non-displayed hierarchy of mutable tags that may not be (or may not necessarily be) mapped to a hierarchical structure of files and folders. Rather, these mutable tags may be used to represent keywords, and each terminating mutable tag may be mapped to a particular address.

For example, according to an exemplary embodiment of a search engine tag pyramid, keywords may be stored as immutable tags in immutable tag lists for a tag pyramid's terminating mutable tags, which may each be associated with a particular address. This may allow the search engine tag pyramid to be responsive to keyword-based queries; according to an exemplary embodiment, upon a user entering a keyword-based query, addresses with relative keywords in their respective immutable tag lists may be retrieved.

In an exemplary embodiment, a search engine tag pyramid's addresses can be referenced in, and by, their respective terminating mutable tags or an associated address mappings file or database. In the context of a search engine tag pyramid, an "address" may be a unique identifier for an Internet/intranet/network/virtual world/file server/database server location, such as a Uniform Resource Locator (URL), Internet Protocol (IP) address, three-dimensional virtual world (3D) address, file path, database field, etc.

In an exemplary embodiment of a search engine tag pyramid, as mentioned, each terminating mutable tag may represent an address. Each address may in turn be associated with an immutable tag list; according to an exemplary embodiment, this immutable tag list may be defined by its respective administrator (for example, by a website administrator, a video-sharing website (e.g. YOUTUBE) account holder, or a 3D address account holder) or by another method, such as a crawler program. When a user searches for addresses, the query's keywords may be processed against the search engine tag pyramid. Any terminating mutable tags with immutable tag lists that totally/partially match the query's list of keywords may then be used to reply to the user with address links, providing the user with a search result.

According to an exemplary embodiment, addresses with identical immutable tag lists may be automatically sequenced using their lowest-level immutable tag. In an exemplary embodiment, one or more of the addresses may have a higher search engine rank, which may be based on some arbitrary criteria and which may indicate that those addresses are to be shown in a higher position on a search engine search results screen. In such an embodiment, automatic sequencing may take into account the search engine rank of the address-mapped sequence members when performing automatic sequencing; for example, address-mapped sequence members having a higher search engine rank may be listed higher in the sequence. If all of such addresses have the same search engine rank, then, according to an exemplary embodiment, a group may be formed instead. If some of the addresses have the same search engine rank and others of them do not, then, according to an exemplary embodiment, a sequence may be formed, and matching search engine rank members may be grouped within a sequence member according to their place in the sequence. In an exemplary embodiment, a rule may be established whereby an address that is secondary to a sequence does not join, or must disjoin, that sequence.

Various exemplary embodiments illustrating the function of exemplary tag pyramid configurations may now be provided. Turning now to exemplary FIG. 1, FIG. 1 displays an exemplary embodiment of a tag pyramid data management system 100 having a particular configuration. According to an exemplary embodiment, a user may create a tag pyramid in the tag pyramid data management system 100 by associating a file 104 with a root tag 102. In an exemplary embodiment, this association may be made by, for example, dragging and dropping the file 104 onto a root tag 102 in a graphical user interface.

In an embodiment, the root tag 102 may be associated with a tag list 106, which may start out empty. In an exemplary embodiment, a tag list 106 may be shown for a particular file 104 when the file 104 is selected, which may be shown here by a darker border drawn around the display of the file 104, or more specifically the display of one or more of the tags 108 associated with the file 104. Likewise, a number of tags 108 may be presented in boldface, which may indicate that the tag 108 has been newly added or has been recently modified.

A file 104 that is dragged onto the root tag 102 or otherwise associated with the root tag 102 may have one or more tags 108 associated with the file 104, and may also inherit the tags of the root tag 102 onto which the file 104 is dragged. According to an exemplary embodiment, a root tag 102 may have an empty immutable tag list 106, and, by dragging and dropping a file 104 onto the root tag 102, the file 104 may inherit the (empty) immutable tag list 106 of the root tag 102.

In an exemplary embodiment, tags may be mutable tags 112 or immutable tags 114. For example, according to the embodiment shown in FIG. 1, each of the tags 108 of the file 104 may be immutable tags 114. However, the file 104 may use the immutable tag 114 "apple" for its mutable tag 112, displaying "apple" in the provided visualization of the tag pyramid data management system 100. The immutable tag 114 "red" may remain associated with the file 104.

According to an exemplary embodiment, the tag pyramid data management system 100 may have one or more presentation options 110 by which a user may change how the tag pyramid data management system 100 is presented in a graphical user interface. For example, according to an exemplary embodiment, a user may be provided with the presentation option of appending, in the graphical user interface, the former file names of the files 104 that have been placed under the root tag 102. Alternatively, a user may be able to select this option on or off, as desired. This may simplify the construction of a tag pyramid 100 by enabling some automation of the manual process of entering tags. For example, according to an exemplary embodiment, a user might select ten files 104 from a file manager, each with different file names, and may drag and drop them all at once on a mutable tag (such as a root tag 102) in a tag pyramid 100. This may cause all of the files 104 to inherit the same immutable tag list 106. The user may then make use of the filename append option 110 in order to configure the tag pyramid system 100 to automatically distinguish the newly-added files 104 by their last tag. In another exemplary embodiment, other graphical display options may be available, as desired.

Figure 2:
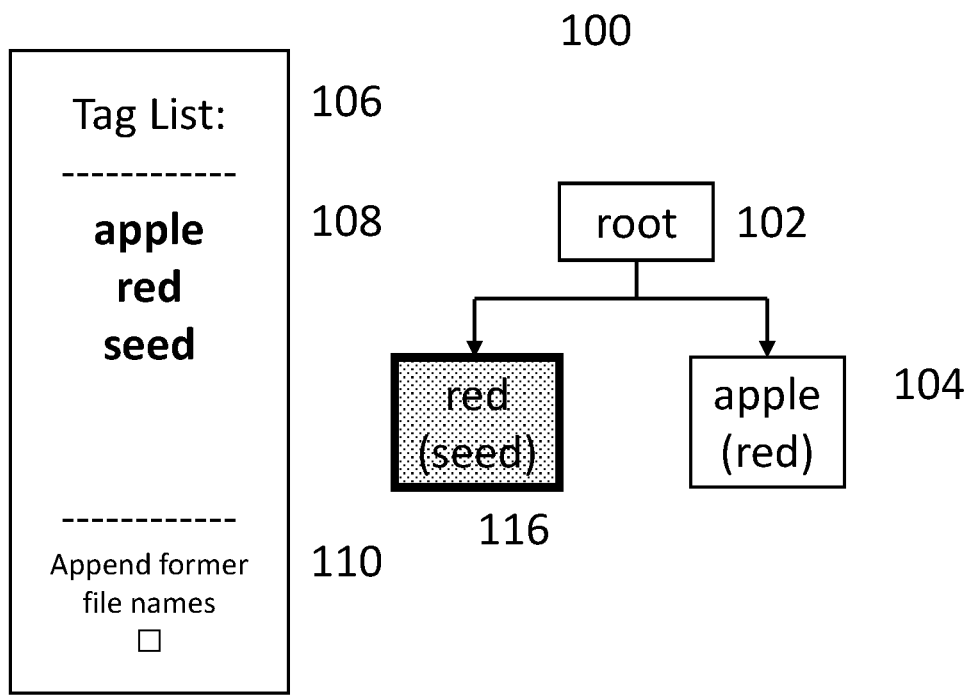
FIG. 2 is an exemplary embodiment of a tag pyramid data structure.

Turning now to exemplary FIG. 2, in an exemplary embodiment, a new file 116 having a new tag 108 may be added under the root tag 102. For example, according to an exemplary embodiment, a new file 116 may be dragged onto the mutable file tag of the "apple" file 104 in order to cause the new file 116 to inherit the immutable tag list 106 of the "apple" file 104, as well as add the new tag 108 "seed" to the inherited immutable tag list 106.

According to an exemplary embodiment, the color of a tag may be used to indicate the status level of a tag. For example, according to an exemplary embodiment, the mutable tag of the new file 116 may be provided in a different color to show that it is secondary to the "apple" tag 104 displayed by its peer in the tag pyramid 100. For example, the "red" tag 116 may be provided in purple, while the "apple" tag may be provided in red. This may be indicated in FIG. 2 (and in subsequent figures) by shading provided in the tag box of the file having the secondary tag 116.

Figure 3:
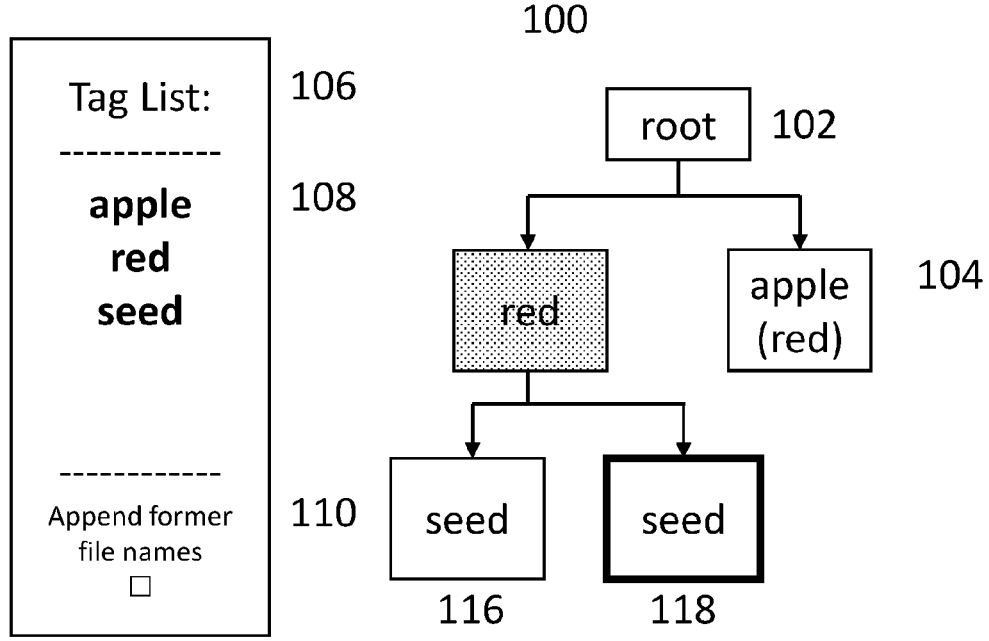
FIG. 3 is an exemplary embodiment of a tag pyramid data structure.

Turning now to exemplary FIG. 3, in an exemplary embodiment, a new file 118 having the tag list 106 "apple\red\seed" may be saved onto the root tag 102. This may cause the file 118 to be stored under the "red" tag, such that the "seed" mutable file tag of the new file 118 appears alongside the "seed" mutable file tag of the other file 116 also having the tag list 106 "apple\red\seed."

Figure 4:
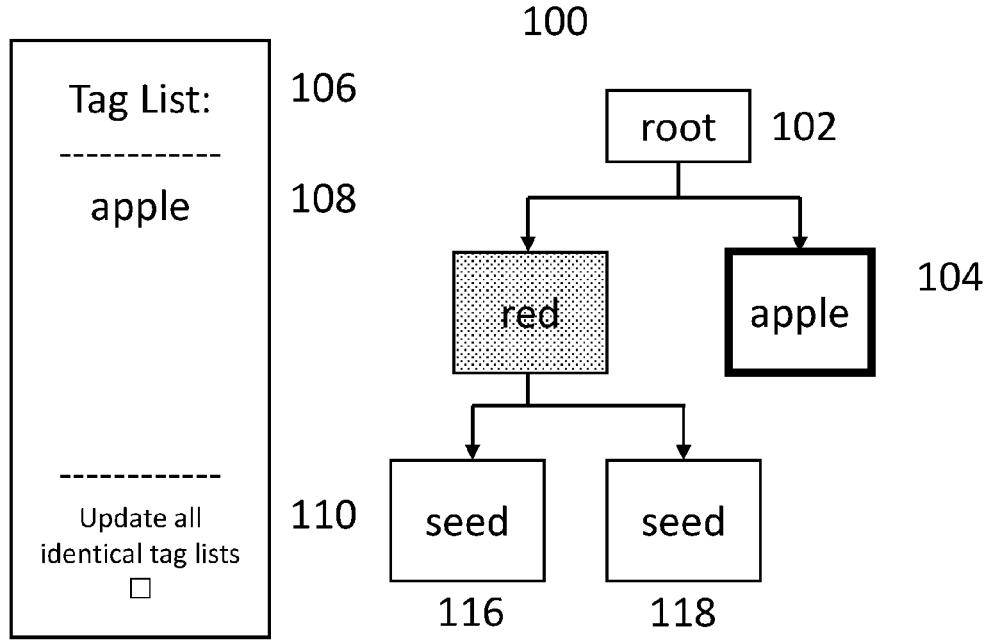
FIG. 4 is an exemplary embodiment of a tag pyramid data structure.

Turning now to exemplary FIG. 4, in an exemplary embodiment, tags 108 may also be removable from a particular file 104. For example, according to an exemplary embodiment, a file 104 having the tags 108 "apple" and "red" may have the immutable tag "red" removed from the mutable tag "apple," leaving only "apple" left in the tag list 108.

According to an exemplary embodiment, modification to any one tag 108 in a tag list 106 may alter the one or more options 110 that are available to a user to select. For example, according to an exemplary embodiment, when a user modifies a tag 108 in any tag list 106, a user may have the option to update all identical tag lists 110. Selecting this option may make similar modifications to all identical tag lists or to a selection of identical tag lists, as may be desired.

Figure 5:
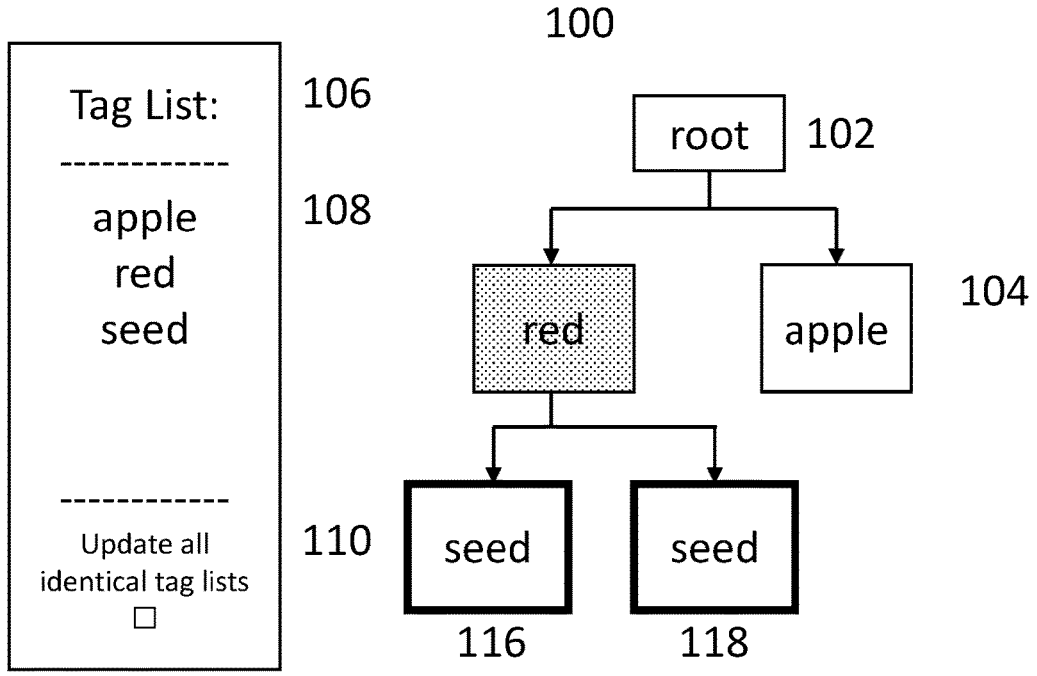
FIG. 5 is an exemplary embodiment of a tag pyramid data structure.
Figure 6:
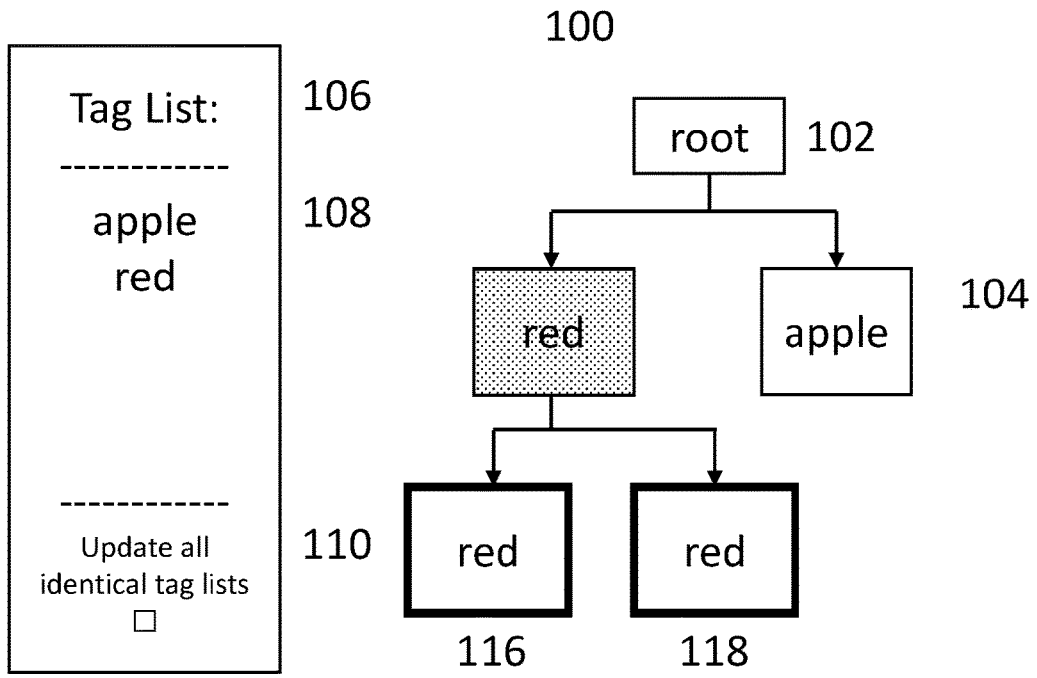
FIG. 6 is an exemplary embodiment of a tag pyramid data structure.

Turning now to exemplary FIG. 5, according to an exemplary embodiment, a user may select multiple mutable tags, such as the "seed" mutable file tags associated with the two selected files 116, 118, and may modify the common portion of the immutable tag lists of these two selected files 116, 118. The common portion of the immutable tag lists of these two selected files 116, 118 may be shown in the tag list 106. The result of a user deleting the "seed" immutable tag common to each of the selected files 116, 118 may be shown in exemplary FIG. 6.

Figure 7:
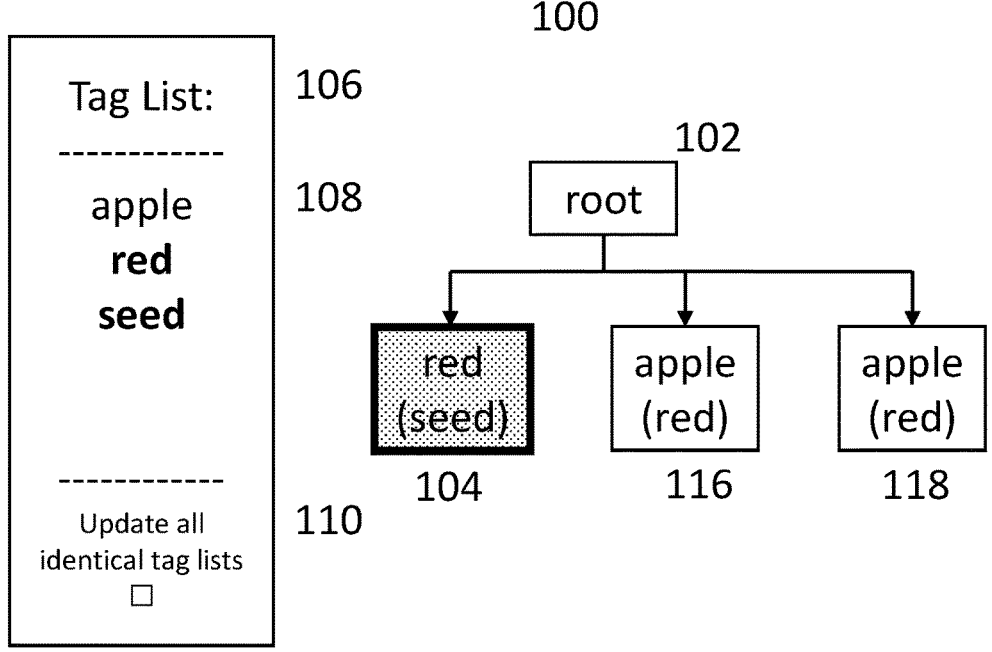
FIG. 7 is an exemplary embodiment of a tag pyramid data structure.

Turning now to exemplary FIG. 7, a user may be able to select the "apple" mutable file tag (associated with the file 104 displayed on the right-hand side of the tag pyramid data management system 100 as presented in the graphical user interface) and add "red\seed" to its immutable tag list 106. The tag pyramid data management system 100 may automatically restructure, such that the two files 116, 118 previously tagged with "apple" and "red" are now associated with the mutable tag "apple" and the immutable tag "red," and such that the file 104 now tagged with "apple," "red," and "seed" is now displayed on the left side of the tag pyramid data management system 100.

Figure 8:
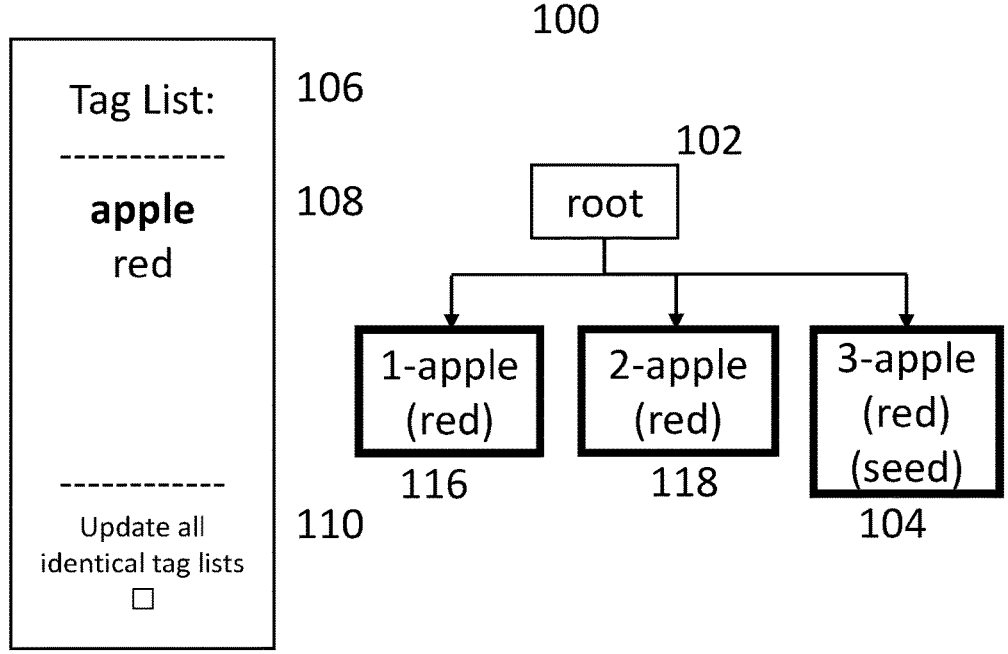
FIG. 8 is an exemplary embodiment of a tag pyramid data structure.

Turning now to exemplary FIG. 8, a user may be able to select the root tag 102 in order to select all of the mutable file tags in the tag pyramid 100. The user may then be able to select the common "apple" immutable tag, and may then be able to form an "apple" sequence based on this common "apple" immutable file tag. Sequence members, shown under the "apple" sequence, may be retracted secondary mutable file tags.

Figure 9:
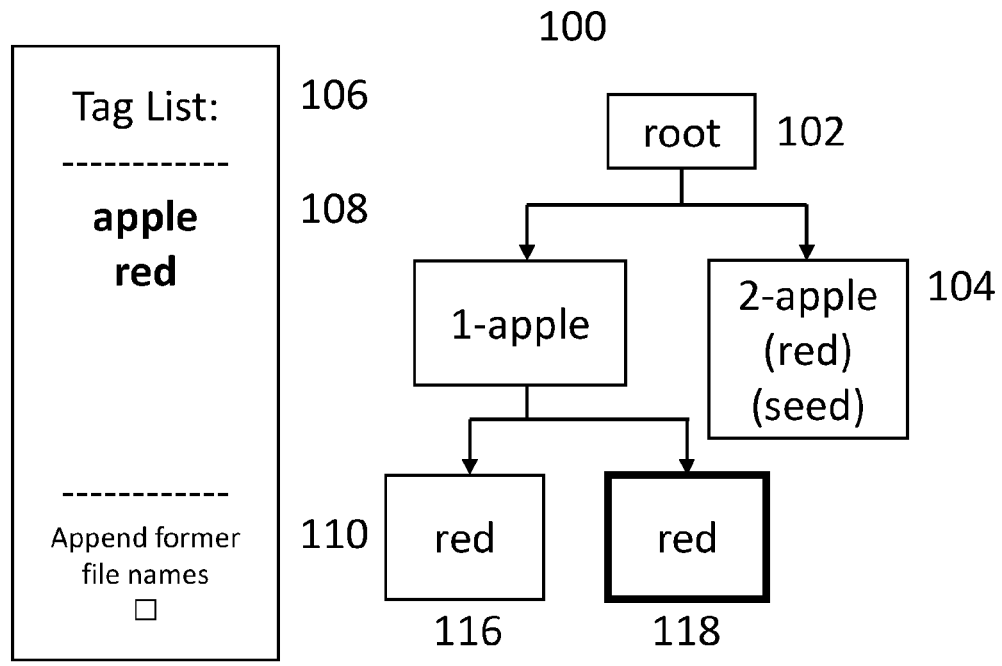
FIG. 9 is an exemplary embodiment of a tag pyramid data structure.

Turning now to exemplary FIG. 9, a user may be able to move the "1-apple" mutable file tag corresponding to a first file 116 onto the "2-apple" mutable file tag corresponding to a second file 118. This may have the result of joining the first sequence member to the second sequence member. This may cause the mutable file tag of the first file 116 ("red") and the mutable file tag of the second file 118 ("red") to be shown under the "1-apple" mutable folder tag. The mutable file tag of the third entry in the sequence, the mutable file tag associated with the third file 104, may be renumbered from "3-apple" to "2-apple."

Figure 10:
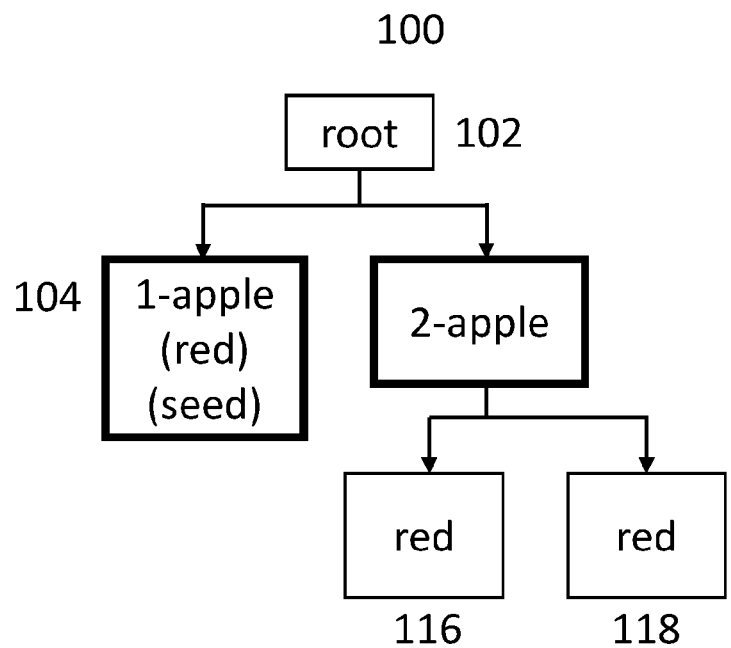
FIG. 10 is an exemplary embodiment of a tag pyramid data structure.

Turning now to exemplary FIG. 10, a user may be able to reorder the sequence members. For example, according to an exemplary embodiment, a mutable tag associated with a first item in a sequence ("1-apple") may be changed, by changing its position, to a mutable tag associated with a second (or other) item in a sequence (such as "2-apple"). Likewise, a mutable tag associated with a later item in a sequence ("2-apple") may be renumbered to a mutable tag associated with an earlier item in a sequence ("1-apple").

Figure 11:
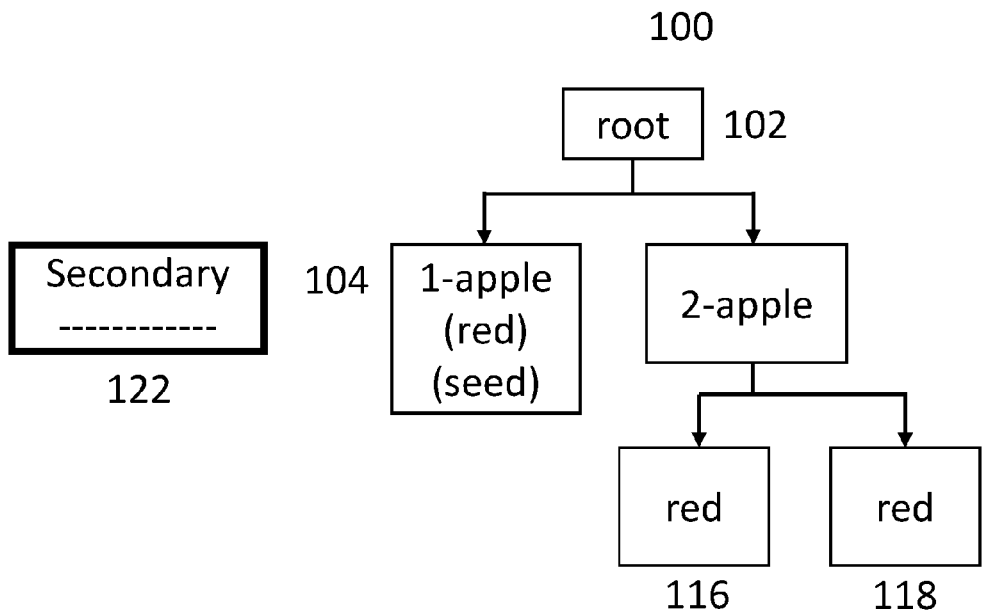
FIG. 11 is an exemplary embodiment of a tag pyramid data structure.

Turning now to exemplary FIG. 11, a user may be able to add a file 120 having the same common "apple" mutable tag that serves as the basis for the sequence, without joining this file to the sequence. For example, according to an exemplary embodiment, a user may add a file 120 having the immutable tag list 106 "apple\red." in an embodiment, a user may add this file 120 without joining it to the sequence by dragging the file 120 onto a designated area at the left side of the sequence, which may be marked with a "Secondary" box 122. Alternatively, the file 120 may be dragged and dropped elsewhere or may otherwise be added.

Figure 12:
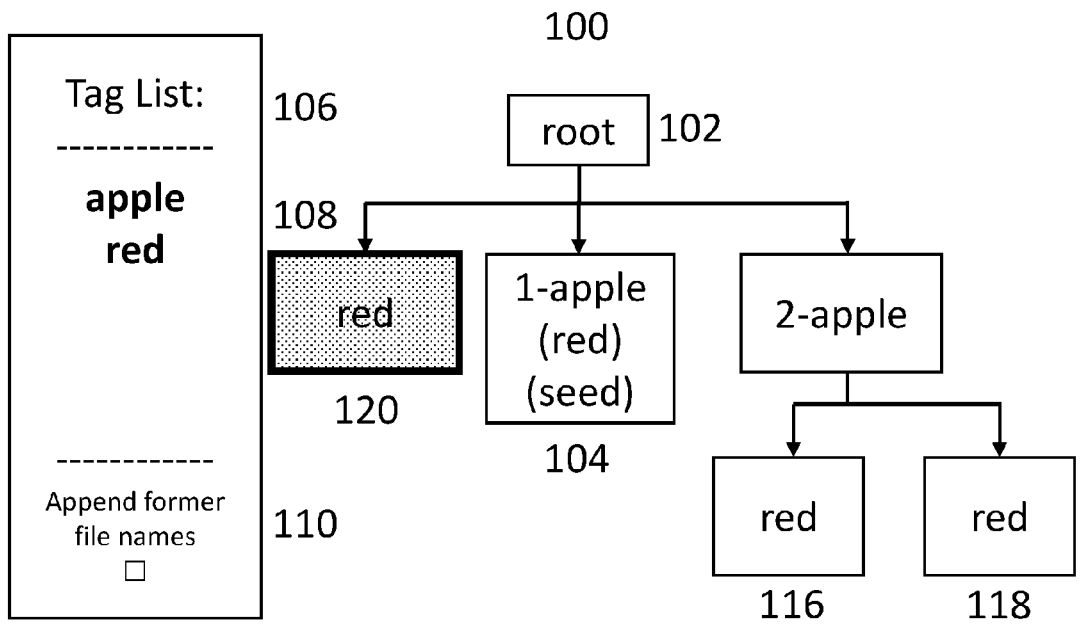
FIG. 12 is an exemplary embodiment of a tag pyramid data structure.

Turning now to exemplary FIG. 12, upon adding the new file 120, the file 120 may inherit the immutable tag list 106 of the "apple" sequence. However, according to an exemplary embodiment, the immutable tag list 106 of the new file 120 must have at least one additional immutable tag 108 in order to make the mutable tag of the new file 120 secondary to the sequence's "apple" immutable tag 108. In this case, the new file 120 may have the "red" immutable tag 108 associated with it, and as such the immutable tag 108 "red" may be added to the immutable tag list 106 of the new file 120.

Figure 13:
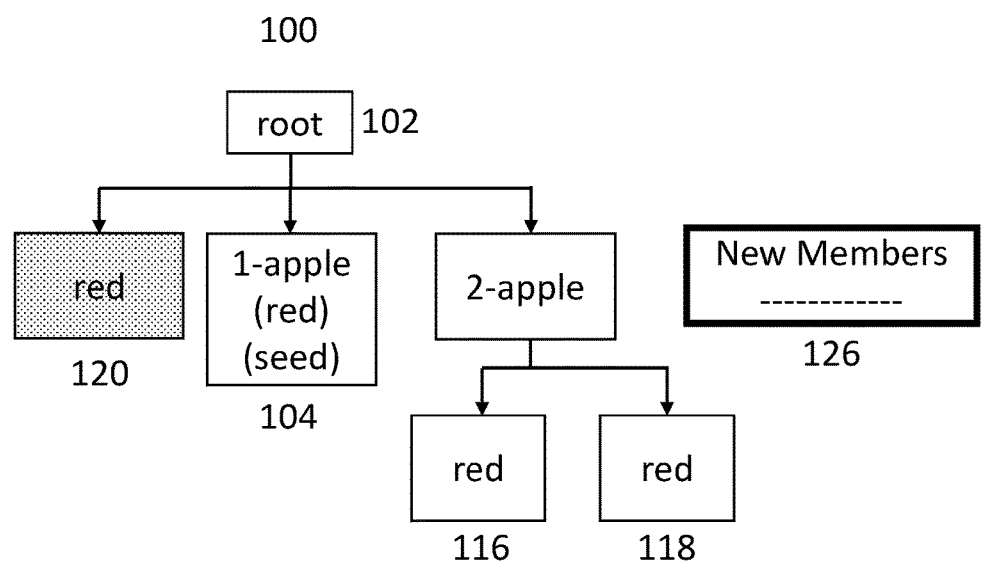
FIG. 13 is an exemplary embodiment of a tag pyramid data structure.

Turning now to exemplary FIG. 13, a file 124 having an "apple" mutable file tag may be added as a new sequence member. In an embodiment, this may be accomplished by, for example, dragging and dropping the file 124 onto a designated area to the right side of the sequence 126, which may be labeled "New Members." Alternatively, the file 124 may otherwise be added.

Figure 14:
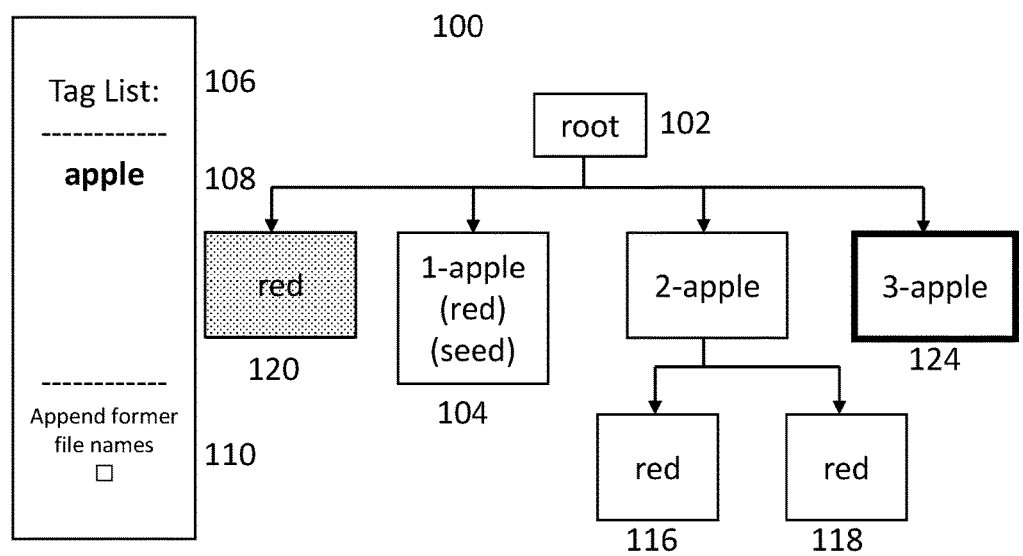
FIG. 14 is an exemplary embodiment of a tag pyramid data structure.

Turning now to exemplary FIG. 14, an exemplary result of adding the file 124 may be shown. The file 124 may inherit the "apple" sequence's immutable tag list 106, and, if appropriate, additional immutable tags 108 may be added to the tag list 106. In this case, no immutable tags 108 may be added to the immutable tag list 106, leaving the newly-added file 124 with the sole immutable tag 108 of "apple." The file 124 may be represented in the sequence with the mutable tag of "3-apple."

Figure 15:
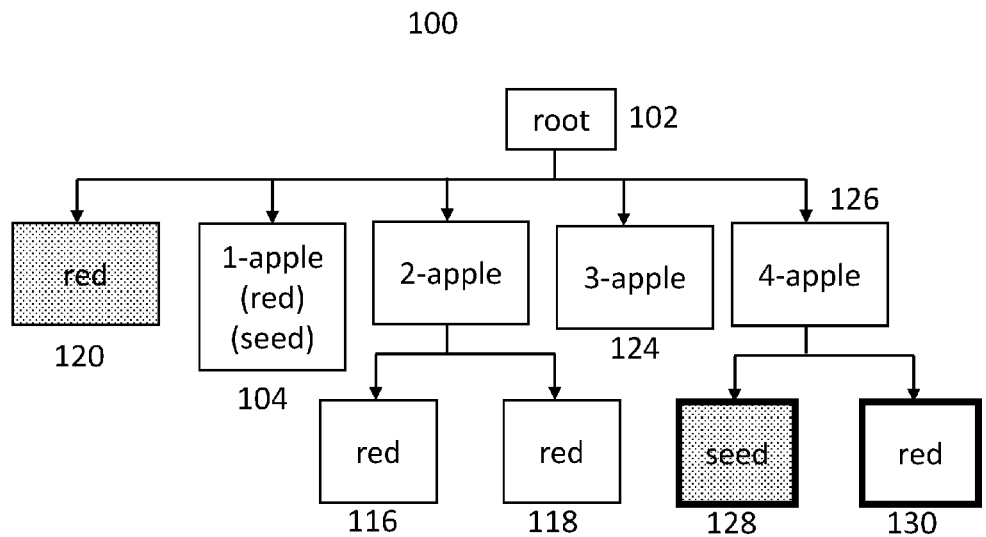
FIG. 15 is an exemplary embodiment of a tag pyramid data structure.

Turning now to exemplary FIG. 15, a plurality of new mutable file tags may be added as one new sequence member 126. For example, according to an exemplary embodiment, the mutable file tags "apple\red" 130 and "apple\red\seed" 128 may be added as a single new sequence member 126. The mutable tags "red" and "seed" may be shown under the single new sequence member "4-apple" 126.

Figure 16:
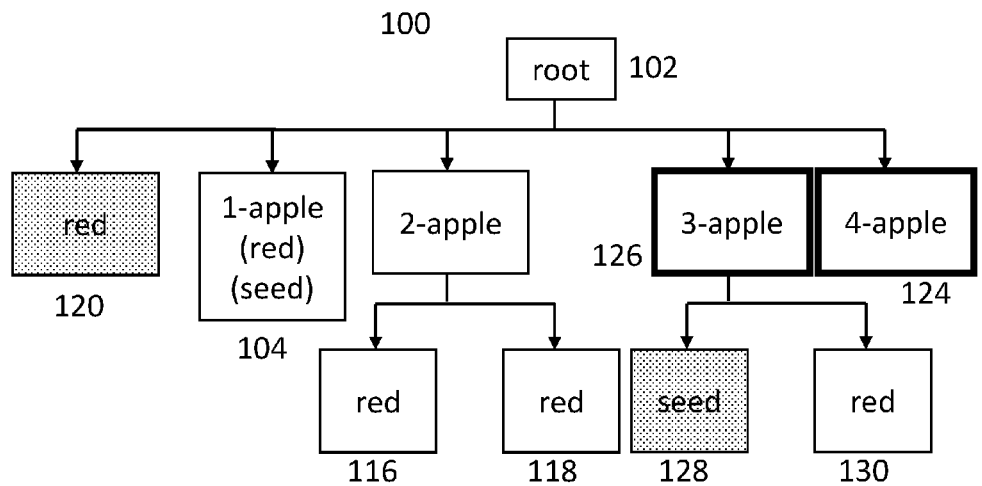
FIG. 16 is an exemplary embodiment of a tag pyramid data structure.

Turning now to exemplary FIG. 16, file tags in the sequence may be reordered. For example, the "3-apple" sequence member and the "4-apple" sequence member may be reordered, leaving the former "3-apple" sequence member as the new "4-apple" sequence member 124, and leaving the former "4-apple" sequence member as the new "3-apple" sequence member 126.

Figure 17:
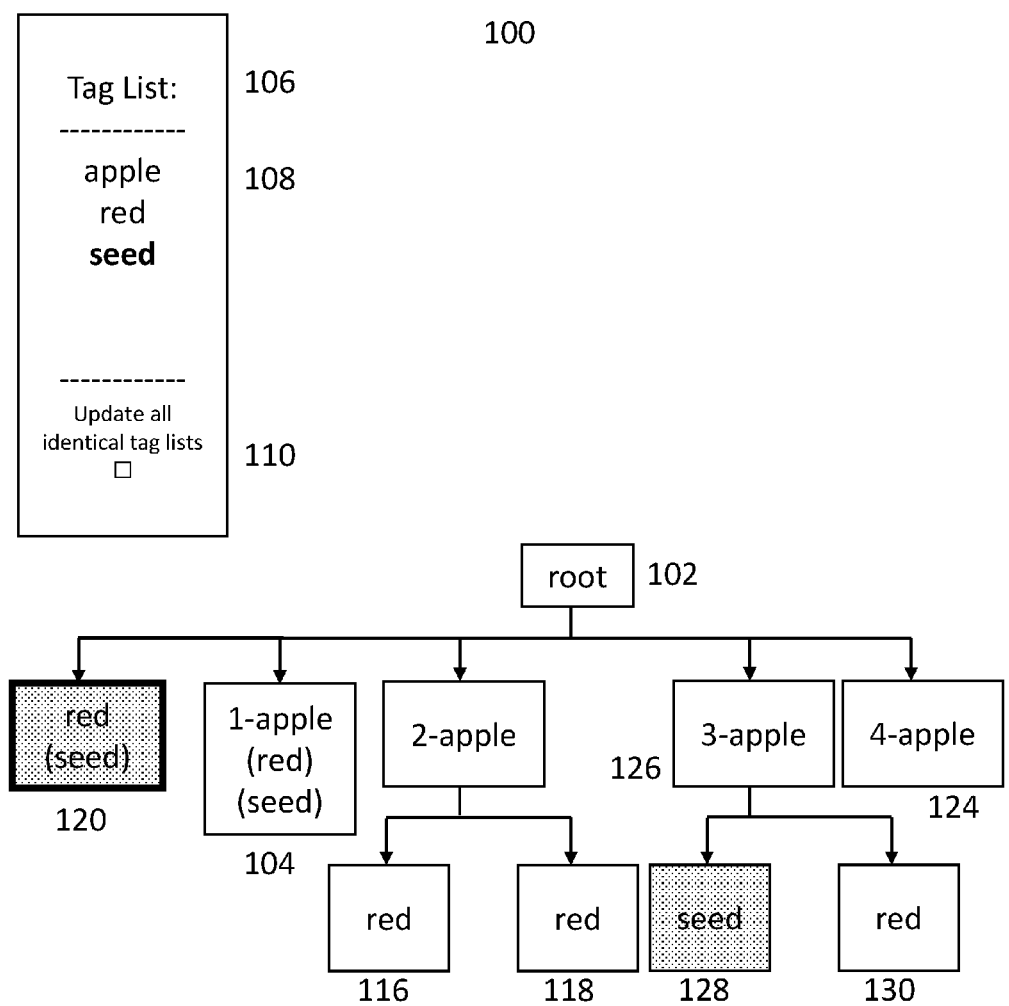
FIG. 17 is an exemplary embodiment of a tag pyramid data structure.

Turning now to exemplary FIG. 17, the "red" mutable file tag 120, which is not joined to a sequence member, may be selected. The tag "seed" may then be added to the immutable tag list 106 of the "red" mutable file tag 120.

Figure 18:
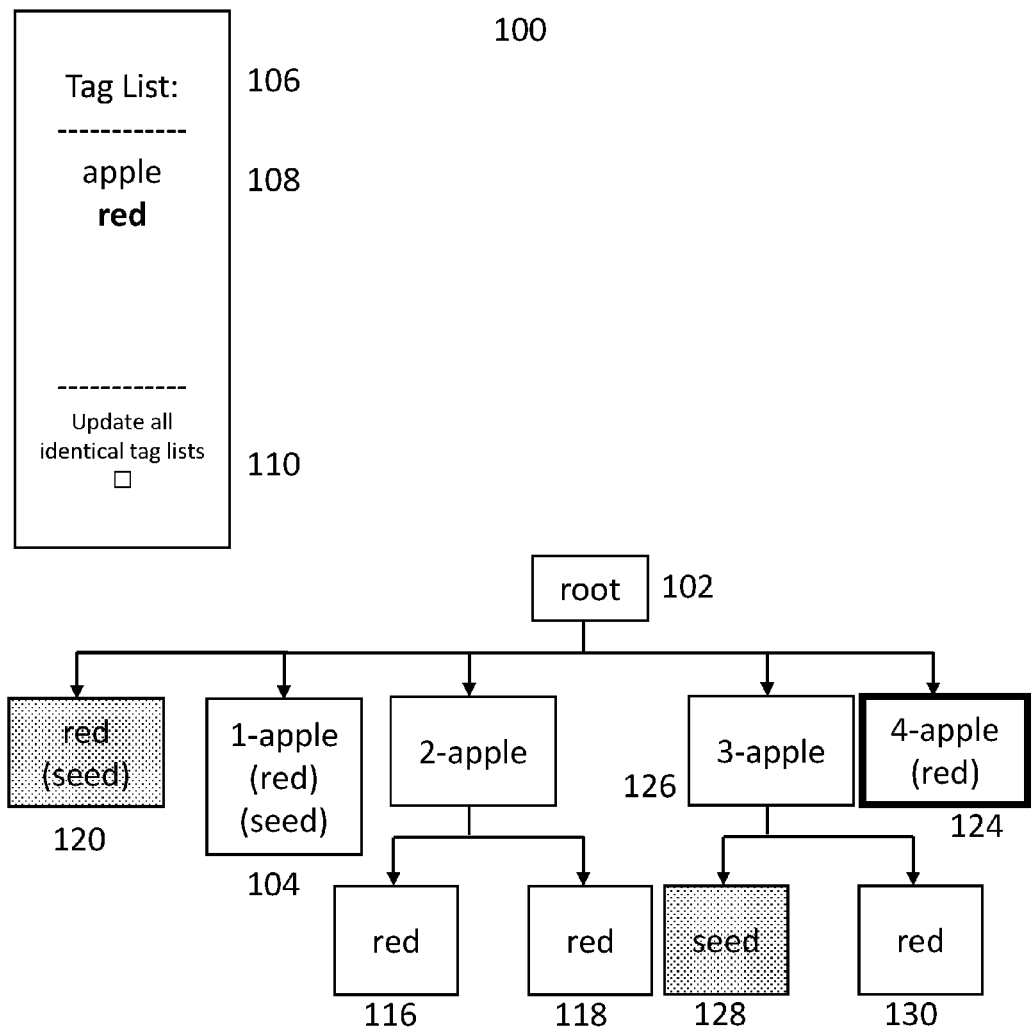
FIG. 18 is an exemplary embodiment of a tag pyramid data structure.

Turning now to exemplary FIG. 18, the "4-apple" sequence member 124 may be selected, and the tag "red" added to the immutable tag list 106 of the sequence member 124. According to the exemplary embodiment shown in FIG. 18, this may mean that all sequence members in the "1-apple" to "4-apple" sequence have both the common tag "apple" and the common immutable tag "red."

Figure 19:
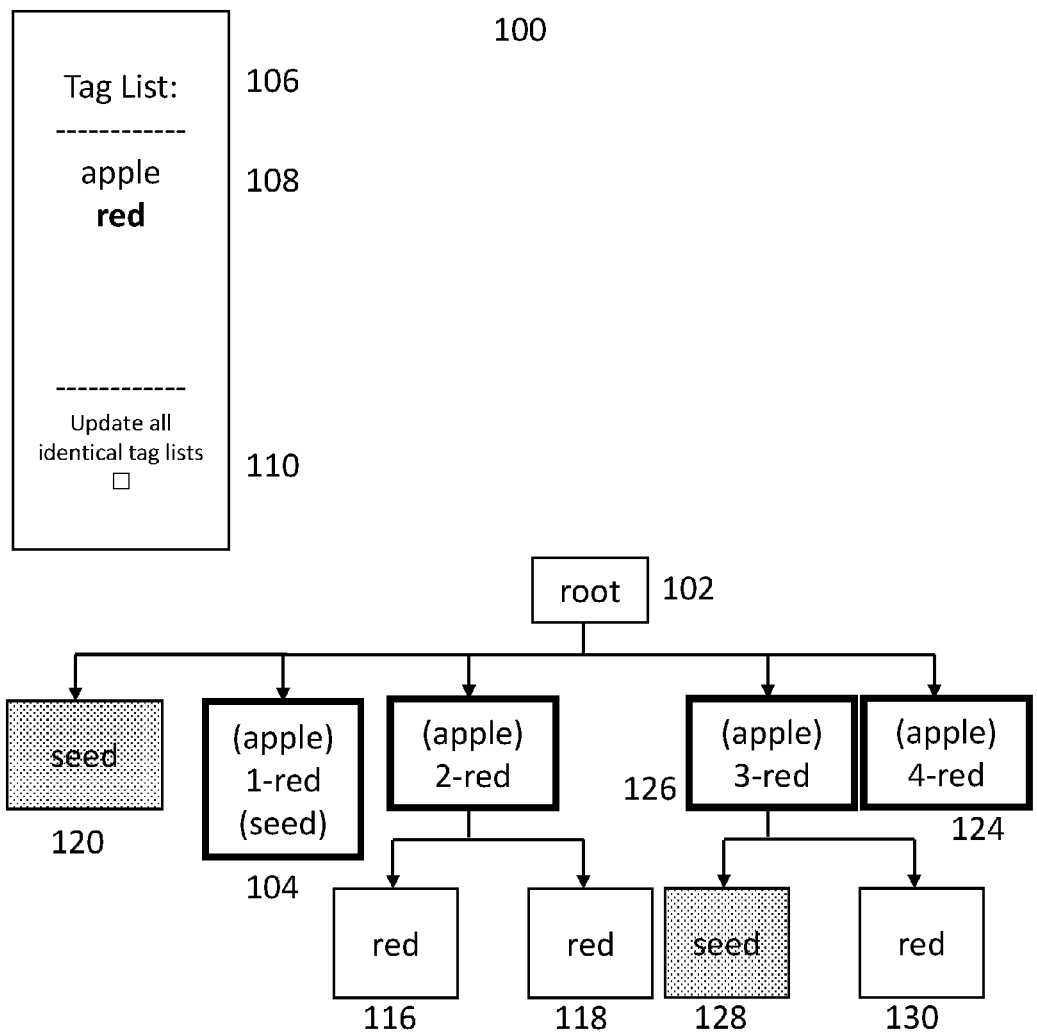
FIG. 19 is an exemplary embodiment of a tag pyramid data structure.

Turning now to exemplary FIG. 19, the "apple" sequence may be directed to use the lower-level "red" immutable tag, which is common between each of the members of the sequence.

Figure 20:
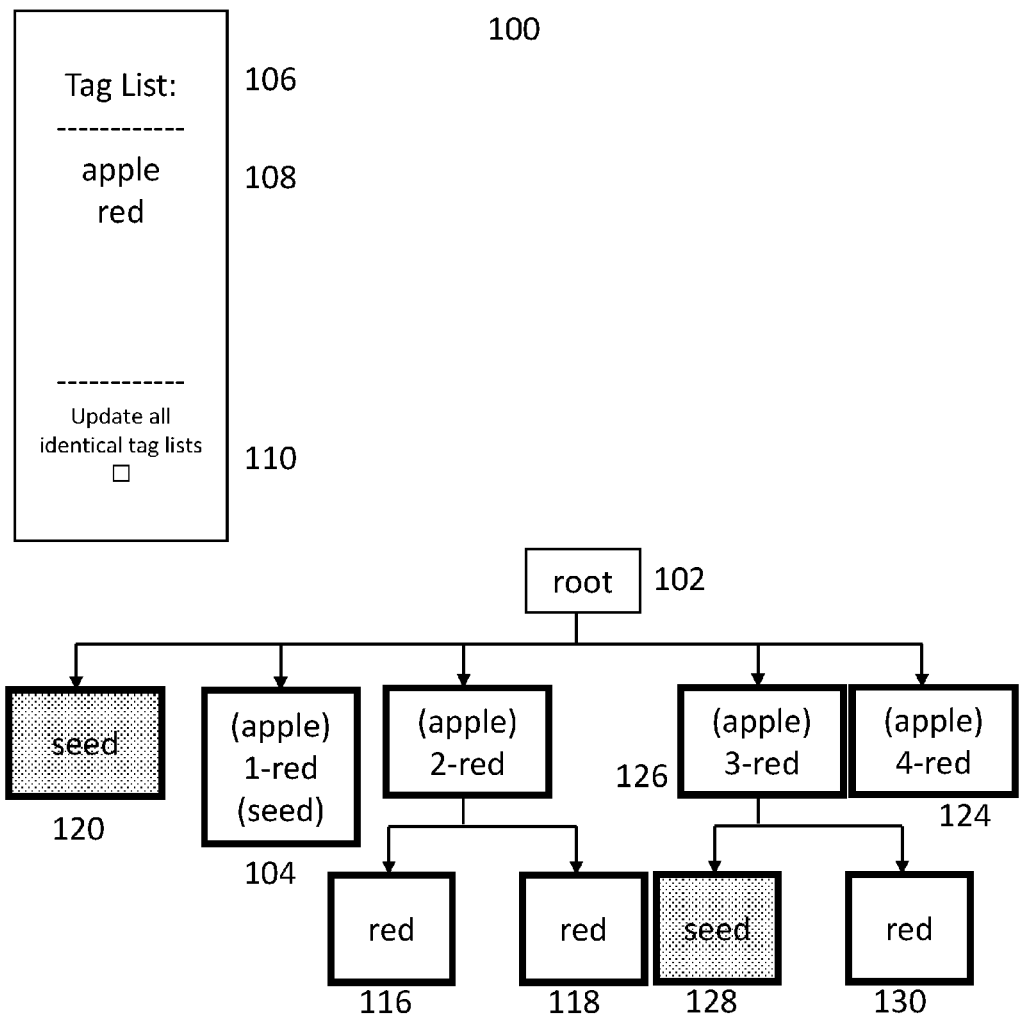
FIG. 20 is an exemplary embodiment of a tag pyramid data structure.

Turning now to exemplary FIG. 20, the "red" sequence members, as well as the "seed" mutable file tag 120 not joined to a sequence member (which in this case reflects the tag list "apple\red\seed") may be selected. This may allow a user to modify the common portion of the immutable tag lists 106 associated with these mutable tags. In this case, the common portion of the immutable tag lists 106 may be "apple\red."

Figure 21:
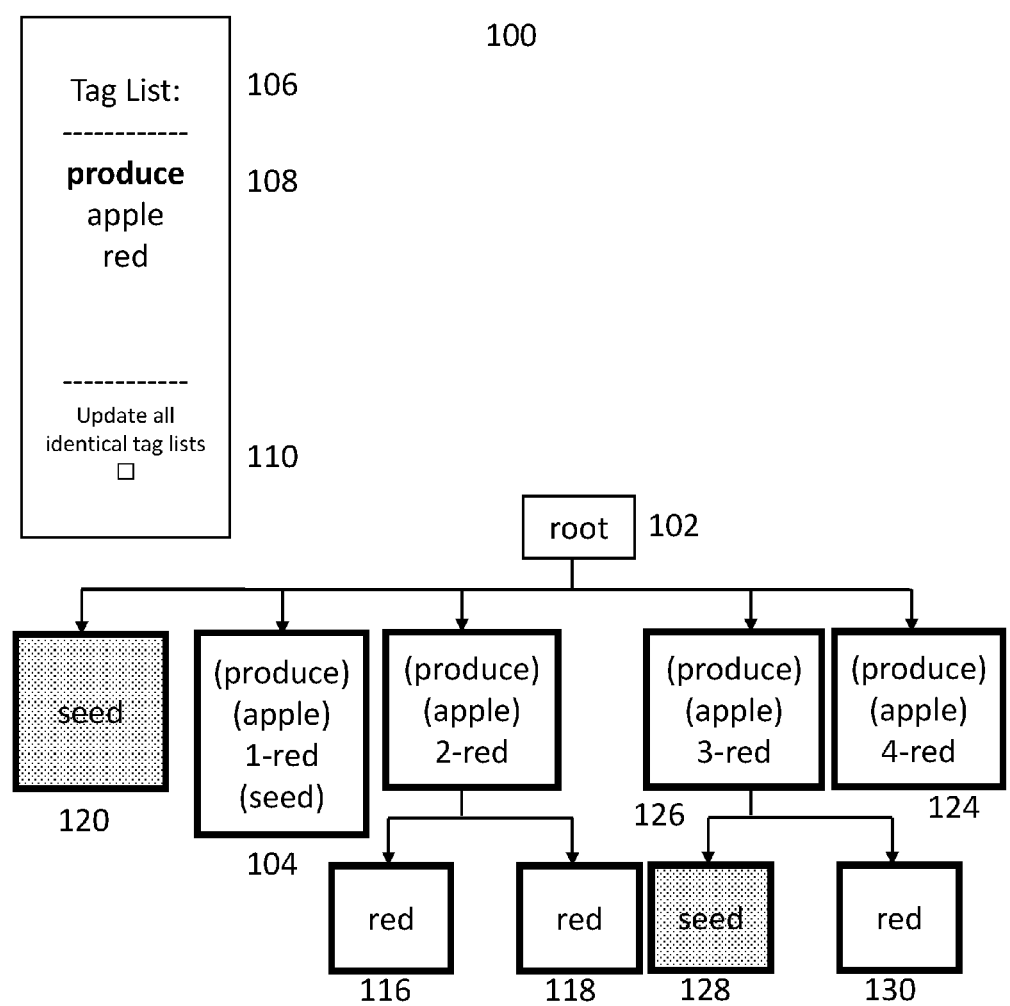
FIG. 21 is an exemplary embodiment of a tag pyramid data structure.

Turning now to exemplary FIG. 21, a user may add a "produce" immutable tag 108 to the common immutable tag list 106, above the common "apple" and "red" immutable tags 108. This may add the "produce" immutable tag 108 in the appropriate location in the immutable tag list 106 associated with each of the mutable tags. This may, for example, cause the first sequence member "1-red" 104 to have the tag list "produce\apple\red\seed," and to display the tag 108 "1-red." The other tags that are provided in parentheses, such as (produce) and (apple), are immutable and may be provided in the exemplary embodiment of FIG. 21 for guidance but may not be shown in an exemplary tag pyramid interface. However, in another exemplary embodiment, tags 108 may instead be displayed on a tag pyramid interface exactly as shown in FIG. 21, such that the first sequence member "1-red" displays its mutable tag as "(produce)(apple) 1-red (seed)," reflecting the tag list "produce\apple\red\seed." In another exemplary embodiment, a user may be able to toggle on or off an option to display a full tag list in one or more mutable tags, such as in the mutable tags of one or more files in a sequence, in order to provide additional guidance to the user and facilitate reorganization of the tag pyramid 100. This may optionally be displayed as a presentation option 110, if desired.

Figure 22:
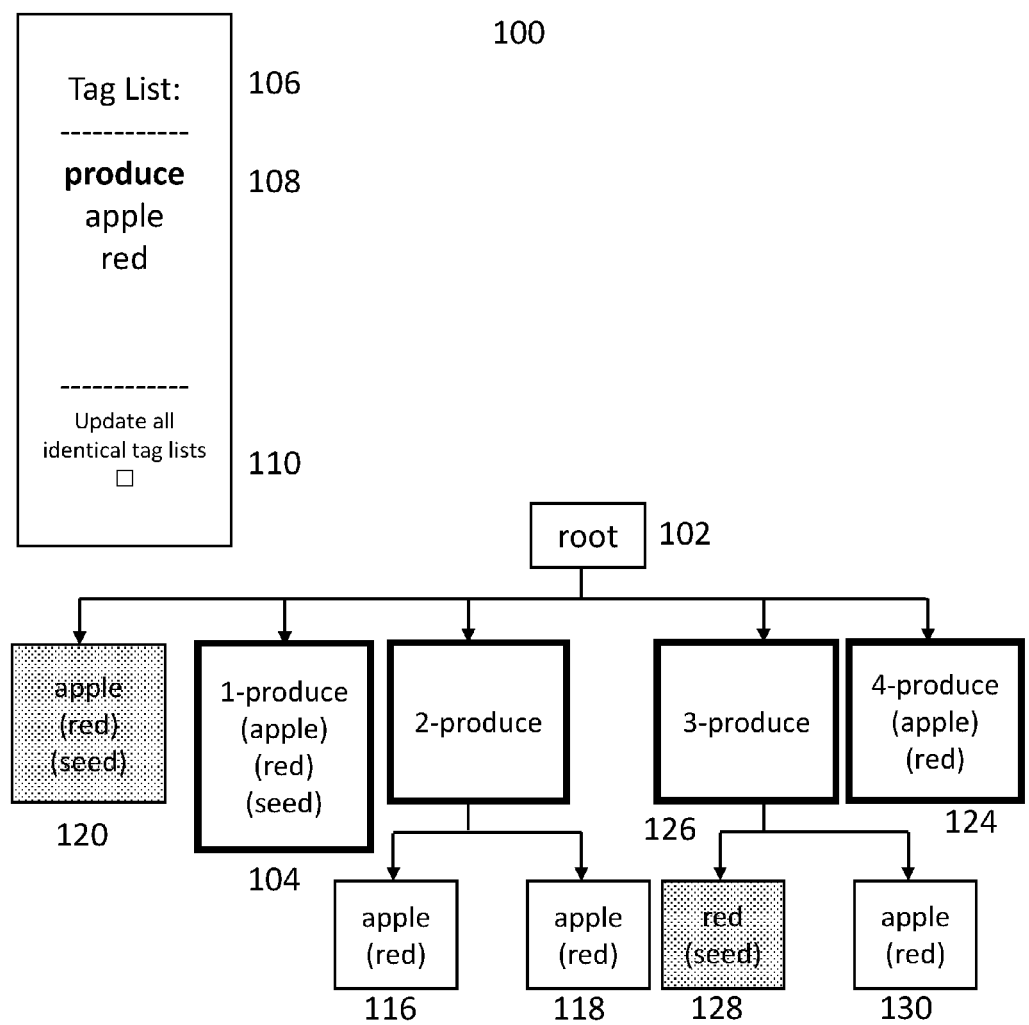
FIG. 22 is an exemplary embodiment of a tag pyramid data structure.

Turning now to exemplary FIG. 22, the "red" sequence may also be directed to use the higher-level "produce" immutable tag. This may change the remaining displayed mutable tags as well.

Figure 23:
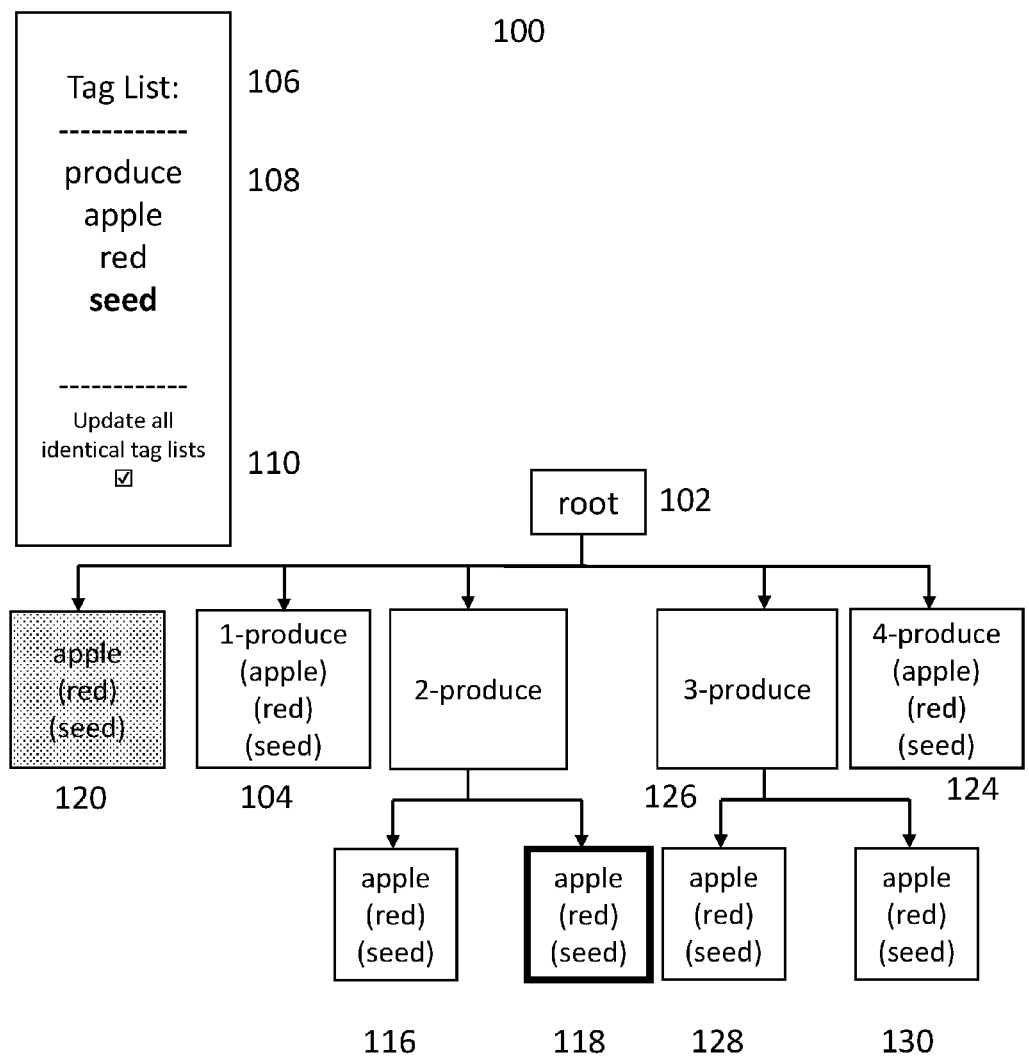
FIG. 23 is an exemplary embodiment of a tag pyramid data structure.

Turning now to exemplary FIG. 23, a user may select a particular mutable file tag, in this case a "2-produce\apple" mutable file tag 118, and may add "seed" to the immutable tag list 106 of this file tag 118. The user may then opt to select, from a list of one or more selection options 110, to identically and simultaneously modify all other mutable file tags having identical immutable tag lists 106. This may modify all of the other mutable file tags that have the immutable tag list 106 "produce\apple\red" to further include the immutable tag 108 "seed." This may include, for example, immutable file tag lists 106 associated with mutable file tags that are outside of the sequence; for example, if mutable file tag 120 was associated with the immutable tag list 106 "produce\apple\red" instead of "produce\apple\red\seed," it may be a valid target for modification. Alternatively, according to another exemplary embodiment, modification of immutable tag lists 106 may be inclusive; that is, any immutable tag list 106 that includes "produce\apple\red" may be modified to include "seed" if the "seed" immutable tag 108 is not included already.

Figure 24:
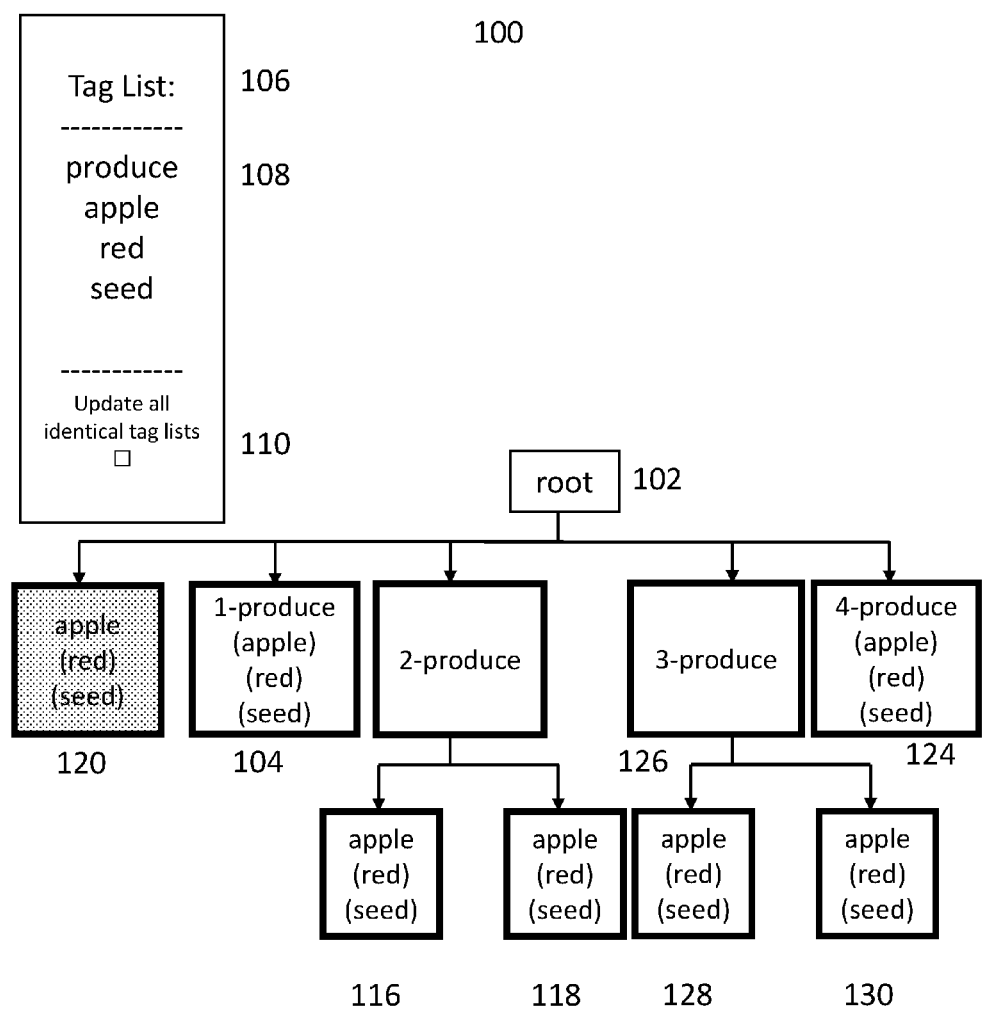
FIG. 24 is an exemplary embodiment of a tag pyramid data structure.

Turning now to exemplary FIG. 24, a user may select the root tag 102 in order to select all mutable file tags in the tag pyramid 100. This may display, as an immutable tag list, the common portion of the immutable tag lists 106 of the selected tags.

Figure 25:
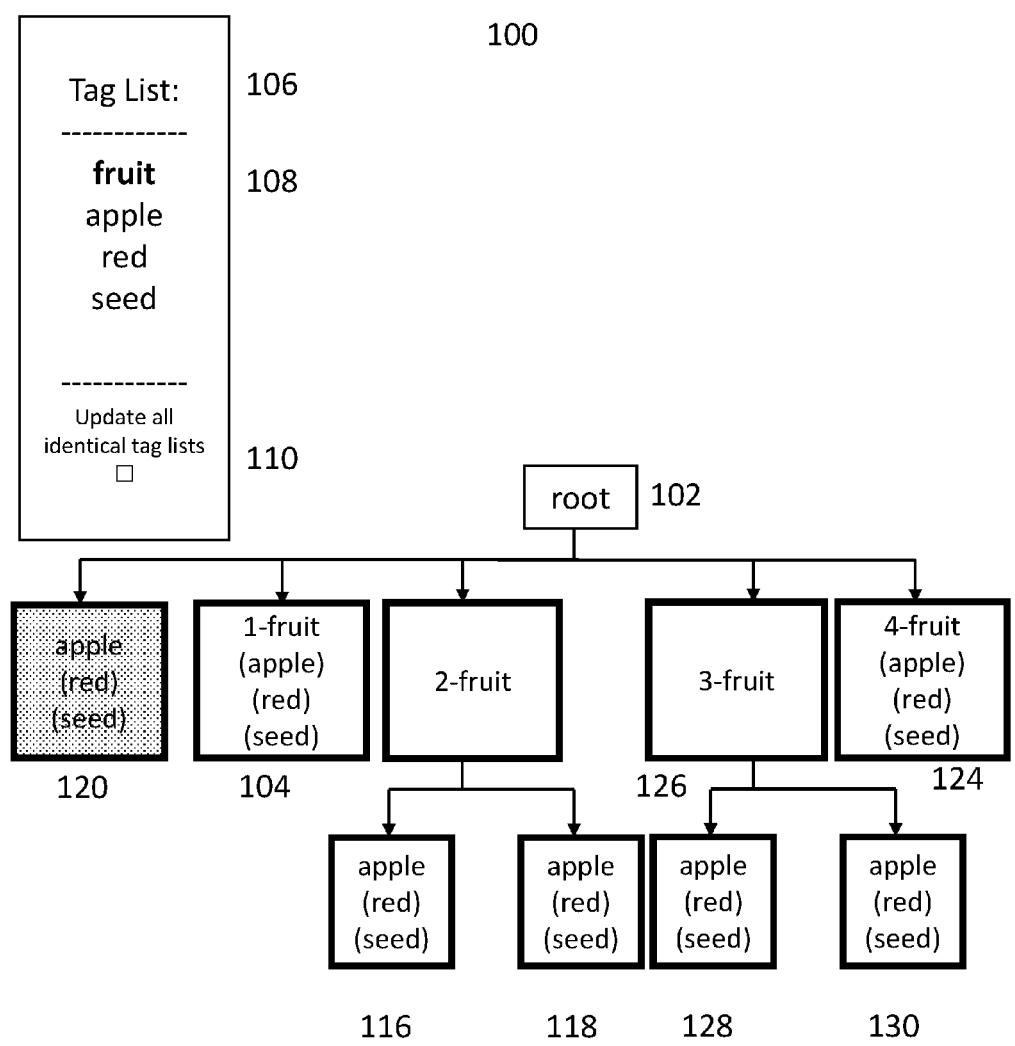
FIG. 25 is an exemplary embodiment of a tag pyramid data structure.

Turning now to exemplary FIG. 25, a user may rename one or more of the tags 108 in the common immutable tag list 106 in order to rename the tag 108 in all of the immutable tag lists 106 in which it appears. For example, according to an exemplary embodiment, the tag "produce" may be renamed to "fruit."

Figure 26:
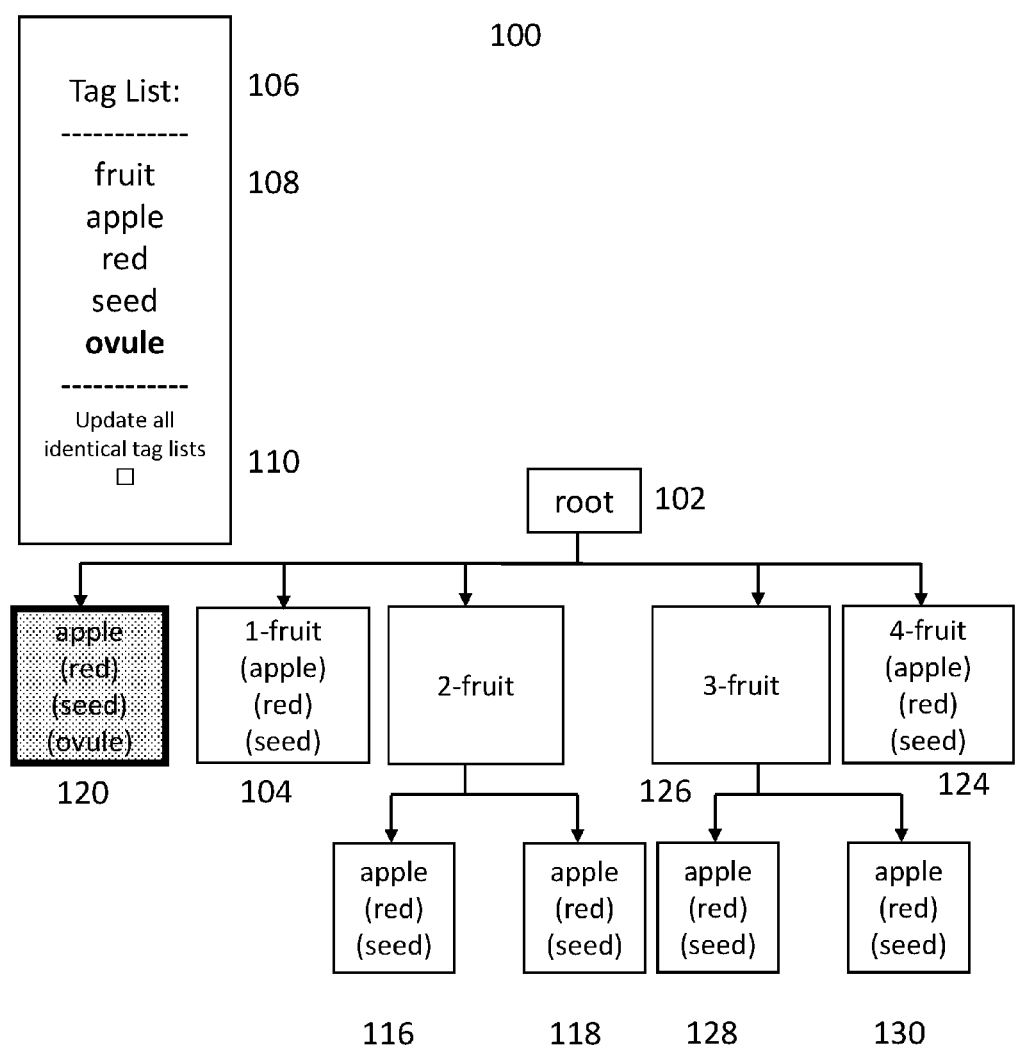
FIG. 26 is an exemplary embodiment of a tag pyramid data structure.

Turning now to exemplary FIG. 26, a user may select the "apple" mutable file tag not joined to a sequence member 120, and may add "ovule" to the immutable tag list 106 associated with this mutable file tag 120.

Figure 27:
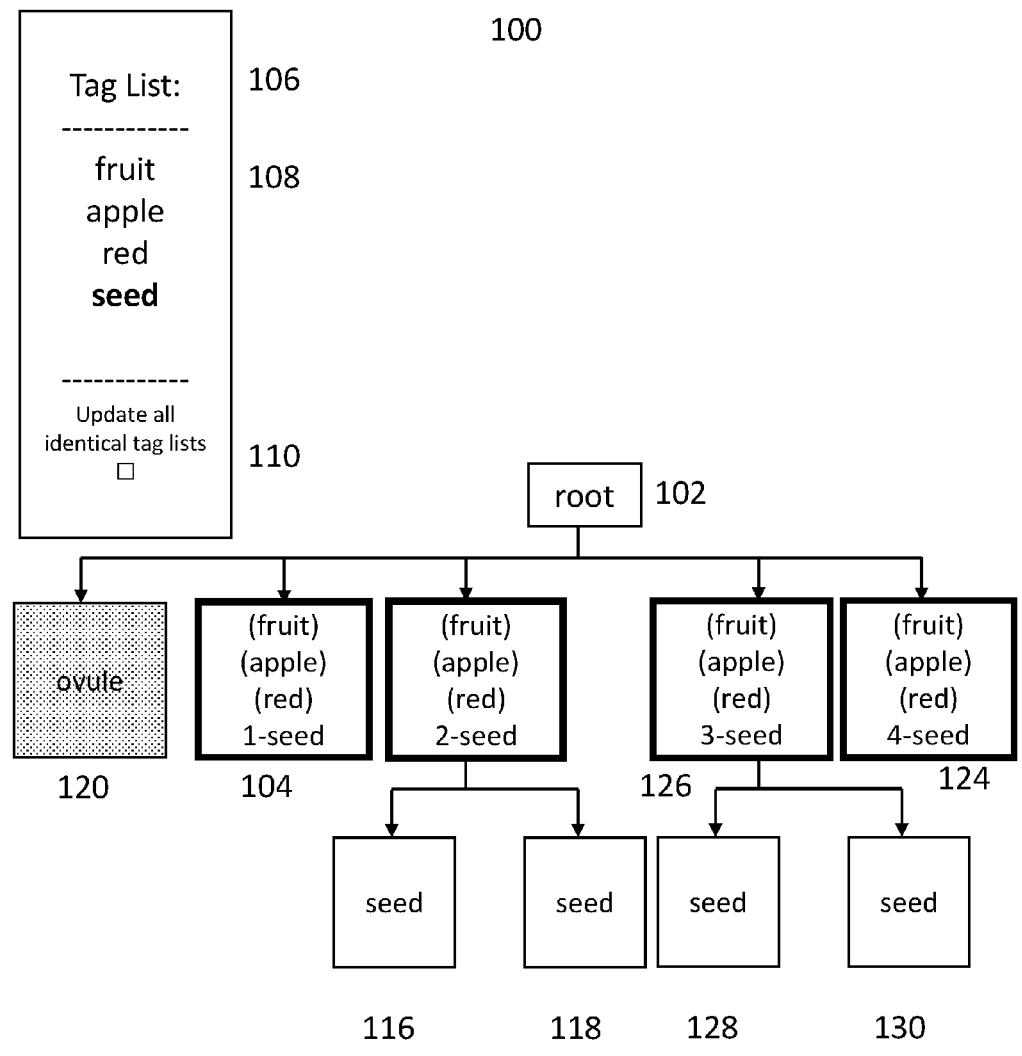
FIG. 27 is an exemplary embodiment of a tag pyramid data structure.

Turning now to exemplary FIG. 27, a user may direct the "fruit" sequence to use the lower-level "seed" immutable tag 108, common to every sequence member, instead of the "fruit" immutable tag.

Figure 28:
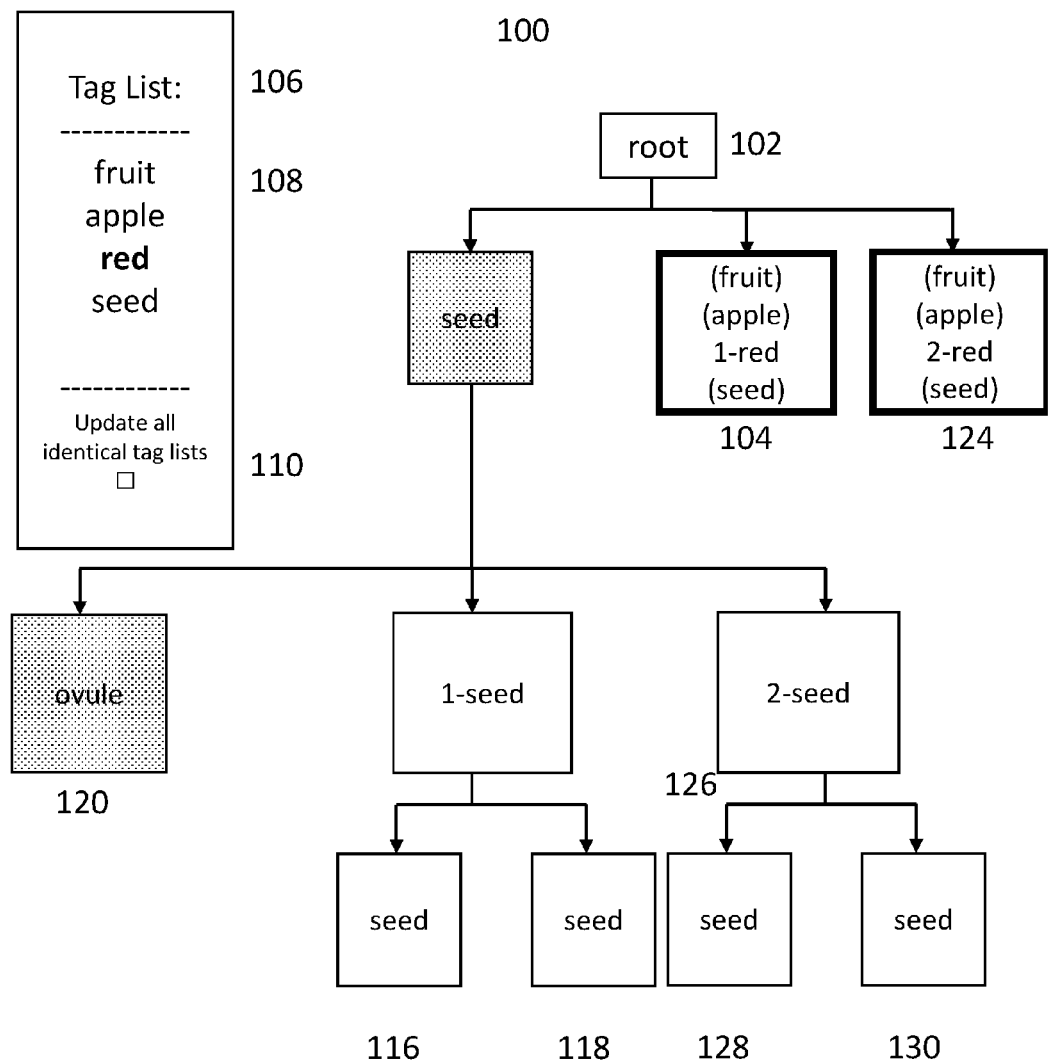
FIG. 28 is an exemplary embodiment of a tag pyramid data structure.

Turning now to exemplary FIG. 28, a user may select the mutable file tags corresponding to the "1-seed" 104 and "4-seed" 124 sequence members, and may form a new sequence from those two mutable file tags based on the common "red" immutable tag. In an exemplary embodiment, the remaining members of the "seed" sequence may be left in the "seed" sequence, which may be cut down to two members, "1-seed" and "2-seed."

Figure 29:
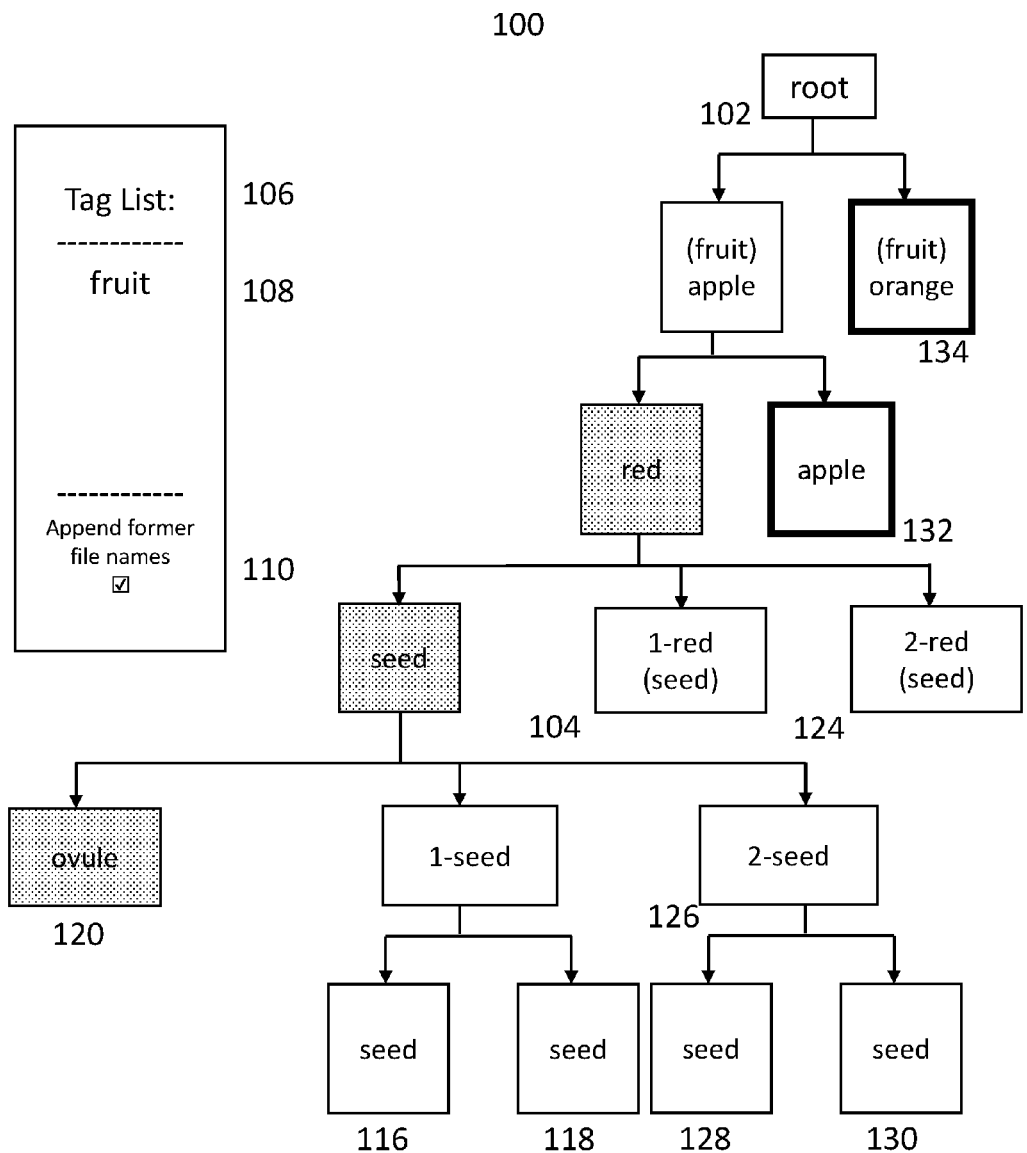
FIG. 29 is an exemplary embodiment of a tag pyramid data structure.

Turning now to exemplary FIG. 29, a user may import additional mutable file tags from another tag pyramid into the current tag pyramid 100. For example, according to an exemplary embodiment, a user may import the additional mutable file tags "apple" 132 and "orange" 134.

In an embodiment, a user may import the tags from the other tag pyramid into the current tag pyramid by dragging and dropping the mutable file tags 132, 134 onto the root tag 102. The user may then add "fruit" to the immutable tag lists 106 associated with each of the new "apple" mutable tag 132 and the new "orange" mutable tag 134.

Figure 30:
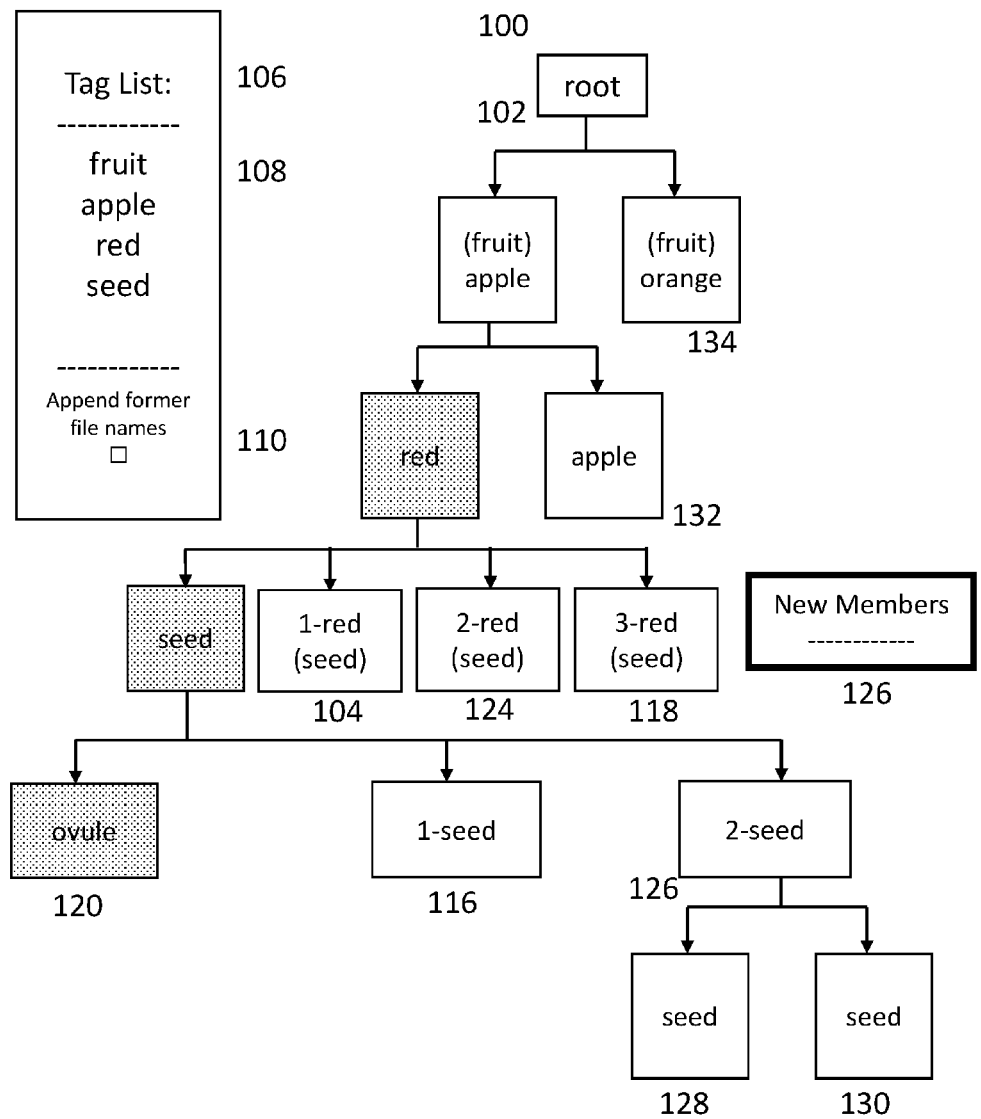
FIG. 30 is an exemplary embodiment of a tag pyramid data structure.

Turning now to exemplary FIG. 30, a user may join, to the "red" sequence, one of the "1-seed\seed" mutable file tags 118. In its previous position, the "1-seed\seed" mutable file tag 118 may use a lower-level immutable tag 108 (i.e. the immutable tag "seed" instead of the immutable tag "red") than the members of the "red" sequence. When joined to the "red" sequence, the mutable tag 118 may instead use a higher-level immutable tag 108, "red," but may retain its lower-level immutable tag 108.

Figure 31:
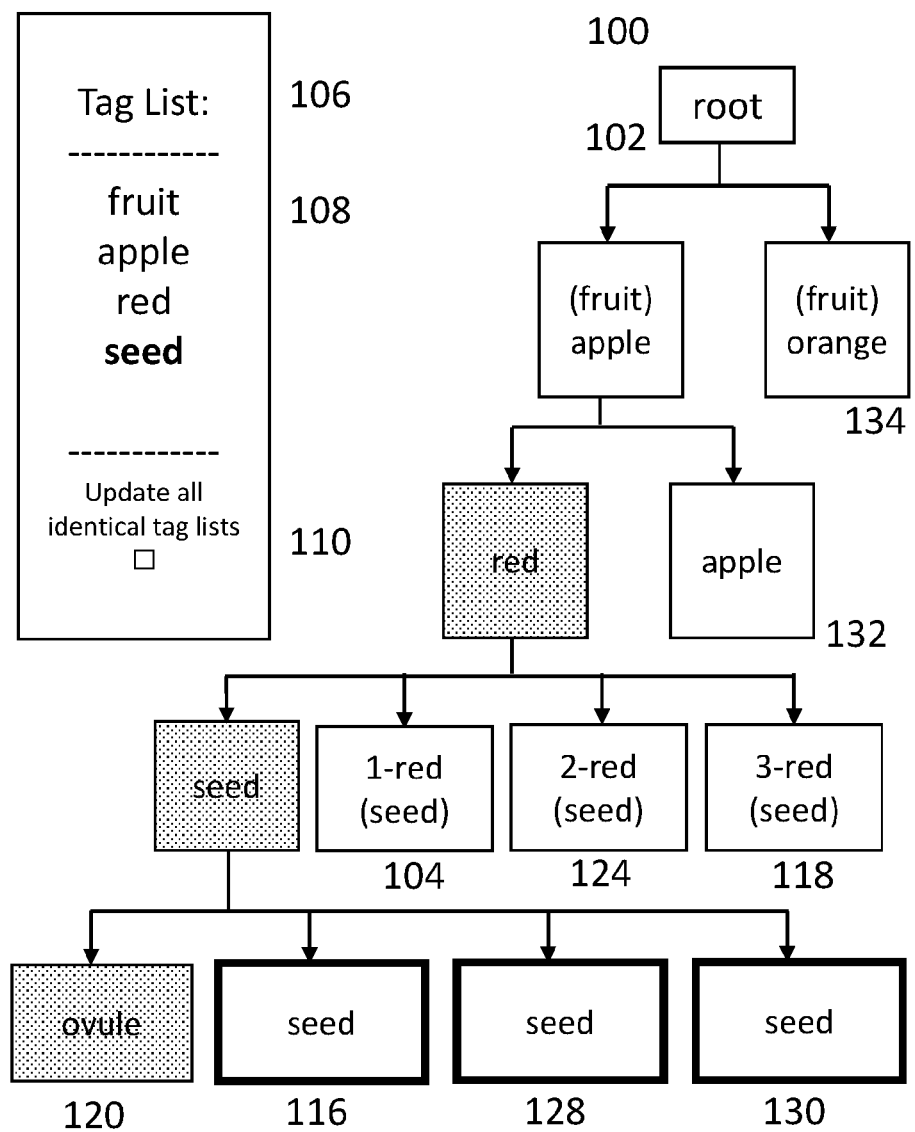
FIG. 31 is an exemplary embodiment of a tag pyramid data structure.

Turning now to exemplary FIG. 31, a user may un-sequence the "seed" sequence, leaving the mutable tags that had been arranged in the "seed" sequence 116, 128, 130.

Figure 32:
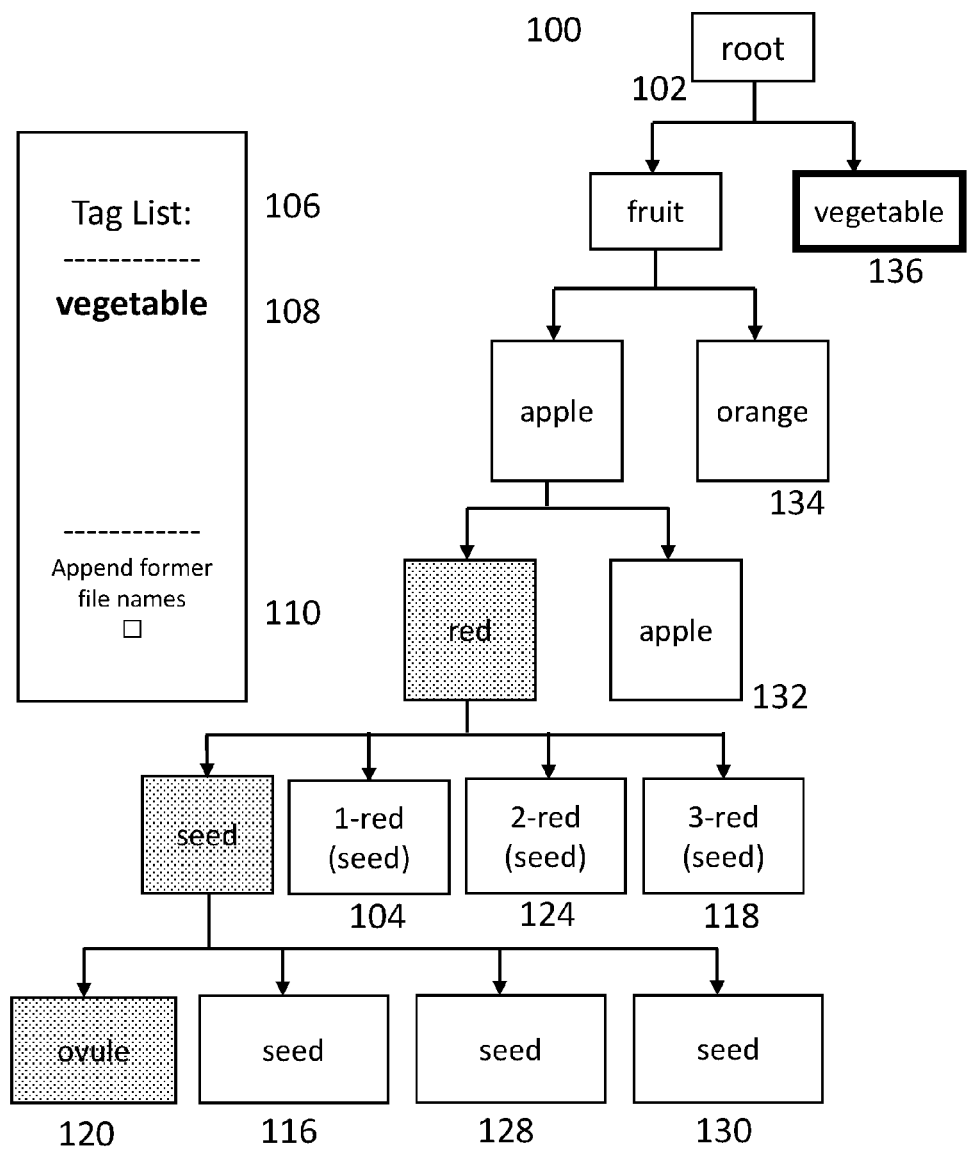
FIG. 32 is an exemplary embodiment of a tag pyramid data structure.

Turning now to exemplary FIG. 32, a user may add a "vegetable" mutable file tag 136 to the root tag 102. This may drop the "apple" 132 and "orange" 134 mutable file tags down one level, adding another row to the tag pyramid 100.

Figure 33:
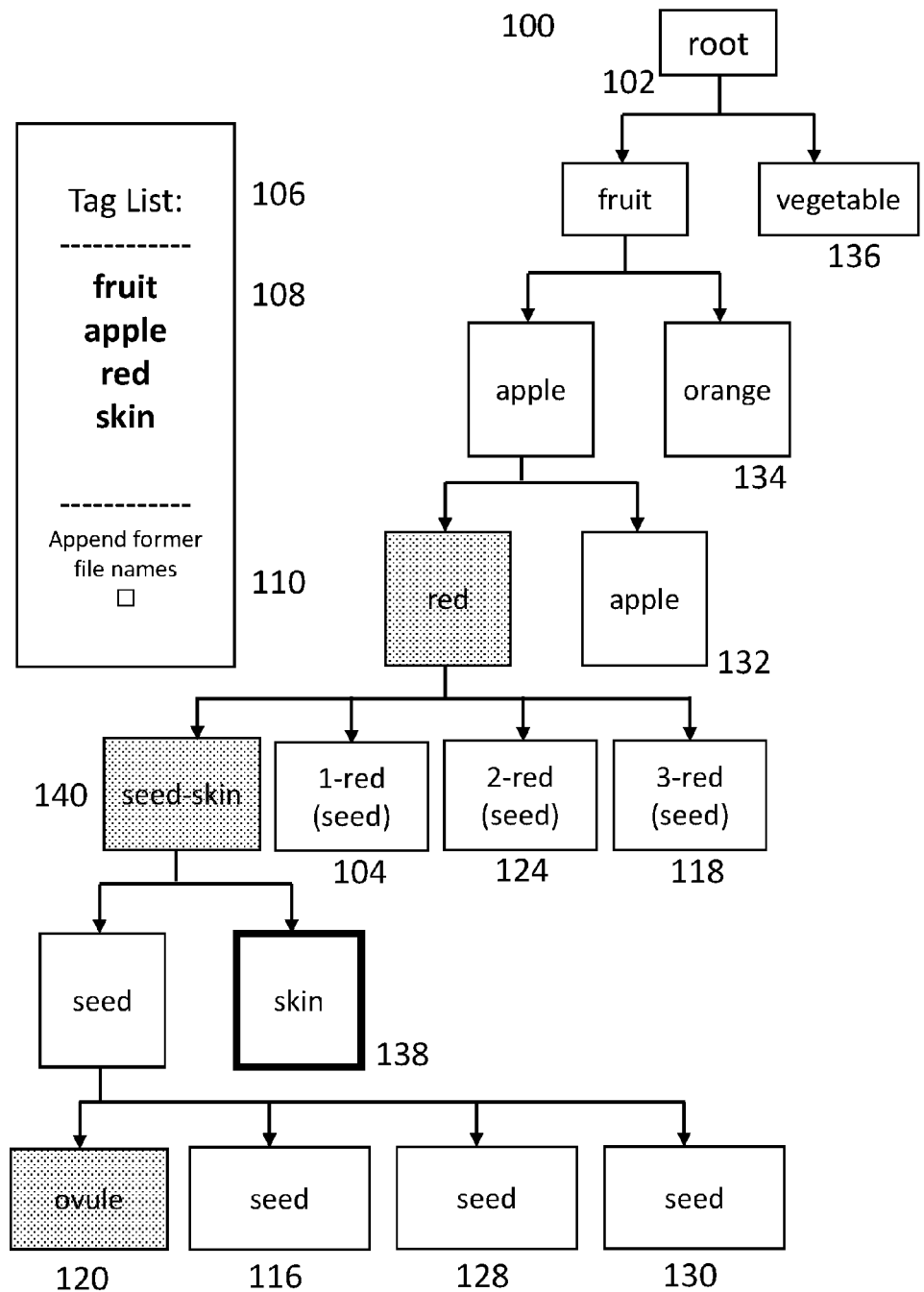
FIG. 33 is an exemplary embodiment of a tag pyramid data structure.

Turning now to exemplary FIG. 33, a user may add a "fruit\apple\red\skin" mutable file tag 138 to the root tag

102. In an exemplary embodiment, this may leave both "fruit\apple\red\seed" and "fruit\apple\red\skin" 138 in a position under the "fruit\apple\red" mutable tag. In an exemplary embodiment, this may cause a folder tag 140, "seed-skin," to be created, which may contain both the "seed" and "skin" mutable tags.

Figure 34:
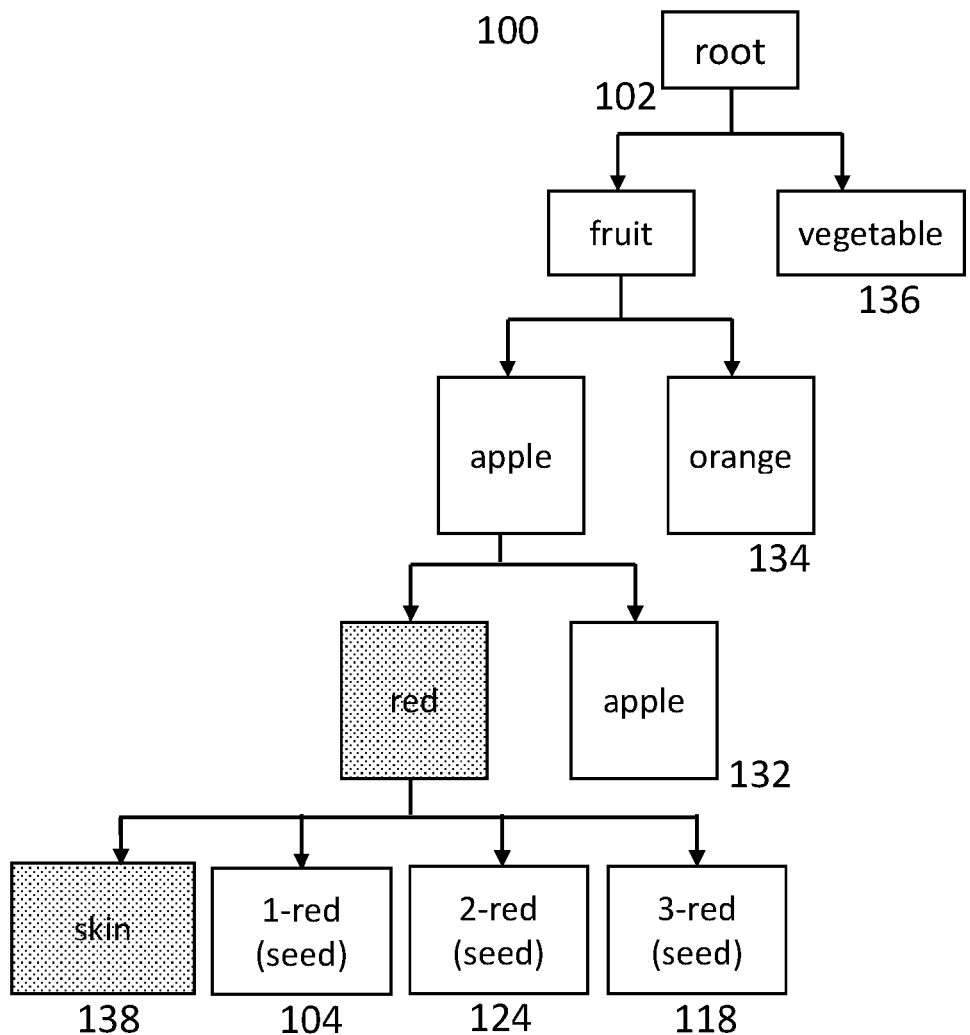
FIG. 34 is an exemplary embodiment of a tag pyramid data structure.

Turning now to exemplary FIG. 34, a user may opt to delete the "seed" mutable folder tag and all of its contents. In order to do this, according to an exemplary embodiment, a user may select the "seed" mutable folder tag and then may delete all of the selected mutable file tags that became selected when the user selected the "seed" mutable folder tag. In an embodiment, this may also cause the "seed-skin" folder tag 140 to be deleted.

Figure 35:
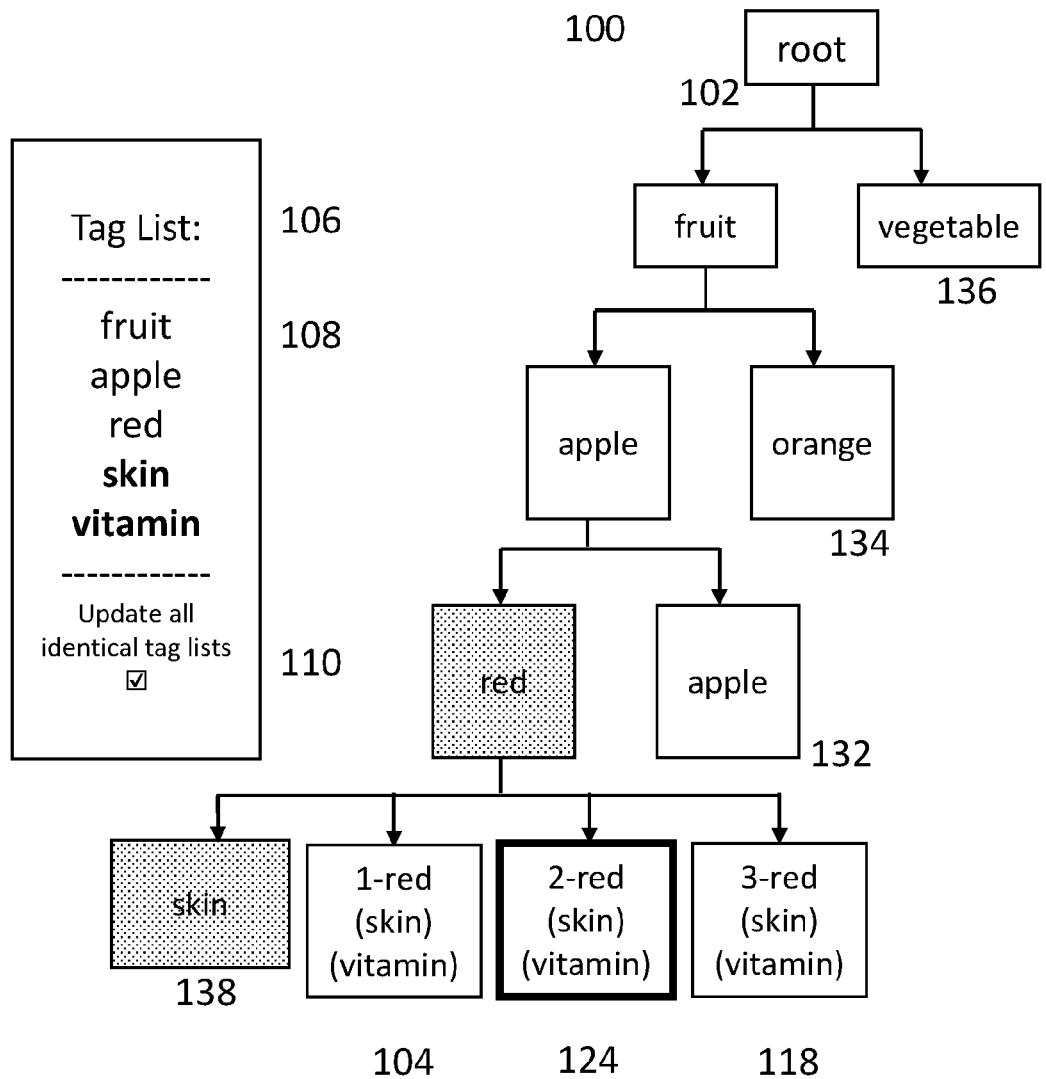
FIG. 35 is an exemplary embodiment of a tag pyramid data structure.

Turning now to exemplary FIG. 35, a user may opt to change and rename tags in the sequence. For example, according to an exemplary embodiment, a user may select the "2-red" mutable file tag 124, and may rename the "seed" immutable tag to "skin." Further, a user may add "vitamin" to the immutable tag list 106 of the "2-red" mutable file tag 124. Lastly, the user may select to identically and simultaneously modify all other mutable file tags having identical immutable tag lists 106.

Figure 36:
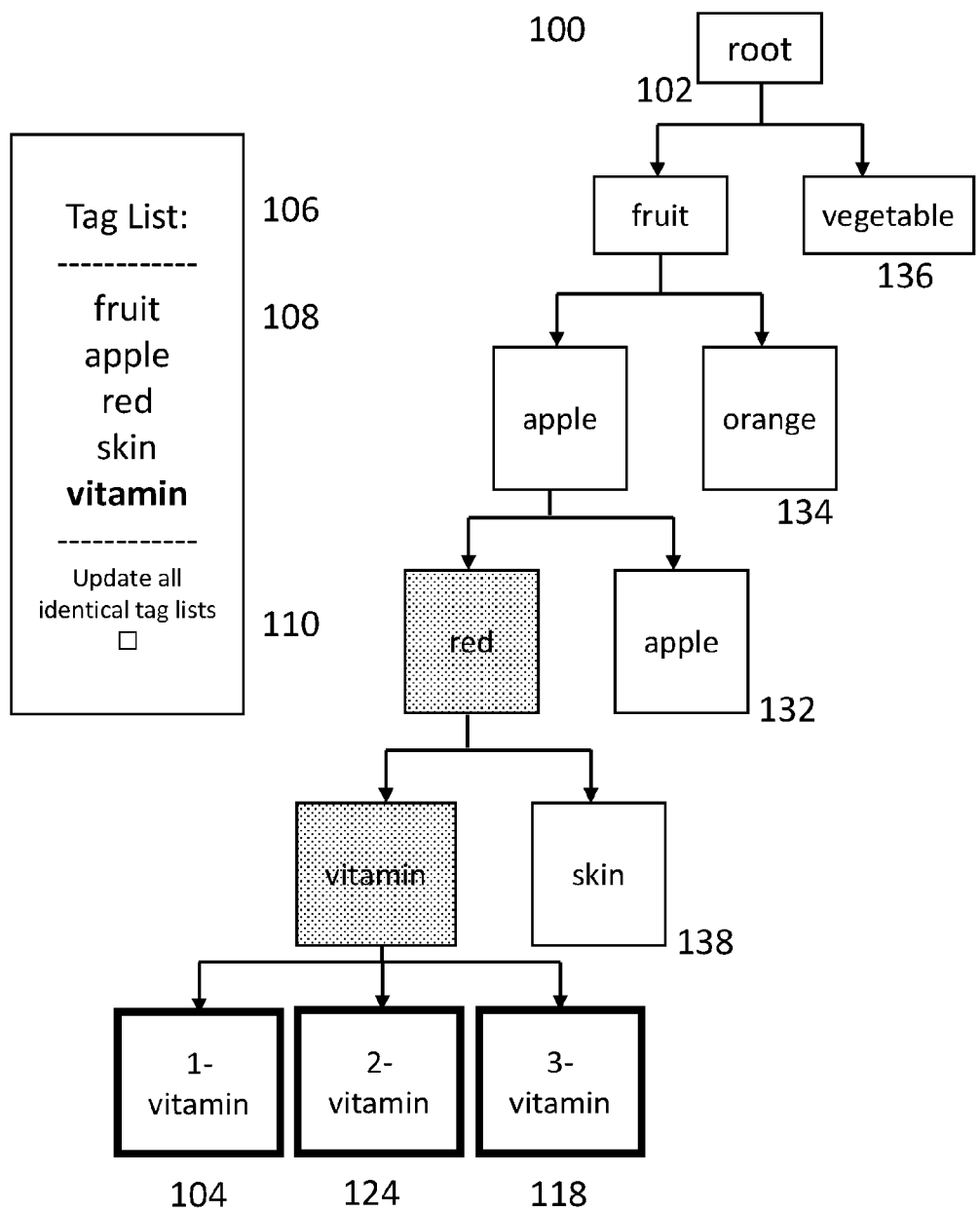
FIG. 36 is an exemplary embodiment of a tag pyramid data structure.

Turning now to exemplary FIG. 36, a user may direct the "red" sequence to use the lower-level "vitamin" immutable tag. This may cause the members of the sequence 104, 124, 118 to display the "1-vitamin," "2-vitamin," and "3-vitamin" mutable tags.

Figure 37:
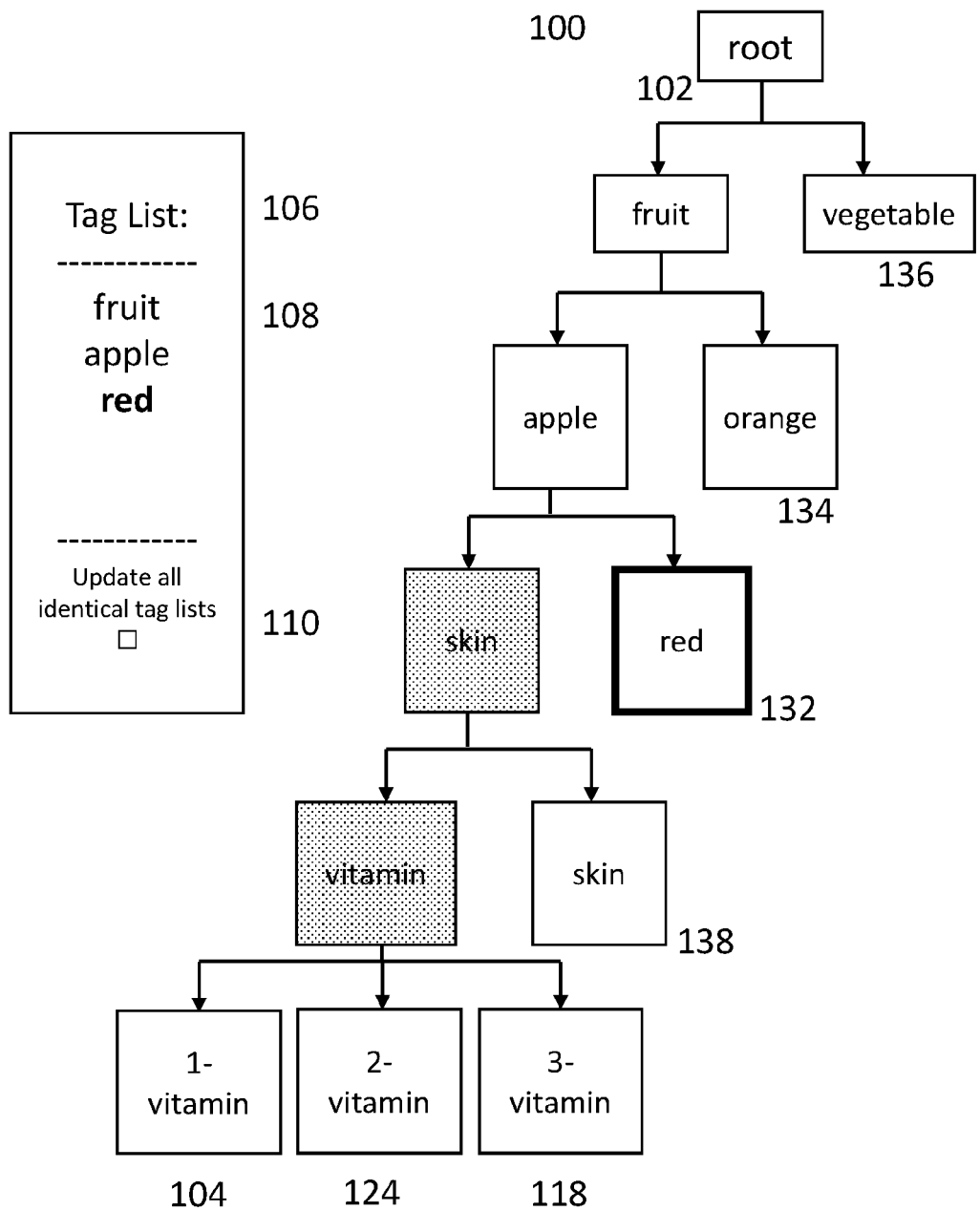
FIG. 37 is an exemplary embodiment of a tag pyramid data structure.

Turning now to exemplary FIG. 37, a user may select the "apple" mutable file tag 132 and may add "red" to its immutable tag list 106.

Figure 38:
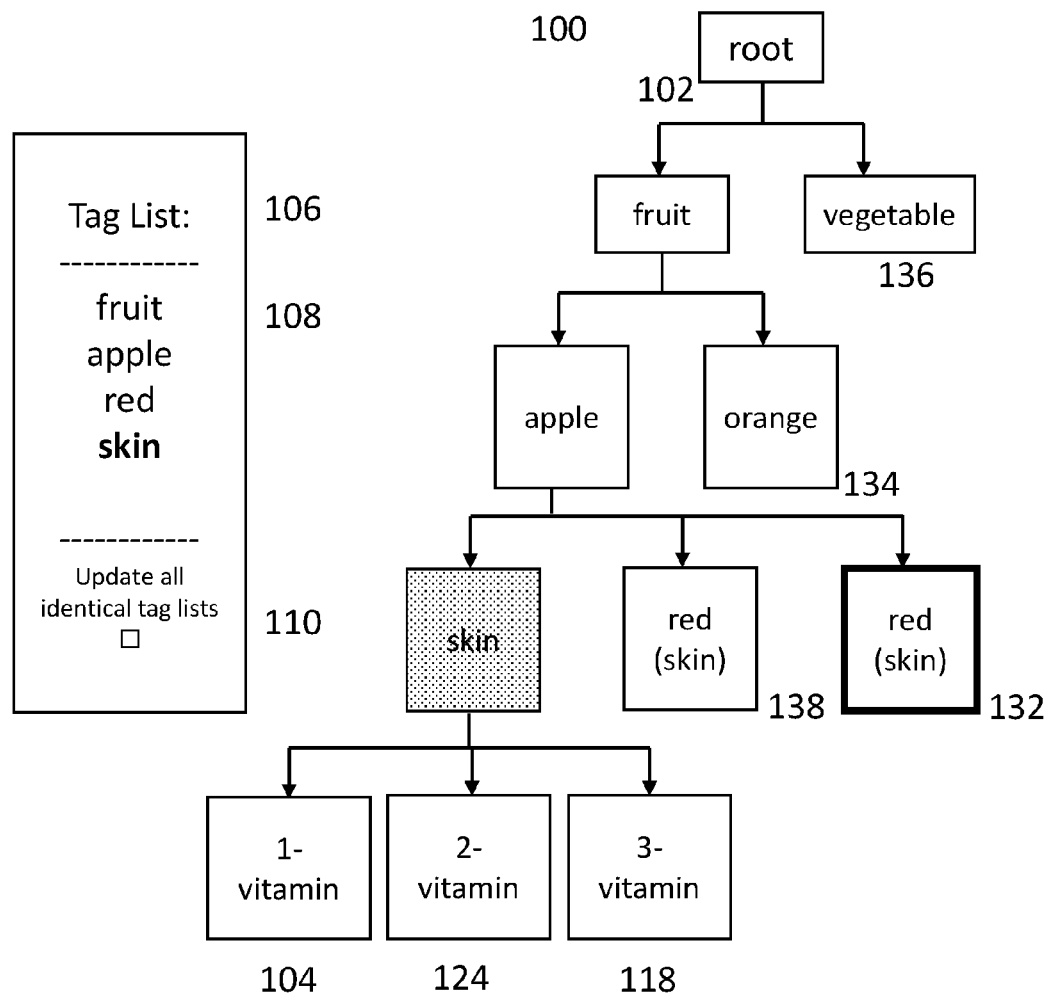
FIG. 38 is an exemplary embodiment of a tag pyramid data structure.

Turning now to exemplary FIG. 38, a user may next select the "red" mutable file tag 132 and may add "skin" to its immutable tag list 106. This may collapse the tag pyramid 100 by a level. This may further cause the "skin" mutable file tag 138 to become the equal of the "red" mutable file tag 132 rather than secondary to it, which may cause the "skin" mutable file tag 138 to adopt the highest available immutable tag and instead display "red."

Figure 39:
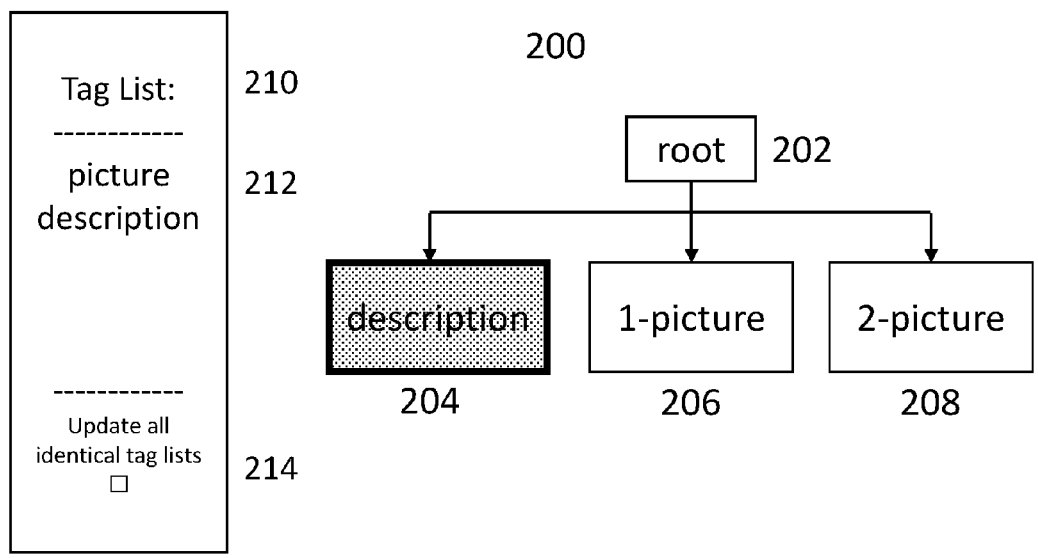
FIG. 39 is an exemplary embodiment of a second tag pyramid data structure.

Turning now to exemplary FIG. 39, another exemplary embodiment of a tag pyramid 200 may be disclosed. Such a tag pyramid 200 may have a root tag 200 with one or more mutable tags branching from the root tag 202, which may include the ungrouped mutable tag "description" 204, and the mutable tags "1-picture" 206 and "2-picture" 208, which may be arranged in a sequence.

According to an exemplary embodiment, a user may make use of a tag pyramid 200 file system as follows. First, a user may assign tags to all of the files that they want to include in the tag pyramid 200. Next, tag pyramid software may name these files automatically, and may automatically place the files in folders, as displayed on a tag pyramid 200. The tag pyramid 200 software may display a tag list 210 of the tags associated with a specific mutable tag 204, which may include a number of immutable tags 212. A user may also be provided with options to further control the tag software 214.

In an embodiment, a tag pyramid 200 file system may arrange files according to file tags that have been arranged from general to specific. For example, according to an exemplary embodiment, a user may input the file tags "family\Bob\trip\London" to sort pictures or other files, or may input the file tags "music\classical\Mozart" to sort music. In an exemplary embodiment, once a desired tag structure is assigned (for example, with the "classical" tag being at a lower level than the "music" tag), much of the process may be performed automatically, because the user may not need to repeat tags. For example, according to an exemplary embodiment, once a user has defined "music\classical\Mozart," assigning the tag "Mozart" to a file may cause it to be assigned the tags "music\classical\Mozart."

In an exemplary embodiment, a tag pyramid 200 file system may be used for any purpose requiring a data structure. For example, a tag pyramid 200 may be used for any type of personal or business data, and may support an unlimited number of files. In some exemplary embodiments, tag pyramids 200 may also be combined or separated with other tag pyramids 200, allowing tag pyramids 200 to grow or shrink as necessary.

Figure 40:
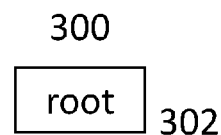
FIG. 40 is an exemplary embodiment of a third tag pyramid data structure.

Turning now to exemplary FIG. 40, FIG. 40 depicts an exemplary embodiment of a tag pyramid 300 tag structure. Such a tag pyramid 300 tag structure may be used to illustrate how tags may be organized for an organization. In an exemplary embodiment, a tag pyramid 300 may begin empty, having only a root tag 302.

Figure 41:
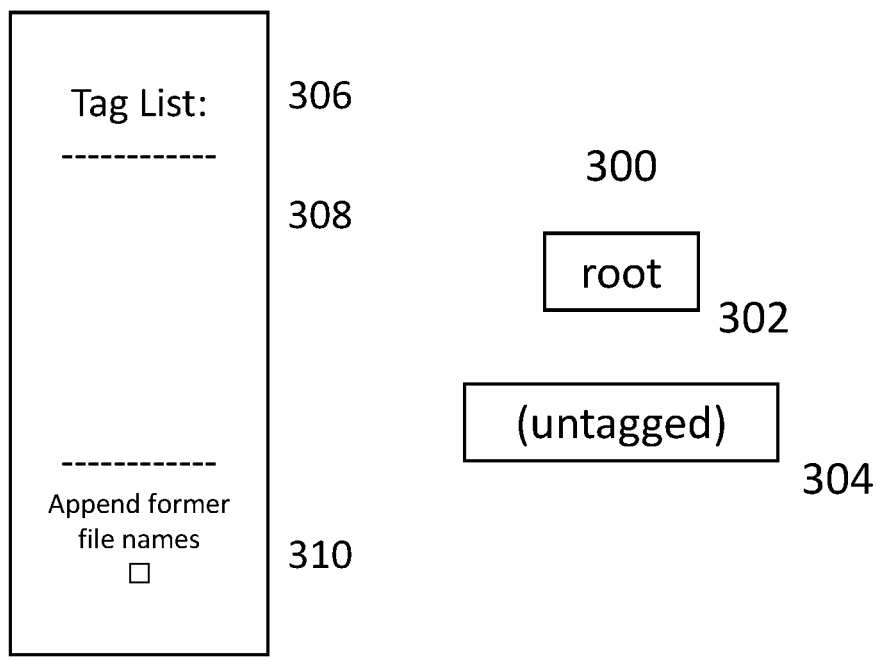
FIG. 41 is an exemplary embodiment of a third tag pyramid data structure.

A user may first wish to save an employee timesheet file 304 to the tag pyramid 300. In an exemplary embodiment, an employee timesheet file 304 may be provided untagged; that is, according to an exemplary embodiment, a user may need to manually add one or more tags to the tag list of the employee timesheet file 304. Exemplary FIG. 41 may show a file without tags, such as an employee timesheet file 304, which is intended to be added to the tag pyramid 300 but which has not yet been added; this file 304 may be labeled "untagged" in order to indicate the tag state of this file 304.

Figure 42:
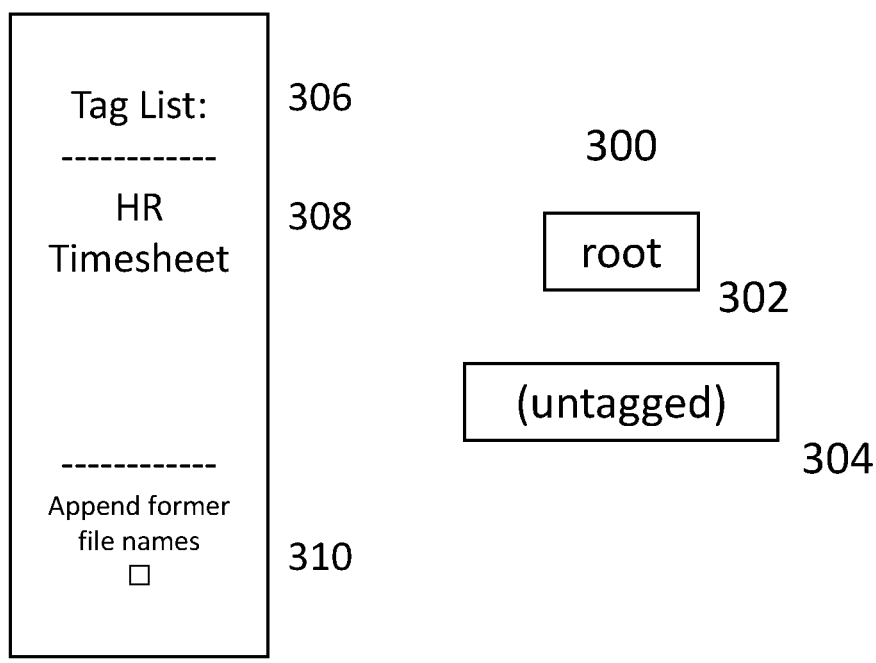
FIG. 42 is an exemplary embodiment of a third tag pyramid data structure.

In order to save the employee timesheet file 304 to the tag pyramid 300, a user may save the file 304 to the root tag 302 of the tag pyramid. The user may then be able to assign tags to the file 304. For example, according to an exemplary embodiment, a user may assign the tags 308 "HR" and "Timesheet." These assigned tags may be shown in exemplary FIG. 42.

According to an exemplary embodiment, an employee timesheet file 304 or other file may instead be provided with a tag list of its own, rather than being provided untagged. For example, according to an exemplary embodiment, an employee timesheet file 304 may be imported from another tag pyramid 300 data structure, and may have been assigned a tag list in that other tag pyramid 300 data structure. In an embodiment, if a file already has a tag list upon importation, then, after dropping the file onto the root tag, a user may be presented with the option to keep the former tag list of the imported file, or to treat it as a newly saved file without tags. If the user opts to keep the former tag list of the imported file, the file may be positioned in the tag pyramid 300 in accordance with its tags.

Figure 43:
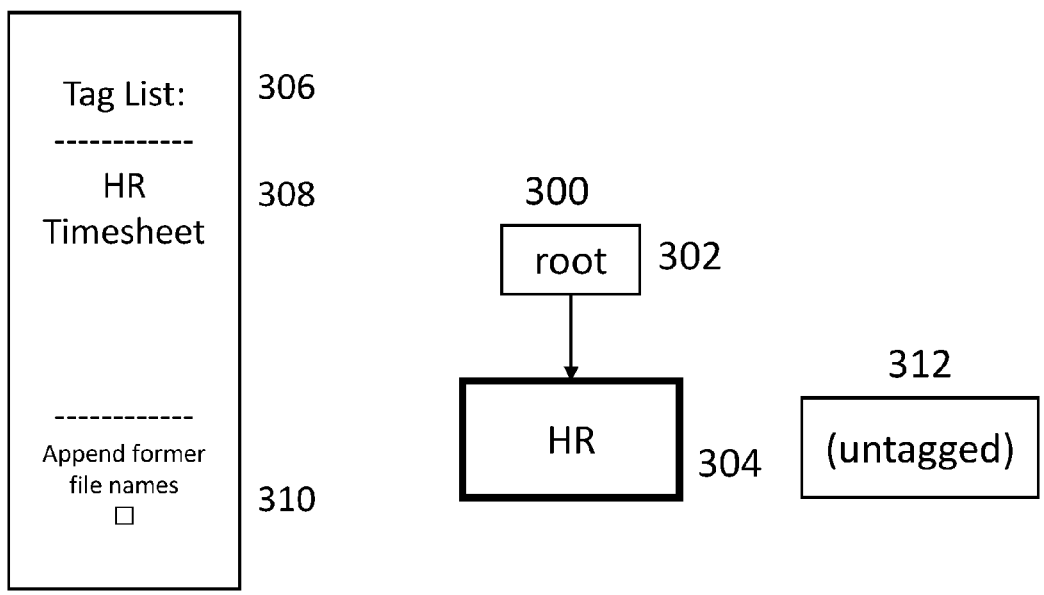
FIG. 43 is an exemplary embodiment of a third tag pyramid data structure.

Turning now to exemplary FIG. 43, once a user has assigned the tags 308 "HR" and "Timesheet" to the file 304, it may be shown as the mutable tag "HR," branching off of the root node 302. The tag of the file 304 may display "HR," because, at this point, without additional files having been added, the file 304 represents all of the files associated with the HR department. However, when another file having the tag "HR" is added, a branching structure may be created.

According to an exemplary embodiment, a new file 312 may be added by dragging the new file onto the file tagged "HR" 304. This may cause the new file 312, which may in this case be a timesheet file, to inherit the tag list 306 of the file now tagged "HR" 304. In an embodiment, the user may be provided with an opportunity to modify the tag list 306 of the new file 312 from the tag list 306 inherited from the "HR" file. In another exemplary embodiment, the user may opt not to modify the tag list 306 of the new file 312, resulting in two "HR" tags having identical tag lists 306. This may be shown in FIG. 44.

Figure 44:
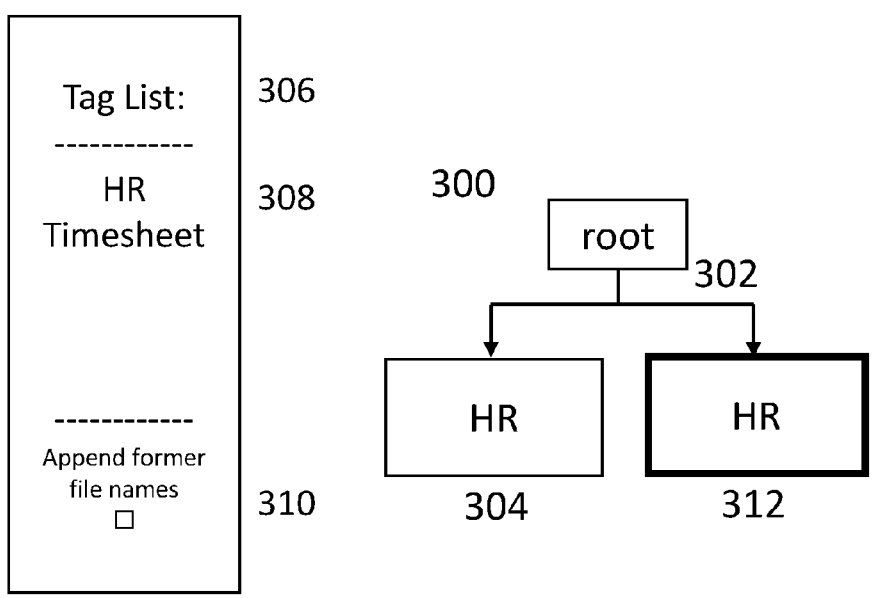
FIG. 44 is an exemplary embodiment of a third tag pyramid data structure.
Figure 45:
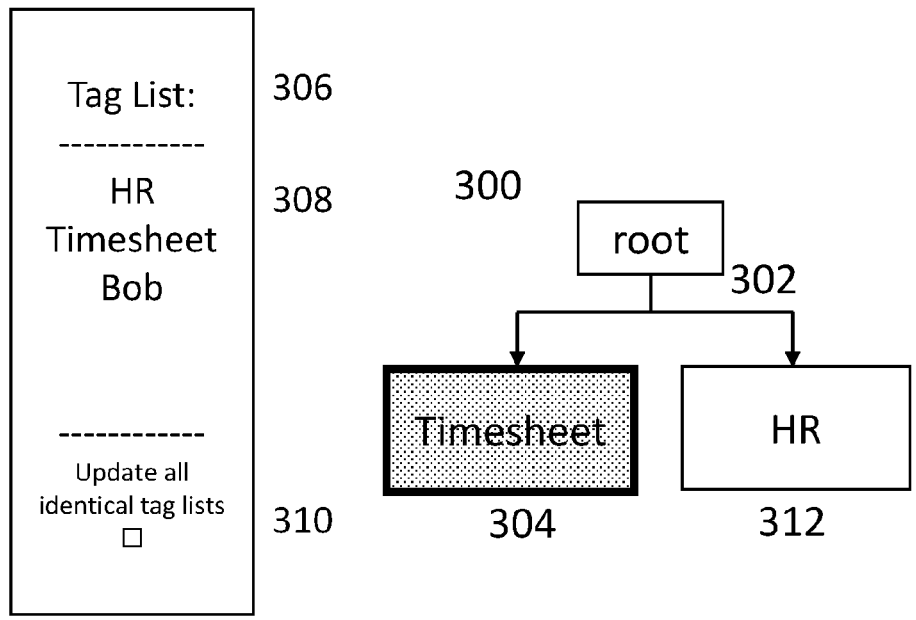
FIG. 45 is an exemplary embodiment of a third tag pyramid data structure.

In the exemplary embodiment shown in FIG. 44, it may be desirable to add another tag 308, such as the tag "Bob," to the first timesheet 304. In an exemplary embodiment, this may cause the first timesheet file 304 to be renamed and display a new mutable tag, which in this case may be "timesheet." This may be shown in exemplary FIG. 45.

In an exemplary embodiment, when a new tag 308 is added to the tag list 306 of the first timesheet file 304, the newly-displayed mutable tag ("timesheet") may be displayed in a different color to indicate that the newly-displayed mutable tag is secondary to its peers. For example, according to one exemplary embodiment, a highest-ranked mutable tag among a set of peers (which in this case may be "HR") may be displayed in red, and a next-highest-ranked mutable tag among a set of peers (which in this case may be "timesheet") may be displayed in purple. In an embodiment, if a third-highest-ranked mutable tag is also to be shown, it may be provided in yet a different color. Other colors or other indications other than color may be used, as desired.

Figure 46:
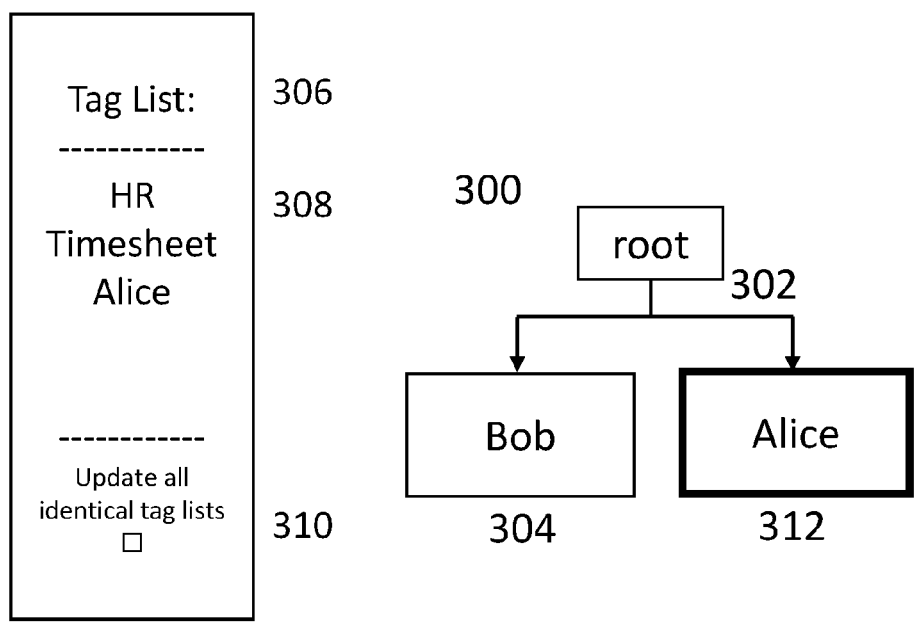
FIG. 46 is an exemplary embodiment of a third tag pyramid data structure.

Turning now to exemplary FIG. 46, a new tag 308 may be added to the tag list 306 of the other file 312 in the tag pyramid 300. In this case, according to an exemplary embodiment, it may be desired to tag the timesheet file 312 with the name "Alice." This may cause the tag pyramid 300 to display the first unique tags 308 in the tag list 306 of each file in order to distinguish them. According to an exemplary embodiment wherein color is used to distinguish tags 308 that are secondary to the other tags in a peer group, this may cause the mutable tags displayed by each file 304, 312 to again be colored the same color.

Figure 47:
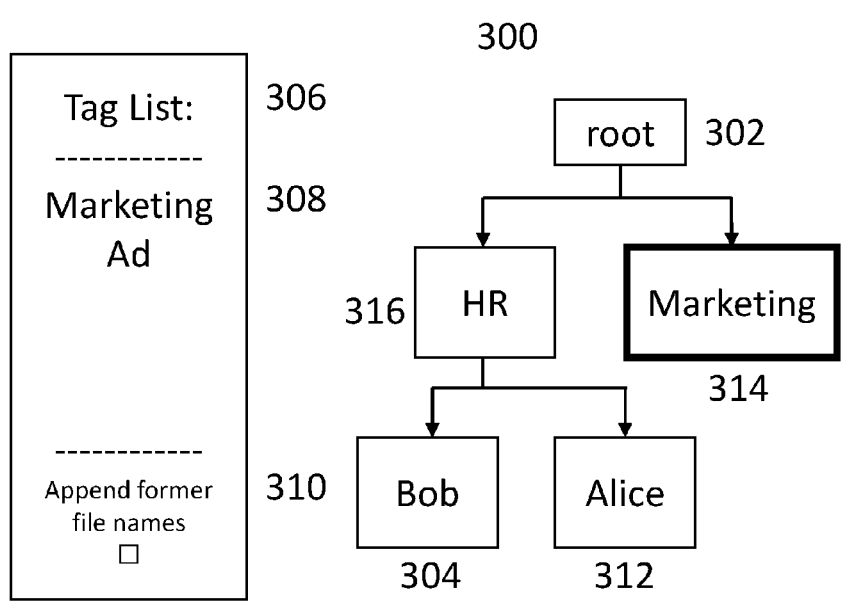
FIG. 47 is an exemplary embodiment of a third tag pyramid data structure.

Turning now to exemplary FIG. 47, it may be desired to save an advertising document for the marketing department. According to an exemplary embodiment, this may be accomplished by dragging the untagged file 314 to the root tag 302, and assigning the untagged file 314 the tags "Marketing" and "Ad." This may cause the ad file 314 to display "Marketing," since at the present time it represents the entire marketing department. The other two timesheet files 304, 312, which belong to HR, may be organized under the "HR" folder tag 316.

Figure 48:
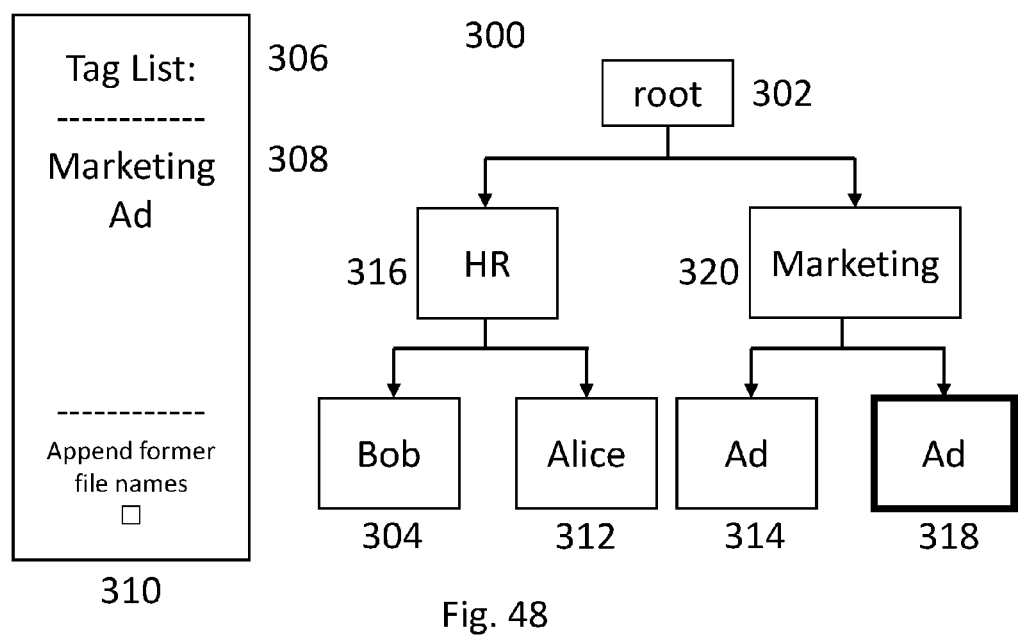
FIG. 48 is an exemplary embodiment of a third tag pyramid data structure.

Turning now to exemplary FIG. 48, it may be desired to move an existing ad from another tag pyramid over to the existing tag pyramid 300. According to an exemplary embodiment, a user may be able to incorporate the new ad by dragging and dropping it onto the "Marketing" tag 314, which may cause the new ad file 318 to inherit the tag list 306 of the file showing the "Marketing" mutable tag 314. In an exemplary embodiment, if the new ad file 318 has a pre-existing tag list, this tag list may be replaced with the new tag list 306. According to an exemplary embodiment, the user may then be presented with the option to modify the inherited tag list.

In an exemplary embodiment, the user may also be provided with the option to append the former file name of the new ad file 318. According to an exemplary embodiment, if one is present, the sequence prefix may be automatically removed from the former file name of the new ad file 318 before the former file name is appended. According to an exemplary embodiment, no modification to the tag list may be made and the former file name of the new ad file may not be appended.

According to an exemplary embodiment, the two ad files 314, 318 may be automatically grouped under a "Marketing" folder tag 320, which may serve to distinguish them from the HR files grouped under the "HR" folder tag 316. Each of the two ad files 314, 318 may display "ad" in order to describe their relationship to the marketing department.

Figure 49:
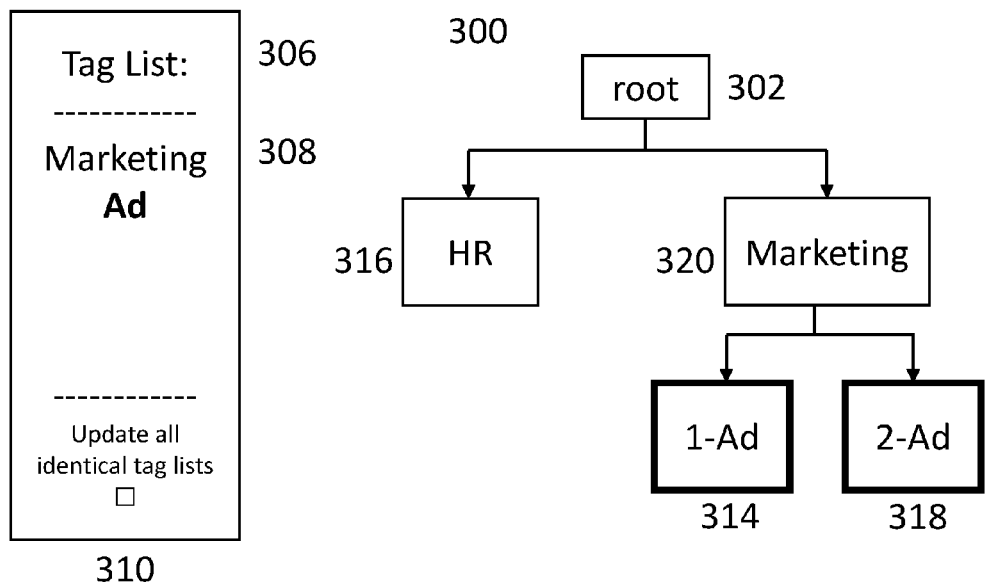
FIG. 49 is an exemplary embodiment of a third tag pyramid data structure.

Turning now to exemplary FIG. 49, it may be desired to convert the two ad files 314, 318 into a sequence, which may serve to distinguish them from one another without adding more tags to the tag lists 306 of either file 314, 318. Converting the two files 314, 318 into a sequence may result in a sequence prefix being automatically generated for each of the ad files 314, 318, resulting in the ad files being distinguishable.

Figure 50:
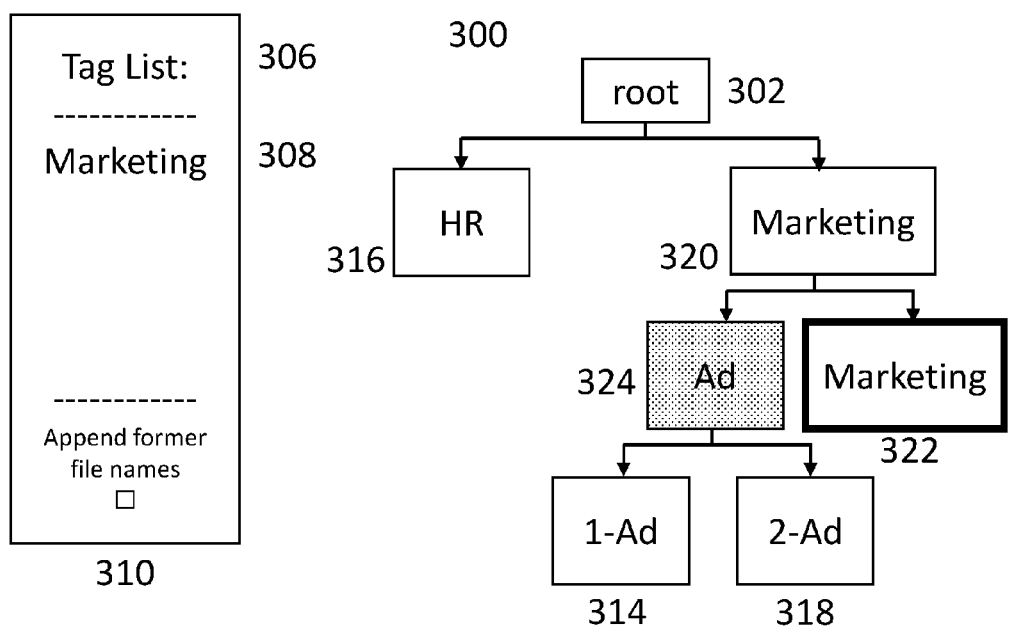
FIG. 50 is an exemplary embodiment of a third tag pyramid data structure.

Turning now to exemplary FIG. 50, it may be desired to add a new file 322 which describes the marketing department as a whole. A user may elect to drag and drop this new file 322 on the "marketing" folder tag 320, which may cause the new file 322 to inherit a tag list 308 leading down to the "marketing" tag. The "marketing" tag 320 may remain displayed as a folder tag. Because the new file 322 has a mutable file tag that is superprimary to the "ad" sequence, the addition of the "marketing" tag 322 may in turn cause the "ad" tags 314, 318 in the "ad" sequence to be automatically organized within an "ad" folder tag 324.

According to an exemplary embodiment in which the color of a tag is used to indicate the status level of a tag, the "ad" folder tag 324 may be provided in a different color to show that it is secondary to the "marketing" tag 322 displayed by its peer in the tag pyramid 300. For example, the "ad" tag 324 may be provided in purple, while the "marketing" tag 322 may be provided in red.

Figure 51:
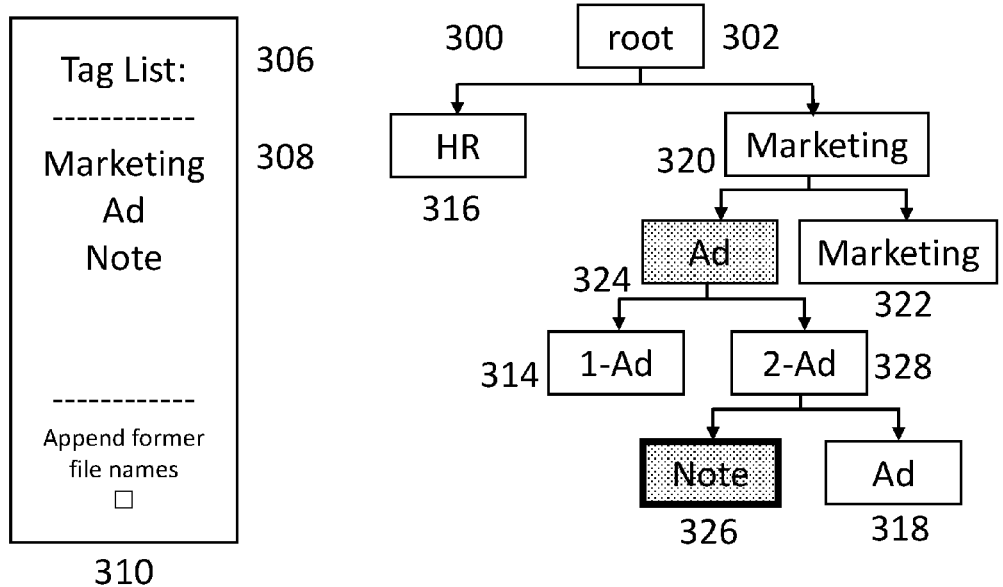
FIG. 51 is an exemplary embodiment of a third tag pyramid data structure.

Turning now to exemplary FIG. 51, it may be desirable to add a note describing the "2-ad" file 318. A note file 326 describing "2-ad" 318 may be dragged and dropped onto "2-ad" 318. This may cause the newly-added note file 326 to inherit the tag list 306 of the "2-ad" file 318, and may join the newly-added note file 326 to the sequence member. The "2-ad" sequence member may then be converted into a folder tag 328, and may display the ad file 318 below the "2-ad" folder tag 328.

In an embodiment, after adding the new file 326 but before committing the new file 326 to the tag pyramid 300, a user may add the tag 308 "note" to the tag list 306 of the new file. This may cause the new file 326 to display the mutable tag "note."

Figure 52:
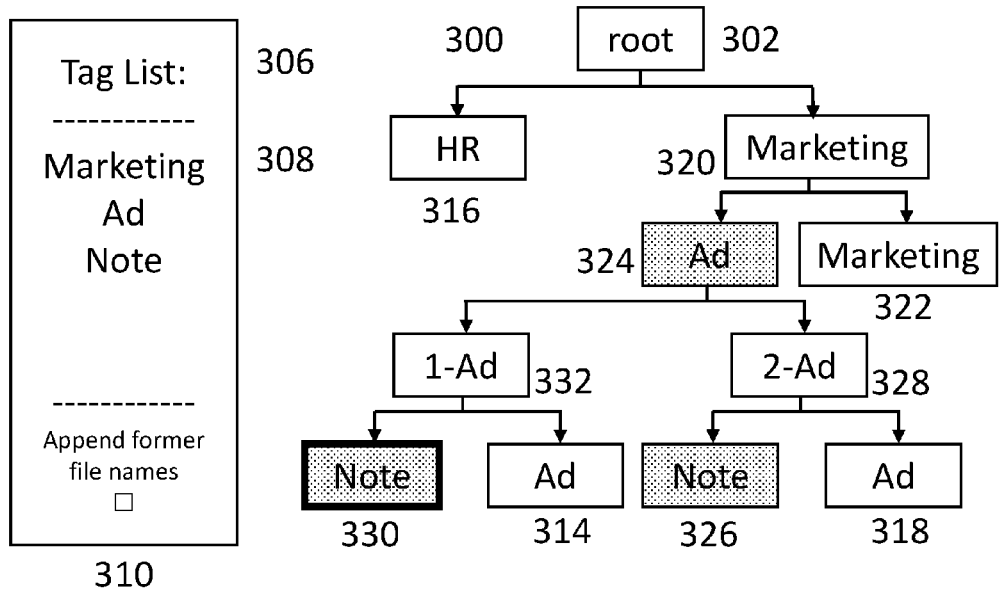
FIG. 52 is an exemplary embodiment of a third tag pyramid data structure.

Turning now to exemplary FIG. 52, it may be desirable to make a copy of the note file 326 and place it with the first ad 314 in the ad sequence. According to an exemplary embodiment, a user may be able to drag and drop a copy of the "note" file 326 onto the "1-ad" tag 314. This may cause the "note" file 326 to be duplicated, while keeping the "note" tag. The duplicate "note" file 330 may again be placed under a folder tag 332, in this case the "1-ad" folder tag 332.

Figure 53:
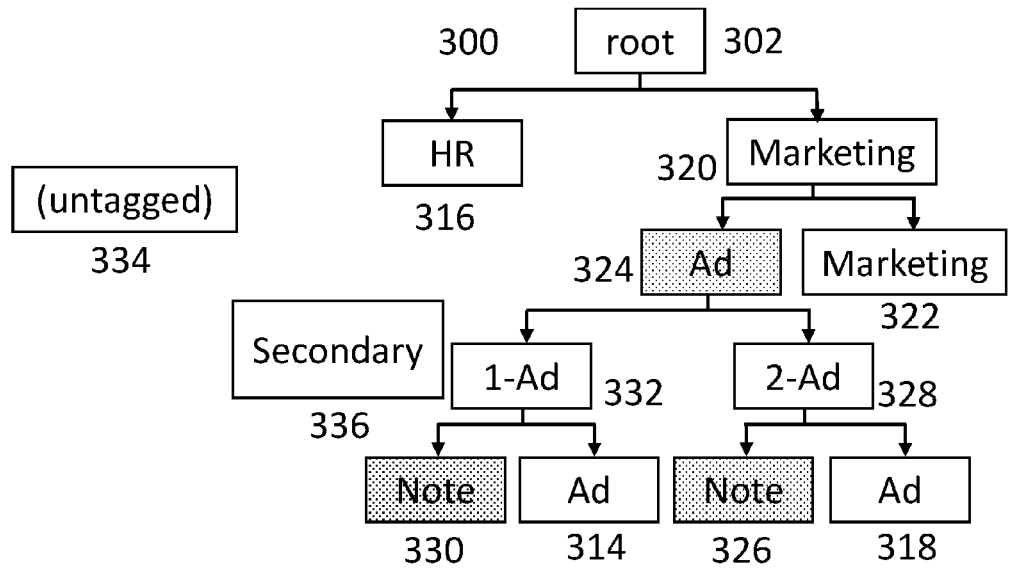
FIG. 53 is an exemplary embodiment of a third tag pyramid data structure.
Figure 54:
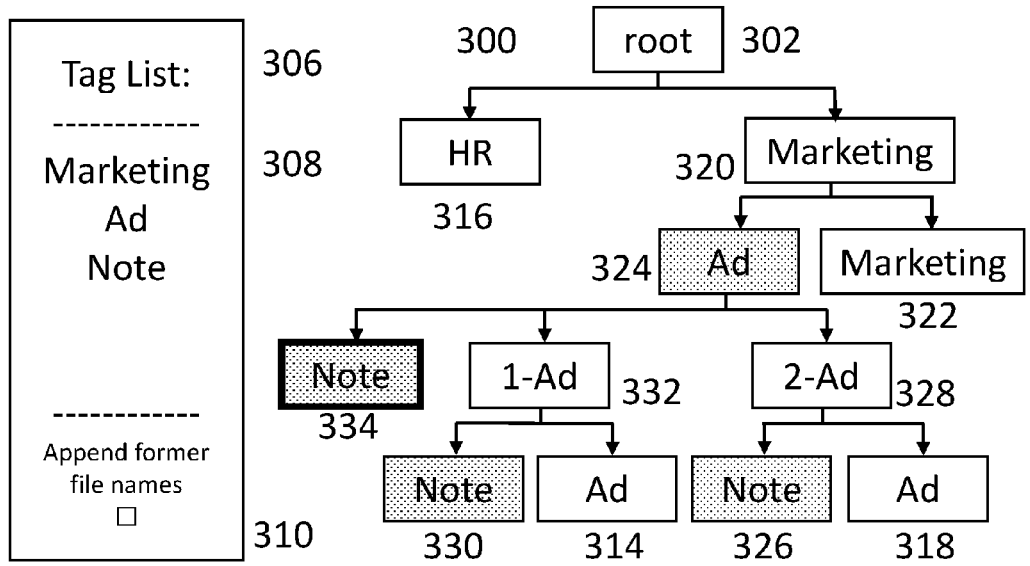
FIG. 54 is an exemplary embodiment of a third tag pyramid data structure.

Turning now to exemplary FIG. 53, it may be desirable to add a note that applies to all of the Marketing department's ads, not just one of the sequence members. According to an exemplary embodiment, a user may drag and drop this note 334 onto a "secondary" box 336 associated with the sequence. In some embodiments, this "secondary" box 336 may be constantly displayed, may be displayed when a user selects a file to drag and drop (such as a note file 334), or may be displayed when a user drags a file to one side of the sequence (such as to the left of all of the elements in the sequence). This may cause the note 334 to inherit the tag list 306 leading down to the tag used to build the sequence (in this case the "ad" tag 308). The user may then add the tag "note" to the tag list 306 of the note file 334. The resulting tag pyramid structure 300 may be shown in FIG. 54.

Figure 55:
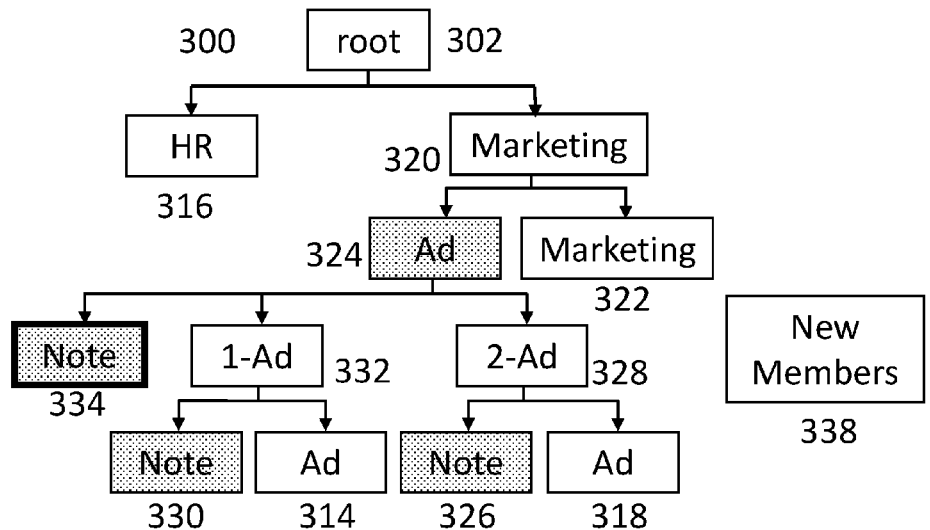
FIG. 55 is an exemplary embodiment of a third tag pyramid data structure.

Turning now to exemplary FIG. 55, a user may instead determine that the recently-added note file 334 refers to a third ad that does not yet exist in the sequence. The user may elect to move the note file 334 to a "New Members" block 338 associated with the sequence. As with the "Secondary" block 336 of the sequence, the "New Members" block may in some embodiments be always visible, be visible when a user selects or drags a file, or may be visible when a user drags a file to a particular area of the screen.

Figure 56:
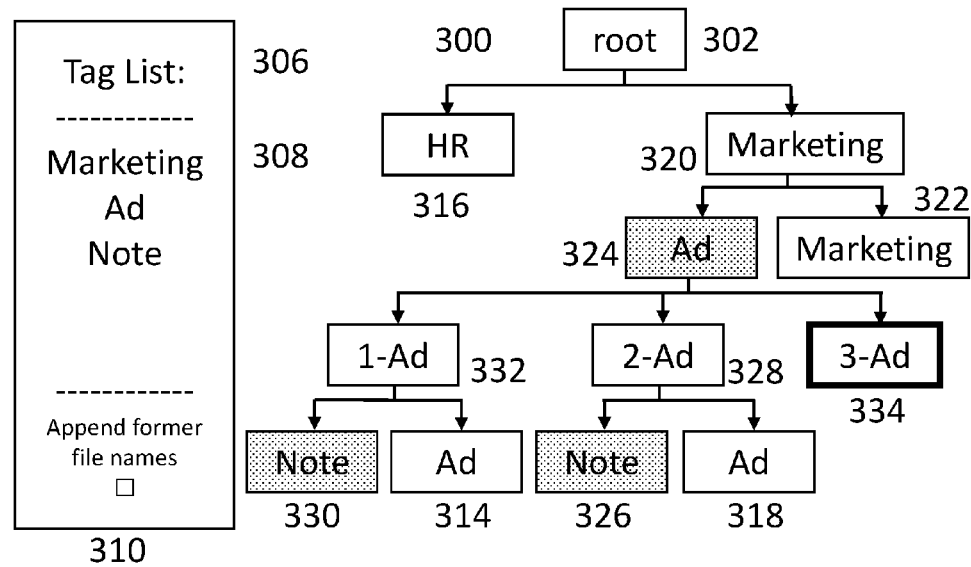
FIG. 56 is an exemplary embodiment of a third tag pyramid data structure.

According to an exemplary embodiment, when the user drags a file, such as a note file 334, to the "New Members" block 338, the file 334 may inherit a tag list 306 leading down to the sequence's tag. When the user drags the "note" tagged file 334 to the "New Members" block 338, the "note" tagged file 334 may automatically keep the secondary "note" tag 308. However, when inserted as a new sequence member, the note file 334 may display the mutable tag "3-Ad" rather than "Note." According to an exemplary embodiment in which color is used to indicate the primary or secondary status of a displayed mutable tag of a file, the note file 334 may lose its secondary coloring and instead be colored based on its display of a primary level mutable tag. The resulting tag pyramid structure 300 may be shown in exemplary FIG. 56.

Figure 57:
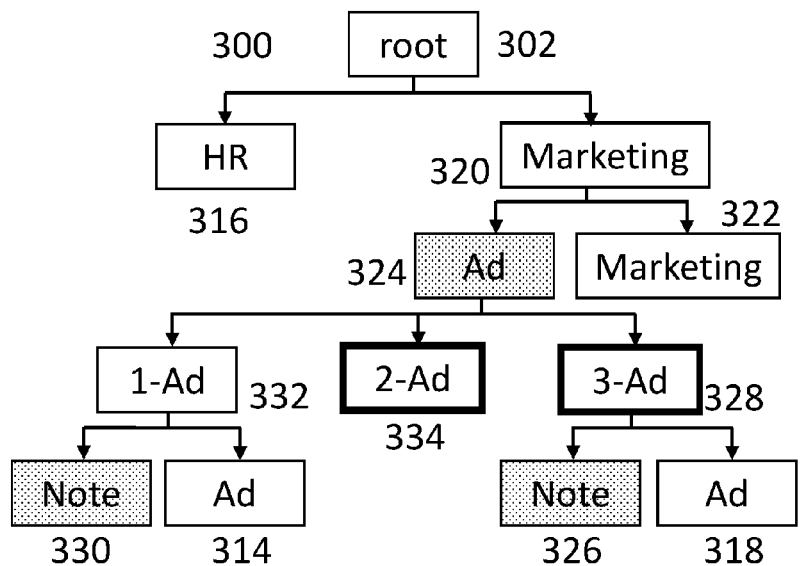
FIG. 57 is an exemplary embodiment of a third tag pyramid data structure.

Turning now to exemplary FIG. 57, it may be desired to renumber the elements in the sequence such that the "2-ad" 328 and "3-ad" 334 mutable tags are in a different order. In an exemplary embodiment, a user may renumber the elements of the sequence by reordering them. According to an exemplary embodiment, the reordering of a sequence may be accomplished by a user dragging an element of the sequence from a first position to a new second position; for example, a user may drag the "3-ad" file 334 to the left of the "2-ad" folder tag 328, which may cause the "3-ad" file 334 to be renumbered to the "2-ad" file 334 and may cause the "2-ad" folder tag 328 to be renumbered to the "3-ad" folder tag 328.

Figure 58:
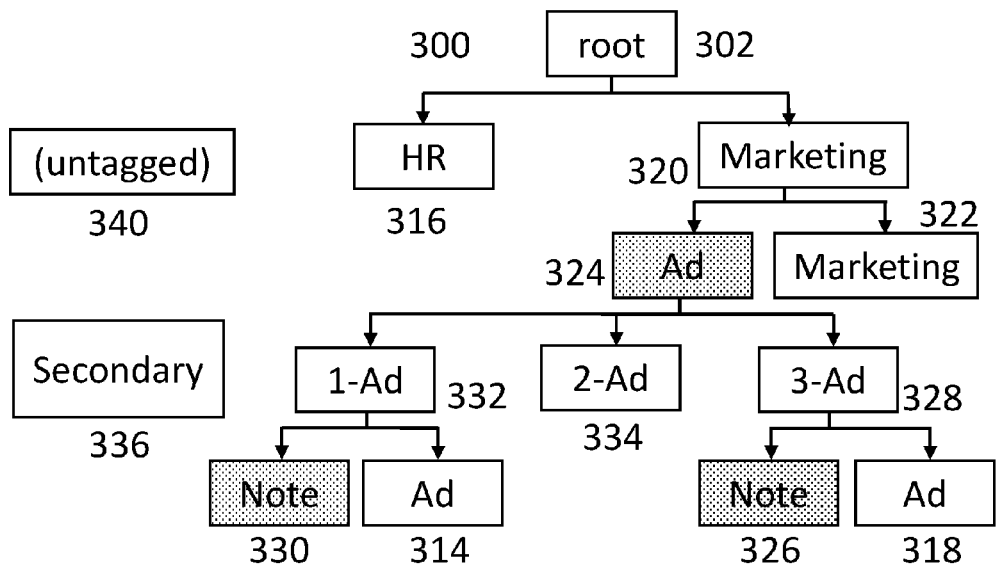
FIG. 58 is an exemplary embodiment of a third tag pyramid data structure.
Figure 59:
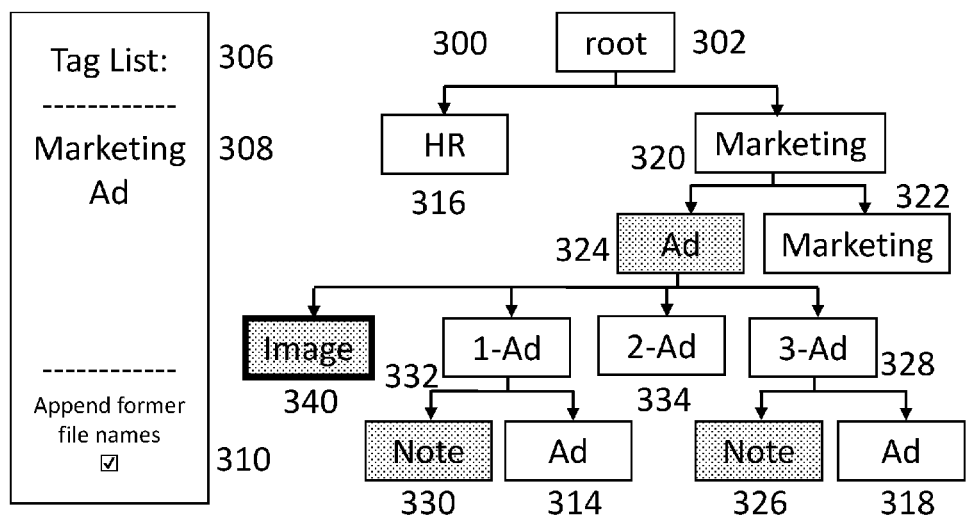
FIG. 59 is an exemplary embodiment of a third tag pyramid data structure.

Turning now to exemplary FIG. 58, it may be desired to add an existing ad 340 to the tag pyramid 300 from a file manager. According to an exemplary embodiment, this existing ad 340 may be named "image.png." According to an exemplary embodiment, a user may elect to add this former file name to the ad file 340 as an additional tag 308 in its tag list 306. To accomplish this, according to an exemplary embodiment, a user may drag and drop the ad file 340 to the "Secondary" box 336 and may then select the option to append the former file name as an additional tag 310. Exemplary FIG. 59 may show the result of this operation.

Figure 60:
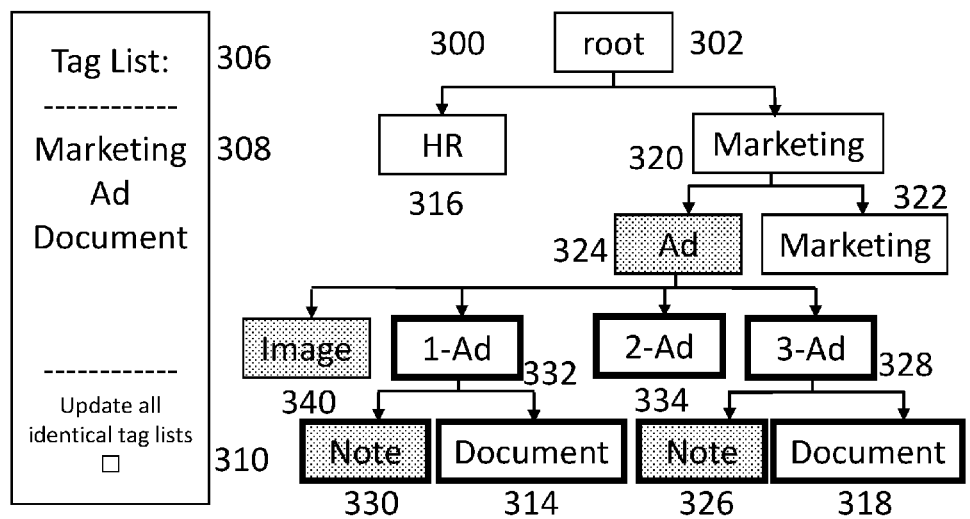
FIG. 60 is an exemplary embodiment of a third tag pyramid data structure.

Turning now to exemplary FIG. 60, it may be desired to further distinguish advertising documents in the sequence from the advertising image 340 added to the tag pyramid structure 300. According to an exemplary embodiment, in order to assign all of the "ad" sequence members the tag "document," a user may select all of the "ad" sequence members 332, 334, 328 and modify the common portion of their tag lists 306. According to an exemplary embodiment, the common portion of their tag lists 306 may be, and may be displayed as, the tags 308 "Marketing" and "Ad." The user may add the tag 308 "document" after the "ad" tag. This may cause the ad files 314, 318 to instead display the mutable tag "document."

Figure 61:
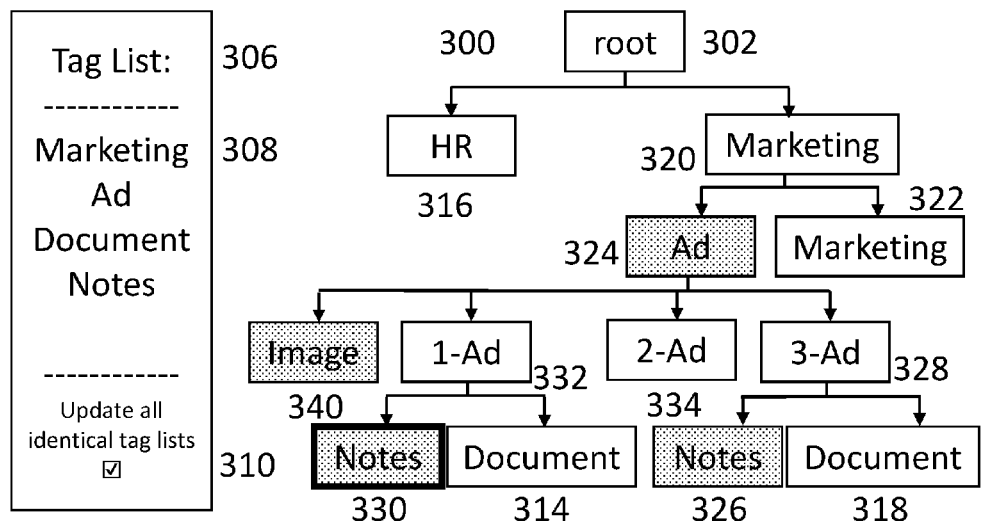
FIG. 61 is an exemplary embodiment of a third tag pyramid data structure.

Turning now to exemplary FIG. 61, it may be desired to rename all of the "note" tags to "notes." According to an exemplary embodiment, a user may select any note tag, such as a note tag 330 or a note tag 326, and may rename the tag in its tag list. The user may then select the option to update all of the identical tag lists, which may then cause all note tags having identical tag lists (in this case, the other of the note tag 330 or the note tag 326) to be likewise updated. This may serve to modify both the note tag 330 and the note tag 226 to "notes."

Figure 62:
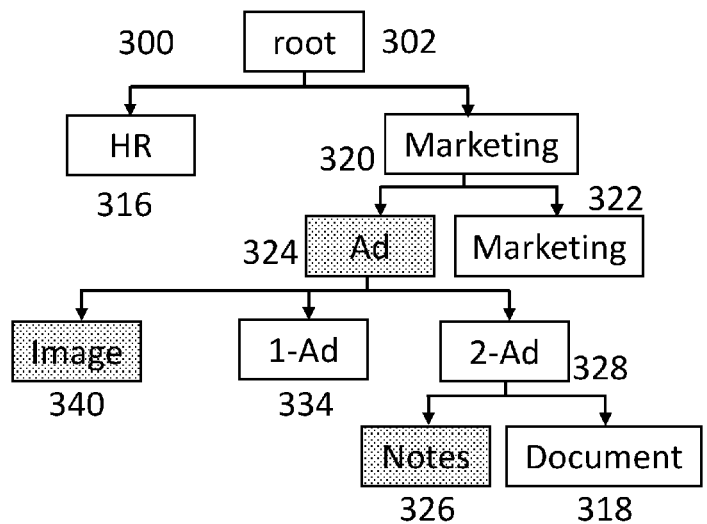
FIG. 62 is an exemplary embodiment of a third tag pyramid data structure.

Turning now to exemplary FIG. 62, it may be desired to delete every file related to the 1-ad tag 332. According to an exemplary embodiment, a user may be able to do this by selecting all of the contents of the 1-ad tag 332 (for example, by selecting the 1-ad folder tag 332 itself) and deleting them. In an embodiment, the other sequence members may be automatically renumbered.

Figure 63:
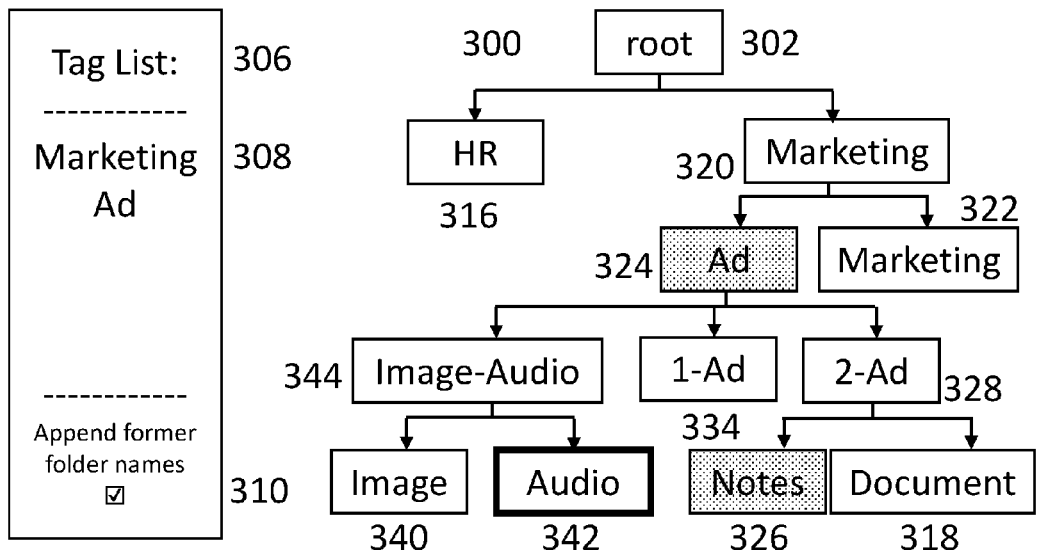
FIG. 63 is an exemplary embodiment of a third tag pyramid data structure.

Turning now to exemplary FIG. 63, it may be desired to move an existing ad folder 342 containing audio ads, which may be named "audio," from a file manager to the tag pyramid 300. According to an exemplary embodiment, a user may move the existing ad folder 342 to the "ad" tag 324 in order to incorporate it into the tag pyramid structure 300. In an embodiment, a user may select an option to have the existing ad folder 342 not join the sequence; in another exemplary embodiment, this may be automatic if the user does not drag the existing ad folder 342 onto the "New Member" block 338. In an embodiment, a user may select the option 310 to append the former folder name of the folder 342 as an additional tag.

In an embodiment, the contents of the folder 342 may not be incorporated into the tag pyramid structure 300, even though the folder 342 itself is. According to an exemplary embodiment, the contents of the folder 342 may not be displayed, but may instead be accessible through the use of a file manager. In order to access the contents of the folder 342, a user may need to select the folder 342 and attempt to access it, or direct the tag pyramid 300 to attempt to access it, which may cause the folder 342 to be launched using a file manager. The contents may then be accessible through this file manager. In another exemplary embodiment, the contents of the folder 342 may be automatically integrated into the tag pyramid 300, or the user may have one or more options 310 to select from which will incorporate some, all, or none of the contents of the folder 342 into the tag pyramid structure 300, as may be desired.

In an exemplary embodiment, when multiple secondary tags are added (for example, as peers to a sequence or otherwise), they may be joined together in a common folder tag, if desired. For example, according to an exemplary embodiment, it may be considered desirable to have the "image" file 340 and the "audio" folder 342 under a common folder tag 344. According to an exemplary embodiment, if no common tag exists below the sequence level, a new common tag may be created 344, which may combine tags (such as the mutable tags) of both the image file 340 and the audio folder 342. In such an embodiment, the common tag "image-audio" 344 may be created by the concatenation of the "image" and "audio" tags in order to hold both items tagged with an image tag 340 and items tagged with an audio tag 342. In another exemplary embodiment, the common tag may have another name (which may be automatically generated for the user or selected from a list, such as the tags "other" or "temporary") or the user may be asked to define a name.

Figure 64:
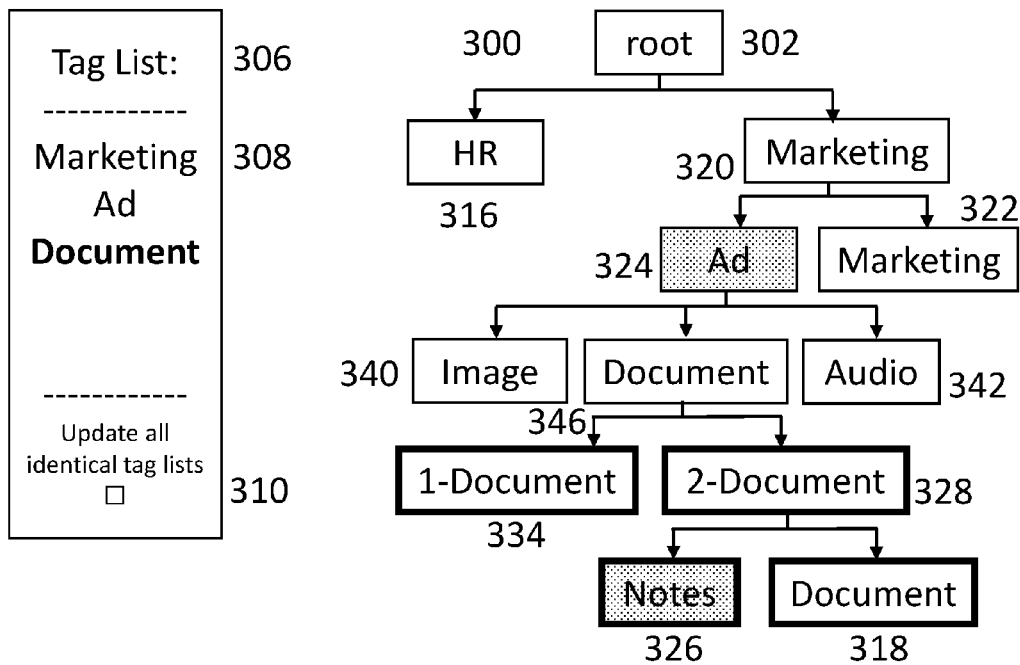
FIG. 64 is an exemplary embodiment of a third tag pyramid data structure.

Turning now to exemplary FIG. 64, in an exemplary embodiment, it may be desired to have the sequence be represented by the "document" tag (such as document tag 318) rather than the "ad" tag (such as the 1-ad tag 334). In an exemplary embodiment, a user may be able to direct the sequence to use the "document" tag. For example, according to an exemplary embodiment, a user may select each of the "1-ad" and "2-ad" tags 334, 328. This may display a tag list 306 of all of the tags common to the sequence, which includes "Marketing," "Ad," and "Document." The user may then select the "document" tag, directing the sequence to use it instead of the "ad" tag. This may restructure the tag pyramid data structure 300 as shown, placing the sequence under a new "document" folder tag 346. In this case, the display of the tag 308 "Document" in boldface in the tag list 306 may indicate that the tag has been selected as a common tag to use for the sequence.

Figure 65:
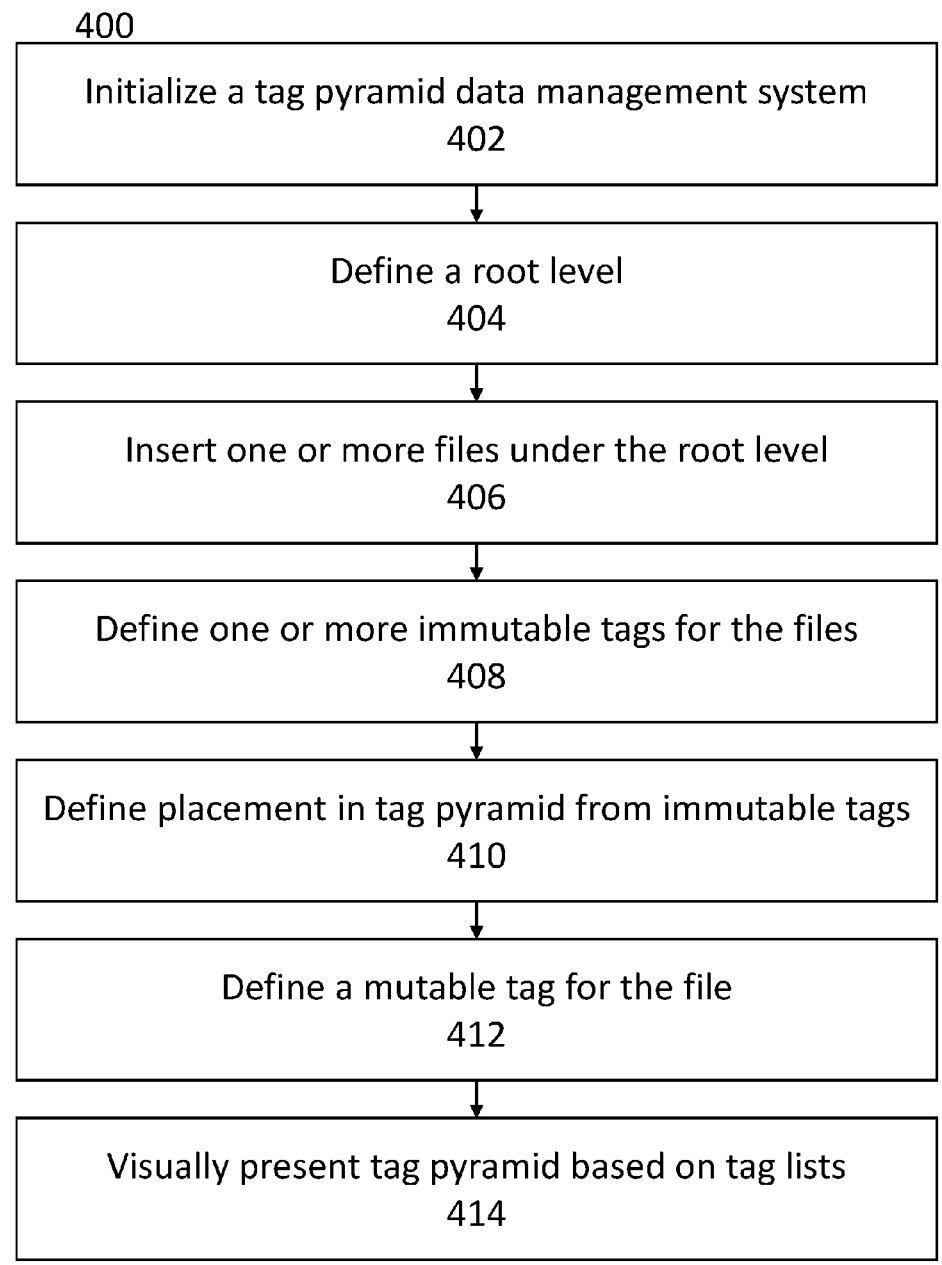
FIG. 65 is an exemplary flowchart depicting an exemplary embodiment of a method for creating a tag pyramid data structure.

Turning now to exemplary FIG. 65, a general method of use for a tag pyramid data structure 400 may be shown and described. In a first step, a user may initialize a tag pyramid data management system 402. According to an exemplary embodiment, a tag pyramid data management system may be the only data management tool on a computer or may be one of several, and may, for example, exist alongside another file manager used to access files in a more traditional fashion.

In a next step, a user may define a root level for the tag pyramid 404, which may be, for example, a folder or root level of a storage system. The user may then insert one or more files under the root level 406. The user may then define one or more immutable tags for the files 408, by, for example, manually entering the tags, generating tags based on the filenames of the files, approving the import of immutable tag lists from another tag pyramid, or by another method.

According to an exemplary embodiment, a tag pyramid may then automatically define the placement of the files 410 based on the immutable tags that the files have and the rankings of the immutable tags. The tag pyramid may then automatically define a mutable tag to display for the file 412 based on the placement of the file in the tag pyramid and the tags above it in the tag pyramid. The tag pyramid may then visually present the tag pyramid based on the tag lists 414, which may include, for example, displaying some mutable tags in a defined color for a primary tag (such as red) and displaying other mutable tags in a defined color for a secondary tag (such as purple).

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A data storage and retrieval system for a computer storage memory, comprising:
a processor configured to access and modify said memory according to a tag pyramid data structure, said tag pyramid data structure including a plurality of tag pyramid elements, the plurality of tag pyramid elements comprising:
a root level element, the root level element associated with a root tag, said root tag being a predefined tag fixedly associated with a root level of the tag pyramid data structure, and associated with one of the set of: an empty immutable tag list and a mirrored master tag pyramid immutable tag list; and
at least one child element extending from the root tag, the at least one child element associated with at least one of a file or folder, the at least one child element comprising:
a hierarchical immutable tag sequence comprising one or more immutable tags, each immutable tag having a sequence rank; and
wherein an immutable tag in the hierarchical immutable tag sequence is selected as a mutable tag;
wherein the tag pyramid data structure is configured to automatically define the placement of the at least one child element in the tag pyramid data structure based on the hierarchical immutable tag sequence of the at least one child element.

2. The system of claim 1, wherein the system is configured to select the immutable tag by performing the steps of:
determining, for each immutable tag in the hierarchical immutable tag sequence, whether a portion of the hierarchical immutable tag sequence terminating at the immutable tag and beginning at a first immutable tag matches a portion of a second tag sequence of at least one other element in the tag pyramid data structure;
determining if the sequence is longer than and fully includes the second tag sequence of the at least one other element in the tag pyramid;
when the sequence is longer than and fully includes the second tag sequence of the at least one other element in the tag pyramid, determining the rank of the mutable tag of the at least one other element and defining the mutable tag of the at least one child element as an immutable tag in the hierarchical immutable tag sequence having a rank below the rank of the mutable tag of the at least one other element; and
when, for an immutable tag in the hierarchical immutable tag sequence, the portion of the hierarchical immutable tag sequence does not match the portion of the second tag sequence of the at least one other element, defining a first nonmatching immutable tag as the mutable tag of the at least one child element.

3. The system of claim 1, wherein the system is configured to automatically define the placement of the at least one child element in the tag pyramid data structure based on the hierarchical immutable tag sequence of the at least one child element by performing the steps of:
determining, for each immutable tag in the hierarchical immutable tag sequence, whether a portion of the hierarchical immutable tag sequence terminating at the immutable tag and beginning at a first immutable tag matches a portion of a second tag sequence of at least one other element in the tag pyramid data structure;
when, for an immutable tag in the hierarchical immutable tag sequence, the portion of the hierarchical immutable tag sequence matches the portion of the second tag sequence of the at least one other element, grouping the child element and the at least one other element under a folder element, the folder element having a folder tag sequence, the folder tag sequence of the folder being the matching portion of the hierarchical immutable tag sequence and second tag sequence.

4. The system of claim 1, wherein the system further includes a visualizer configured to display one or more mutable file tags of the at least one child in the form of a visual pyramid;
wherein mutable file tags at an identical hierarchical level of the tag pyramid to a mutable tag are defined as peer tags of the mutable tag, and wherein a mutable file tag in the one or more mutable file tags is defined as a primary tag if the mutable file tag is not ranked below one of its peer tags in a hierarchical immutable tag sequence of the at least one child element, and wherein a mutable file tag not defined as a primary tag is defined as a secondary tag; and wherein primary tags are displayed by the visualizer in a first color and secondary tags are displayed by the visualizer in a second color.

5. The system of claim 1, wherein the tag pyramid data structure is configured to receive and store a new file as a new child element, the system being configured to perform the steps of:

receiving, from a user interface, the new file, and further receiving a command to associate the new file with a parent tag pyramid element in the plurality of tag pyramid elements;

generating the new child element, the new child element comprising the new file;

incorporating, into the new child element, the hierarchical immutable tag sequence of the parent tag pyramid element;

redefining the placement of the parent tag pyramid element and the new child element in the tag pyramid data structure.

6. The system of claim 5, wherein the tag pyramid data structure is further configured to perform the steps of:

creating, from a file name of the new file, a file name immutable tag; and appending, to the hierarchical immutable tag sequence of the new child element, the file name immutable tag.

7. The system of claim 1, wherein the tag pyramid data structure is configured to incorporate a mutable mandatory structure tag, the system being configured to perform the steps of:

receiving, from a user interface, a mutable mandatory structure tag, the step of receiving a mutable mandatory structure tag comprising at least one of receiving and converting a mutable folder tag, receiving a mutable mandatory structure tag, or receiving and converting a folder of another file manager;

receiving a command to associate the mutable mandatory structure tag with a parent tag pyramid element in the plurality of tag pyramid elements;

generating the new child element, the new child element comprising a pointer;

incorporating, into the new child element, the hierarchical immutable tag sequence of the parent tag pyramid element;

redefining the placement of the parent tag pyramid element and the new child element in the tag pyramid data structure.

8. The system of claim 1, wherein the tag pyramid data structure is configured to incorporate a portion of another tag pyramid data structure, the system being configured to perform the steps of:

receiving, from a user interface, the tag pyramid data structure portion comprising one or more elements, and further receiving a command to associate the tag pyramid data structure portion with a parent tag pyramid element in the plurality of tag pyramid elements;

incorporating, into the tag pyramid data structure portion, the hierarchical immutable tag sequence of the parent tag pyramid element;

redefining the placement, in the tag pyramid data structure, of the parent tag pyramid element and the elements of the tag pyramid data structure portion.

9. The system of claim 1, wherein the system is configured to perform the step of:

modifying, with a user interface, the hierarchical immutable tag sequence of a tag pyramid element, the step of modifying the hierarchical immutable tag sequence of the tag pyramid element comprising at least one of: adding a new immutable tag at a position in the hierarchical immutable tag sequence, editing an immutable tag in the hierarchical immutable tag sequence, or deleting an immutable tag from the hierarchical immutable tag sequence;

wherein modifying the hierarchical immutable tag sequence of a file element updates the hierarchical immutable tag sequence of the file element; and wherein modifying the hierarchical immutable tag sequence of a folder child element stored in a folder element updates the hierarchical tag sequence of the folder child element and automatically updates a mutable tag of the folder element.

10. The system of claim 9, wherein the system is configured to perform the steps of:

identifying all other tag pyramid elements having an identical hierarchical immutable tag sequence to the tag pyramid element; and after modifying the hierarchical immutable tag sequence of the tag pyramid element, automatically modifying the hierarchical immutable tag sequences of the other tag pyramid elements.

11. The system of claim 1, further comprising a tag pyramid element sequence, the tag pyramid element sequence comprising a plurality of tag pyramid elements, each of the tag pyramid elements in the plurality of tag pyramid elements having a common hierarchical immutable tag sequence portion.

12. The system of claim 11, wherein the tag pyramid data structure is configured to receive and store a new file and add it to the tag pyramid element sequence, and wherein the system is configured to perform the steps of:

receiving, from a user interface, the new file, and further receiving a command to incorporate the new file and join it to the tag pyramid element sequence, the command comprising dragging the new file into a designated area associated with the tag pyramid element sequence;

generating a new child element, the new child element comprising the new file; and incorporating, into the new child element, the common hierarchical immutable tag sequence portion of the tag pyramid element sequence.

13. The system of claim 11, wherein the tag pyramid data structure is configured to receive and store a new file without adding it to the tag pyramid element sequence, and wherein the system is configured to perform the steps of:

receiving, from a user interface, the new file, and further receiving a command to incorporate the new file without joining it to the tag pyramid element sequence, the command comprising dragging the new file into a designated area associated with the tag pyramid element sequence;

generating a new child element, the new child element comprising the new file; and incorporating, into the new child element, the hierarchical immutable tag sequence of a parent tag pyramid element of the tag pyramid element sequence.

14. The system of claim 11, wherein the tag pyramid element sequence is reorderable.

15. The system of claim 11, wherein the system is configured to perform the steps of:
- selecting, with a user interface, all of the tag pyramid elements in the tag pyramid element sequence;
- modifying, with a user interface, the common hierarchical immutable tag sequence portion of the tag pyramid element sequence, wherein the step of modifying the common hierarchical immutable tag sequence portion of the tag pyramid element sequence comprises at least one of: adding a new immutable tag at a position in the common hierarchical immutable tag sequence portion, editing an immutable tag in the common hierarchical immutable tag sequence portion, deleting an immutable tag from the common hierarchical immutable tag sequence portion, or selecting a common immutable tag to use as a mutable file tag of the tag pyramid element sequence.

16. A method of storing and retrieving data in a computer system having a storage memory, comprising:
- configuring said memory according to a tag pyramid data structure, said tag pyramid data structure including a plurality of tag pyramid elements, the plurality of tag pyramid elements comprising:
- a root level element, the root level element associated with a root tag, said root tag being a predefined tag fixedly associated with a root level of the tag pyramid data structure, and associated with one of the set of: an empty immutable tag list and a mirrored master tag pyramid immutable tag list; and
- at least one child element extending from the root tag, the at least one child element associated with at least one of a file or folder, the at least one child element comprising:
- a hierarchical immutable tag sequence comprising one or more immutable tags, each immutable tag having a sequence rank; and
- wherein an immutable tag in the hierarchical immutable tag sequence is selected as a mutable tag;
- wherein the tag pyramid data structure is configured to automatically define the placement of the at least one child element in the tag pyramid data structure based on the hierarchical immutable tag sequence of the at least one child element.

17. The method of claim 16, further comprising selecting a mutable tag by performing the steps of:
- determining, for each immutable tag in the hierarchical immutable tag sequence, whether a portion of the hierarchical immutable tag sequence terminating at the immutable tag and beginning at a first immutable tag matches a portion of a second tag sequence of at least one other element in the tag pyramid data structure;
- determining if the sequence is longer than and fully includes the second tag sequence of the at least one other element in the tag pyramid;
- when the sequence is longer than and fully includes the second tag sequence of the at least one other element in the tag pyramid, determining the rank of the mutable tag of the at least one other element and defining the mutable tag of the at least one child element as an immutable tag in the hierarchical immutable tag sequence having a rank below the rank of the mutable tag of the at least one other element; and
- when, for an immutable tag in the hierarchical immutable tag sequence, the portion of the hierarchical immutable tag sequence does not match the portion of the second tag sequence of the at least one other element, defining a first nonmatching immutable tag as the mutable tag of the at least one child element.

18. The method of claim 16, wherein defining the placement of the at least one child element in the tag pyramid data structure based on the hierarchical immutable tag sequence of the at least one child element comprises the steps of:
- determining, for each immutable tag in the hierarchical immutable tag sequence, whether a portion of the hierarchical immutable tag sequence terminating at the immutable tag and beginning at a first immutable tag matches a portion of a second tag sequence of at least one other element in the tag pyramid data structure;
- when, for an immutable tag in the hierarchical immutable tag sequence, the portion of the hierarchical immutable tag sequence matches the portion of the second tag sequence of the at least one other element, grouping the child element and the at least one other element under a folder element, the folder element having a folder tag sequence, the folder tag sequence of the folder being the matching portion of the hierarchical immutable tag sequence and second tag sequence.

19. The method of claim 16, further comprising displaying, on a visualizer, one or more mutable file tags of the at least one child in the form of a visual pyramid;
- wherein mutable file tags at an identical hierarchical level of the tag pyramid are defined as primary tags if the mutable file tags are not ranked below another mutable file tag in a hierarchical immutable tag list of the at least one child element, and wherein mutable file tags not defined as primary tags are defined as secondary tags; and
- wherein primary tags are displayed by the visualizer in a first color and secondary tags are displayed by the visualizer in a second color.

20. The method of claim 16, further comprising adding a new file as a new child element by performing the steps of:
- receiving, from a user interface, the new file, and further receiving a command to associate the new file with a parent tag pyramid element in the plurality of tag pyramid elements;
- generating the new child element, the new child element comprising the new file;
- incorporating, into the new child element, the hierarchical immutable tag list of the parent tag pyramid element;
- redefining the placement of the parent tag pyramid element and the new child element in the tag pyramid data structure.

* * * * *